US 9,525,181 B2

(12) United States Patent
Liu et al.

(10) Patent No.: US 9,525,181 B2
(45) Date of Patent: Dec. 20, 2016

(54) FUEL CELL SYSTEM WITH INTERCONNECT

(71) Applicant: LG Fuel Cell Systems Inc., North Canton, OH (US)

(72) Inventors: Zhien Liu, Canton, OH (US); Richard Goettler, Medina, OH (US)

(73) Assignee: LG Fuel Cell Systems Inc., North Canton, OH (US)

( * ) Notice: Subject to any disclaimer, the term of this patent is extended or adjusted under 35 U.S.C. 154(b) by 337 days.

(21) Appl. No.: 13/843,422

(22) Filed: Mar. 15, 2013

(65) Prior Publication Data

US 2013/0216925 A1 Aug. 22, 2013

Related U.S. Application Data

(63) Continuation-in-part of application No. 13/161,370, filed on Jun. 15, 2011.

(51) Int. Cl.
*H01M 4/02* (2006.01)
*H01M 4/36* (2006.01)
*H01M 4/48* (2010.01)
*H01M 8/10* (2016.01)
*H01M 4/90* (2006.01)
*H01M 2/20* (2006.01)
(Continued)

(52) U.S. Cl.
CPC ......... *H01M 8/0232* (2013.01); *H01M 4/8621* (2013.01); *H01M 4/9025* (2013.01); *H01M 8/0236* (2013.01); *H01M 8/1286* (2013.01); *H01M 8/2425* (2013.01); *H01M 8/0206* (2013.01); *H01M 8/0243* (2013.01); *H01M 8/0247* (2013.01); *H01M 8/0282* (2013.01); *H01M 2008/1293* (2013.01); *Y02E 60/521* (2013.01); *Y02E 60/525* (2013.01)

(58) Field of Classification Search
CPC .... H01M 8/1206; H01M 8/1226; H01M 4/86; H01M 8/06; H01M 8/028; H01M 8/04; H01M 2008/1293; H01M 8/0202
USPC .......................... 429/425, 488, 527, 528, 534
See application file for complete search history.

(56) References Cited

U.S. PATENT DOCUMENTS 4,663,250 A * 5/1987 Ong et al. ...................... 429/473
4,888,254 A 12/1989 Reichner
(Continued)

FOREIGN PATENT DOCUMENTS

EP 0 876 687 B1 10/2002
EP 1 304 755 B1 4/2003
(Continued)

OTHER PUBLICATIONS

Q. X. Fu et al. "LA{sub 0.4] SR[sub 0.6] ti[sub 1-x]Mn{sub x] O{sub 3-[delta]] Perovskites as Anode Materials for Solide Oxide Fuel Cells", Abstract, Journal of the Electrochemical Society, vol. 1523, No. 4, Feb. 24, 2006, (20069-02-24), 1 pg.
(Continued)

*Primary Examiner* — Patrick Ryan
*Assistant Examiner* — Julian Anthony
(74) *Attorney, Agent, or Firm* — Duane Morris LLP

(57) ABSTRACT

The present invention includes an integrated planar, series connected fuel cell system having electrochemical cells electrically connected via interconnects, wherein the anodes of the electrochemical cells are protected against Ni loss and migration via an engineered porous anode barrier layer.

22 Claims, 24 Drawing Sheets

(51) Int. Cl.
*H01M 8/24* (2016.01)
*H01M 8/02* (2016.01)
*H01M 8/12* (2016.01)
*H01M 4/86* (2006.01)

(56) References Cited

U.S. PATENT DOCUMENTS

| | | |
|---|---|---|
| 5,175,061 A | 12/1992 | Hildebrand et al. |
| 5,273,837 A | 12/1993 | Aitken et al. |
| 5,928,805 A | 7/1999 | Singh et al. |
| 6,344,426 B1 * | 2/2002 | Hata et al. .............. 501/103 |
| 6,558,832 B1 | 5/2003 | Bruck et al. |
| 6,623,881 B2 | 9/2003 | Badding et al. |
| 6,638,658 B1 | 10/2003 | McLean |
| 6,852,436 B2 | 2/2005 | Badding et al. |
| 6,949,307 B2 | 9/2005 | Cable et al. |
| 7,001,684 B2 | 2/2006 | Doshi et al. |
| 7,285,350 B2 | 10/2007 | Keefer et al. |
| 7,323,266 B2 | 1/2008 | Morishima et al. |
| 7,351,449 B2 | 4/2008 | Hunt et al. |
| 7,378,173 B2 | 5/2008 | Badding et al. |
| 7,381,492 B2 | 6/2008 | Chen et al. |
| 7,435,490 B2 * | 10/2008 | England ............ H01M 4/8605 429/444 |
| 7,510,819 B2 | 3/2009 | Chen et al. |
| 7,531,260 B2 | 5/2009 | Day et al. |
| 7,709,124 B2 | 5/2010 | Barnett et al. |
| 7,718,113 B2 | 5/2010 | Crumm et al. |
| 7,732,002 B2 | 6/2010 | Kodas et al. |
| 7,781,109 B2 | 8/2010 | Gross |
| 7,842,434 B2 | 11/2010 | Rakowski et al. |
| 2002/0102450 A1 | 8/2002 | Badding et al. |
| 2004/0023101 A1 | 2/2004 | Jacobson et al. |
| 2004/0028975 A1 | 2/2004 | Badding et al. |
| 2004/0106031 A1 | 6/2004 | Sherman et al. |
| 2005/0014049 A1 | 1/2005 | Hart et al. |
| 2005/0221138 A1 | 10/2005 | Chinchure et al. |
| 2005/0227134 A1 | 10/2005 | Nguyen |
| 2005/0249993 A1 | 11/2005 | Horiuchi et al. |
| 2005/0250004 A1 | 11/2005 | McLean et al. |
| 2006/0153974 A1 | 7/2006 | Matsuzaki et al. |
| 2007/0037031 A1 | 2/2007 | Cassidy et al. |
| 2007/0072070 A1 | 3/2007 | Quek et al. |
| 2007/0087250 A1 | 4/2007 | Lewis et al. |
| 2007/0134537 A1 | 6/2007 | Reisdorf et al. |
| 2007/0259242 A1 | 11/2007 | Schaevitz et al. |
| 2008/0124602 A1 | 5/2008 | Larsen et al. |
| 2008/0160376 A1 | 7/2008 | Badding et al. |
| 2008/0199738 A1 | 8/2008 | Perry et al. |
| 2009/0011307 A1 | 1/2009 | Lee et al. |
| 2009/0035635 A1 | 2/2009 | Bae et al. |
| 2009/0162735 A1 | 6/2009 | Hasegawa |
| 2010/0035101 A1 | 2/2010 | Maier et al. |
| 2010/0055533 A1 | 3/2010 | Kebbede et al. |
| 2010/0209802 A1 | 8/2010 | Armstrong et al. |
| 2011/0033779 A1 | 2/2011 | Badding et al. |
| 2012/0244456 A1 | 9/2012 | Muecke et al. |
| 2012/0258241 A1 | 10/2012 | Tucker et al. |
| 2012/0321981 A1 | 12/2012 | Liu |
| 2014/0017596 A1 | 1/2014 | Takata |

FOREIGN PATENT DOCUMENTS

| | | |
|---|---|---|
| EP | 1304755 A2 | 4/2003 |
| EP | 1 230 706 B1 | 3/2004 |
| EP | 0 815 607 B1 | 5/2004 |
| EP | 1624521 A1 | 2/2006 |
| EP | 1 472 754 B1 | 8/2006 |
| EP | 1852930 A1 | 11/2007 |
| EP | 1930794 | 6/2008 |
| WO | 9628855 A1 | 9/1996 |
| WO | 9727639 A1 | 7/1997 |
| WO | 9957780 A1 | 11/1999 |
| WO | WO 99/57780 A1 | 11/1999 |
| WO | 0147262 A2 | 6/2001 |
| WO | 0229917 A1 | 4/2002 |
| WO | WO 02/29917 A1 | 4/2002 |
| WO | 03063285 A1 | 7/2003 |
| WO | WO 03/063285 A1 | 7/2003 |
| WO | 2008091801 A2 | 7/2008 |
| WO | 2008103253 A1 | 8/2008 |
| WO | WO 2008/103253 A1 | 8/2008 |
| WO | 2009008979 A1 | 1/2009 |
| WO | WO 2009/008979 A1 | 1/2009 |
| WO | 20120133263 | 10/2012 |

OTHER PUBLICATIONS

International Search Report and Written Opinion, ISAEPO, PCT/US2014/029782, LG Fuel Cell Systems Inc., Jul. 28, 2014, 11 pgs.
International Search Report and Written Opinion, ISAEPO, PCT/US2014/029705, LG Fuel Cell Systems Inc., Jun. 5, 2014, 13 pgs.
M.R. Pillai, Dan Gostovic, Ilwon Kim, Scott A. Barnett, "Short-period Segmented-in-Series Solid Oxide Fuel Cells on Flattened Tube Supports", Journal of Power Sources 163 (2007) 960-965.
T.S. Lai, S.A. Barnett, "Design Considerations for Segmented-in-Series Fuel Cell", Journal of Power Sources 147 (2005) 85-94.
International Search Report and Written Opinion, PCT/US12/42073, Rolls-Royce Fuel Cell Systems (US) Inc., Sep. 4, 2012.
International Search Report and Written Opinion, PCT/US12/42051, Rolls-Royce Fuel Cell Systems (US) Inc., Sep. 7, 2012.
International Search Report and Written Opinion, PCT/US12/42062, Rolls-Royce Fuel Cell Systems (US) Inc., Aug. 31, 2012.
International Search Report and Written Opinion, PCT/US12/42066, Rolls-Royce Fuel Cell Systems (US) Inc., Aug. 31, 2012.
international Search Report and Written Opinion, PCT/US12/42070, Rolls-Royce Fuell Cell Systems (US) Inc., Sep. 4, 2012.
Electrochem, Solid-State Lett. 2006 9, 4, A215-A219 (abstract).

* cited by examiner

FUEL CELL SYSTEM WITH INTERCONNECT

CROSS REFERENCE TO RELATED APPLICATIONS

The present application is a continuation-in-part of U.S. patent application Ser. No. 13/161,370, entitled FUEL CELL SYSTEM WITH INTERCONNECT, filed on Jun. 15, 2011, and is also related to the following: U.S. patent application Ser. No. 13/161,386, entitled FUEL CELL SYSTEM WITH INTERCONNECT, filed Jun. 15, 2011; U.S. patent application Ser. No. 13/161,384, filed Jun. 15, 2011; U.S. patent application Ser. No. 13/161,389, entitled FUEL CELL SYSTEM WITH INTERCONNECT, filed Jun. 15, 2011; U.S. patent application Ser. No. 13/161,402, entitled FUEL CELL SYSTEM WITH INTERCONNECT, filed Jun. 15, 2011; and U.S. patent application Ser. No. 13/843,178, entitled FUEL CELL SYSTEM WITH INTERCONNECT, filed Mar. 15, 2013, each of which is incorporated herein by reference.

GOVERNMENT RIGHTS

This invention was made with U.S. Government support under Contract No. DE-FE0000303 awarded by the Department of Energy. The Government may have certain rights in this invention.

FIELD OF THE INVENTION

The present invention generally relates to fuel cells and, in particular, to interconnected electrochemical cells having anode Ni migration protection.

BACKGROUND

Fuel cells, fuel cell systems and interconnects for fuel cells and fuel cell systems remain an area of interest. Some existing systems have various shortcomings, drawbacks, and disadvantages relative to certain applications. Accordingly, there remains a need for further contributions in this area of technology.

SUMMARY

The present invention includes a fuel cell system having electrochemical cells electrically connected via interconnects, wherein the anodes of the electrochemical cells are protected against Ni migration via a porous anode barrier.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
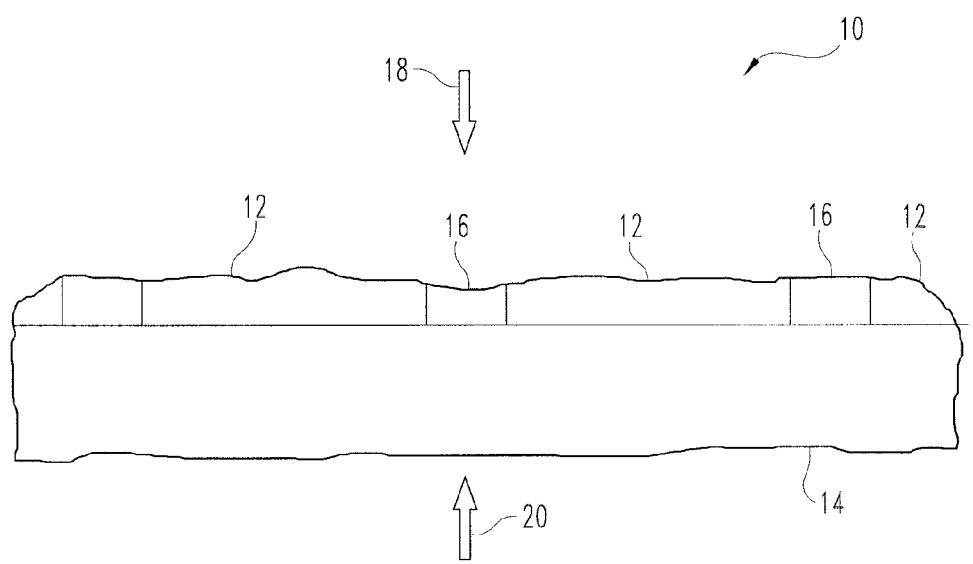
FIG. 1 schematically depicts some aspects of a non-limiting example of a fuel cell system in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, some aspects of a non-limiting example of a fuel cell system 10 in accordance with an embodiment of the present invention is schematically depicted. In the embodiment of FIG. 1, various features, components and interrelationships therebetween of aspects of an embodiment of the present invention are depicted. However, the present invention is not limited to the particular embodiment of FIG. 1 and the components, features and interrelationships therebetween as are illustrated in FIG. 1 and described herein.

The present embodiment of fuel cell system 10 includes a plurality of electrochemical cells 12, i.e., individual fuel cells, formed on a substrate 14. Electrochemical cells 12 are coupled together in series by interconnects 16. Fuel cell system 10 is a segmented-in-series arrangement deposited on a flat porous ceramic tube, although it will be understood that the present invention is equally applicable to segmented-in-series arrangements on other substrates, such on a circular porous ceramic tube. In various embodiments, fuel cell system 10 may be an integrated planar fuel cell system or a tubular fuel cell system.

Each electrochemical cell 12 of the present embodiment has an oxidant side 18 and a fuel side 20. The oxidant is typically air, but could also be pure oxygen ($O_2$) or other oxidants, e.g., including dilute air for fuel cell systems having air recycle loops, and is supplied to electrochemical cells 12 from oxidant side 18. Substrate 14 of the present embodiment is porous, e.g., a porous ceramic material which is stable at fuel cell operation conditions and chemically compatible with other fuel cell materials. In other embodiments, substrate 14 may be a surface-modified material, e.g., a porous ceramic material having a coating or other surface modification, e.g., configured to prevent or reduce interaction between electrochemical cell 12 layers and substrate 14. A fuel, such as a reformed hydrocarbon fuel, e.g., synthesis gas, is supplied to electrochemical cells 12 from fuel side 20 via channels (not shown) in porous substrate 14. Although air and synthesis gas reformed from a hydrocarbon fuel are employed in the present embodiment, it will be understood that electrochemical cells using other oxidants and fuels may be employed without departing from the scope of the present invention, e.g., pure hydrogen and pure oxygen. In addition, although fuel is supplied to electrochemical cells 12 via substrate 14 in the present embodiment, it will be understood that in other embodiments of the present invention, the oxidant may be supplied to the electrochemical cells via a porous substrate.

Figure 2:
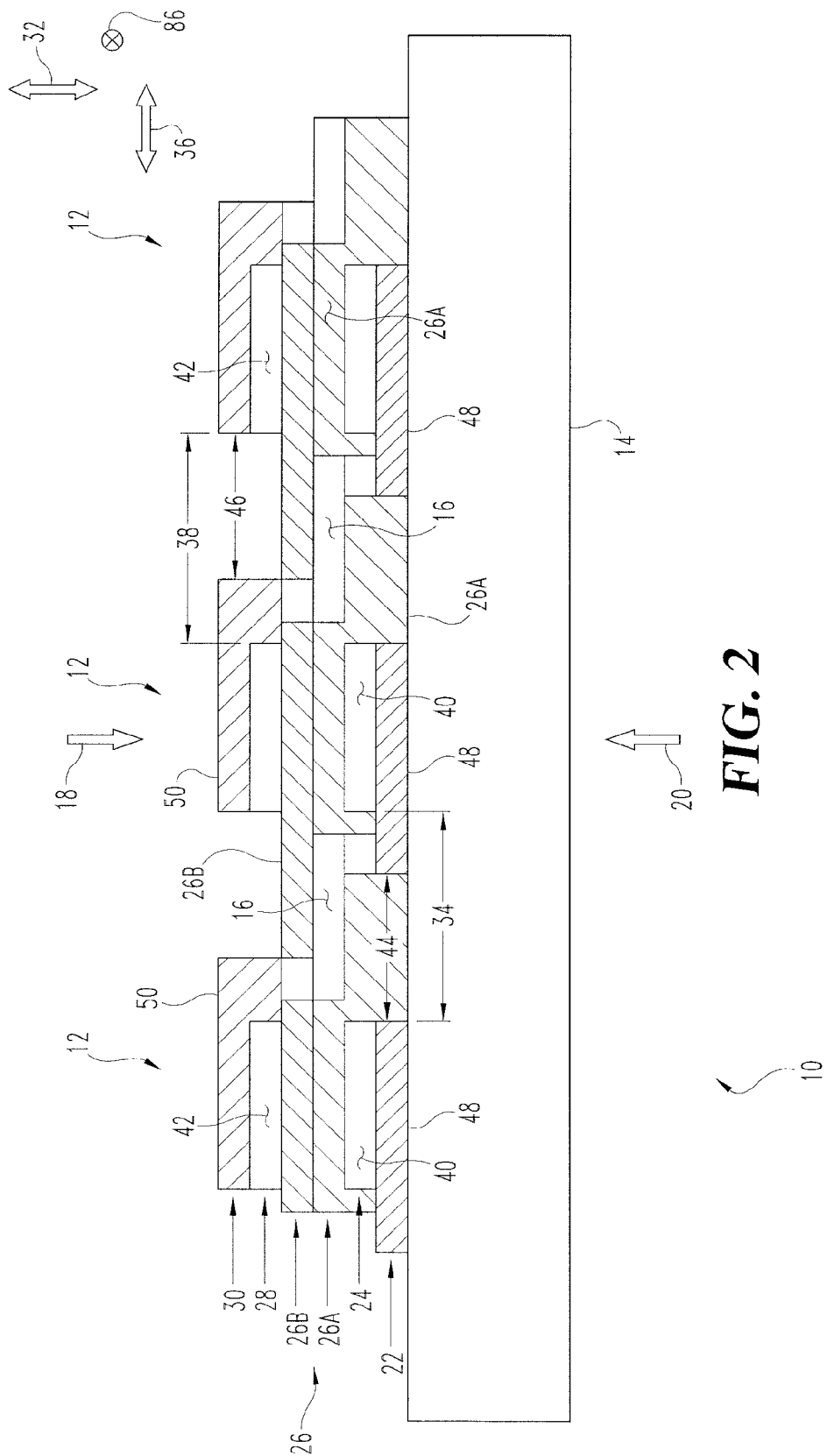
FIG. 2 schematically depicts some aspects of a non-limiting example of a cross section of a fuel cell system in accordance with an embodiment of the present invention.

Referring to FIG. 2, some aspects of a non-limiting example of fuel cell system 10 are described in greater detail. Fuel cell system 10 can be formed of a plurality of layers screen printed onto substrate 14. Screen printing is a process whereby a woven mesh has openings through which the fuel cell layers are deposited onto substrate 14. The openings of the screen determine the length and width of the printed layers. Screen mesh, wire diameter, ink solids loading and ink rheology determine the thickness of the printed layers. Fuel cell system 10 layers include an anode conductive layer 22, an anode layer 24, an electrolyte layer 26, a cathode layer 28 and a cathode conductive layer 30. In one form, electrolyte layer 26 is formed of an electrolyte sub-layer 26A and an electrolyte sub-layer 26B. In other embodiments, electrolyte layer 26 may be formed of any number of sub-layers. It will be understood that FIG. 2 is not to scale; for example, vertical dimensions are exaggerated for purposes of clarity of illustration.

Interconnects for solid oxide fuel cells (SOFC) are preferably electrically conductive in order to transport electrons from one electrochemical cell to another; mechanically and chemically stable under both oxidizing and reducing environments during fuel cell operation; and nonporous, in order to prevent diffusion of the fuel and/or oxidant through the interconnect. If the interconnect is porous, fuel may diffuse to the oxidant side and burn, resulting in local hot spots that may result in a reduction of fuel cell life, e.g., due to degradation of materials and mechanical failure, as well as reduced efficiency of the fuel cell system. Similarly, the oxidant may diffuse to the fuel side, resulting in burning of the fuel. Severe interconnect leakage may significantly reduce the fuel utilization and performance of the fuel cell, or cause catastrophic failure of fuel cells or stacks.

For segmented-in-series cells, fuel cell components may be formed by depositing thin films on a porous ceramic substrate, e.g., substrate 14. In one form, the films are deposited via a screen printing process, including the interconnect. In other embodiments, other process may be employed to deposit or otherwise form the thin films onto the substrate. The thickness of interconnect layer may be 5 to 30 microns, but can also be much thicker, e.g., 100 microns. If the interconnect is not fully nonporous, e.g., due to sintering porosity, microcracks, voids and other defects introduced during processing, gas or air flux through interconnect layer may be very high, resulting in undesirable effects, as mentioned above. Accordingly, in one aspect of the present invention, the interconnect (interconnect 16) is configured to minimize or eliminate diffusion of the oxidant and fuel therethrough.

The material of interconnect 16 of the present embodiment is a precious metal, such as Ag, Pd, Au and/or Pt and/or alloys thereof, although other materials may be employed without departing from the scope of the present invention. For example, in other embodiments, it is alternatively contemplated that other materials may be employed, including precious metal alloys, such as Ag—Pd, Ag—Au, Ag—Pt, Au—Pd, Au—Pt, Pt—Pd, Ag—Au—Pd, Ag—Au—Pt, Ag—Au—Pd—Pt and/or binary, ternary, quaternary alloys in the Pt—Pd—Au—Ag family, inclusive of alloys having minor non-precious metal additions, cermets composed of a precious metal, precious metal alloy, Ni metal and/or Ni alloy and an inert ceramic phase, such as alumina, or ceramic phase with minimum ionic conductivity which will not create significant parasitics, such as YSZ (yttria stabilized zirconia, also known as yttria doped zirconia, yttria doping is 3-8 mol %, preferably 3-5 mol %), ScSZ (scandia stabilized zirconia, scandia doping is 4-10 mol %, preferably 4-6 mol %), and/or conductive ceramics, such as conductive perovskites with A or B-site substitutions or doping to achieve adequate phase stability and/or sufficient conductivity as an interconnect, e.g., including at least one of LNF ($LaNi_xFe_{1-x}O_3$, preferably x=0.6), LSM ($La_{1-x}Sr_xMnO_3$, x=0.1 to 0.3), doped ceria, doped strontium titanate ($La_xSr_{1-x}TiO_{3-\delta}$, x=0.1 to 0.3) LSCM ($La_{1-x}Sr_xCr_{1-y}Mn_yO_3$, x=0.1 to 0.3 and y=0.25 to 0.75), doped yttrium chromites (such as $Y_{1-x}Ca_xCrO_{3-\delta}$, x=0.1-0.3) and/or other doped lanthanum chromites (such as $La_{1-x}Ca_xCrO_{3-\delta}$, x=0.15-0.3), and conductive ceramics, such as at least one of LNF ($LaNi_xFe_{1-x}O_3$, preferably x=0.6), LSM ($La_{1-x}Sr_xMnO_3$, x=0.1 to 0.3), doped strontium titanate, doped yttrium chromites, LSCM ($La_{1-x}Sr_xCr_{1-y}Mn_yO_3$), and other doped lanthanum chromites. In some embodiments, it is contemplated that all or part of interconnect 16 may be formed of a Ni metal cermet and/or a Ni alloy cermet in addition to or in place of the materials mentioned above. The Ni metal cermet and/or the Ni alloy cermet may have one or more ceramic phases, for example and without limitation, a ceramic phase being YSZ (yttria doping is 3-8 mol %, preferably 3-5 mol %), alumina, ScSZ (scandia doping is 4-10 mol %, preferably 4-6 mol %), doped ceria and/or $TiO_2$.

One example of materials for interconnect 16 is $y(Pd_xPt_{1-x})$-(1-y)YSZ. Where x is from 0 to 1 in weight ratio, preferably x is in the range of 0 to 0.5 for lower hydrogen flux. Y is from 0.35 to 0.80 in volume ratio, preferably y is in the range of 0.4 to 0.6.

Anode conductive layer 22 of the present embodiment is an electrode conductive layer formed of a nickel cermet, such as such as Ni—YSZ (yttria doping in zirconia is 3-8 mol %,), Ni—ScSZ (scandia doping is 4-10 mol %, preferably second doping for phase stability for 10 mol % scandia-$ZrO_2$) and/or Ni-doped ceria (such as Gd or Sm doping), doped lanthanum chromite (such as Ca doping on A site and Zn doping on B site), doped strontium titanate (such as La doping on A site and Mn doping on B site) and/or $La_{1-x}Sr_xMn_yCr_{1-y}O_3$. Alternatively, it is considered that other materials for anode conductive layer 22 may be employed such as cermets based in part or whole on precious metal. Precious metals in the cermet may include, for example, Pt, Pd, Au, Ag, and/or alloys thereof. The ceramic phase may include, for example, an inactive non-electrically conductive phase, including, for example, YSZ, ScSZ and/or one or more other inactive phases, e.g., having desired coefficients of thermal expansion (CTE) in order to control the CTE of the layer to match the CTE of the substrate and electrolyte. In some embodiments, the ceramic phase may include $Al_2O_3$ and/or a spinel such as $NiAl_2O_4$, $MgAl_2O_4$, $MgCr_2O_4$, $NiCr_2O_4$. In other embodiments, the ceramic phase may be electrically conductive, e.g., doped lanthanum chromite, doped strontium titanate and/or one or more forms of LaSrMnCrO.

One example of anode conductive layer material is 76.5% Pd, 8.5% Ni, 15% 3YSZ.

Anode 24 may be formed of xNiO-(100-x)YSZ (x is from 55 to 75 in weight ratio), yNiO-(100-y)ScSZ (y is from 55 to 75 in weight ratio), NiO-gadolinia stabilized ceria (such as 55 wt % NiO-45 wt % GDC) and/or NiO samaria stabilized ceria in the present embodiment, although other materials may be employed without departing from the scope of the present invention. For example, it is alternatively considered that anode layer 24 may be made of doped strontium titanate, and $La_{1-x}Sr_xMn_yCr_{1-y}O_3$, (such as $La_{0.75}Sr_{0.25}Mn_{0.5}Cr_{0.5}O_3$).

Electrolyte layer 26 of the present embodiment, e.g., electrolyte sub-layer 26A and/or electrolyte sub-layer 26B, may be made from a ceramic material. In one form, a proton and/or oxygen ion conducting ceramic, may be employed. In one form, electrolyte layer 26 is formed of YSZ, such as 3YSZ and/or 8YSZ. In other embodiments, electrolyte layer 26 may be formed of ScSZ, such as 4ScSZ, 6ScSz and/or 10ScSZ in addition to or in place of YSZ. In other embodiments, other materials may be employed. For example, it is alternatively considered that electrolyte layer 26 may be made of doped ceria and/or doped lanthanum gallate. In any event, electrolyte layer 26 is essentially impervious to diffusion therethrough of the fluids used by fuel cell 10, e.g., synthesis gas or pure hydrogen as fuel, as well as, e.g., air or $O_2$ as an oxidant, but allows diffusion of oxygen ions or protons.

Cathode layer 28 may be formed at least one of LSM ($La_{1-x}Sr_xMnO_3$, x=0.1 to 0.3), $La_{1-x}Sr_xFeO_3$, (such as x=0.3), $La_{1-x}Sr_xCo_yFe_{1-y}O_3$ (such as $La_{0.6}Sr_{0.4}Co_{0.2}Fe_{0.8}O_3$) and/or $Pr_{1-x}Sr_xMnO_3$ (such as $Pr_{0.8}Sr_{0.2}MnO_3$), although other materials may be employed without departing from the scope of the present invention. For example, it is alternatively considered that Ruddlesden-Popper nickelates and $La_{1-x}Ca_xMnO_3$ (such as $La_{0.8}Ca_{0.2}MnO_3$) materials may be employed.

Cathode conductive layer 30 is an electrode conductive layer formed of a conductive ceramic, for example, at least one of $LaNi_xFe_{1-x}O_3$ (such as $LaNi_{0.6}Fe_{0.4}O_3$), $La_{1-x}Sr_xMnO_3$ (such as $La_{0.75}Sr_{0.25}MnO_3$), doped lanthanum chromites (such as $La_{1-x}Ca_xCrO_{3-\delta}$, x=0.15-0.3), and/or $Pr_{1-x}Sr_xCoO_3$, such as $Pr_{0.8}Sr_{0.2}CoO_3$. In other embodiments, cathode conductive layer 30 may be formed of other materials, e.g., a precious metal cermet, although other materials may be employed without departing from the scope of the present invention. The precious metals in the precious metal cermet may include, for example, Pt, Pd, Au, Ag and/or alloys thereof. The ceramic phase may include, for example, YSZ, ScSZ and $Al_2O_3$, or other ceramic materials.

One example of cathode conductive layer materials is 80 wt % Pd-20 wt % LSM.

In the embodiment of FIG. 2, various features, components and interrelationships therebetween of aspects of an embodiment of the present invention are depicted. However, the present invention is not limited to the particular embodiment of FIG. 2 and the components, features and interrelationships therebetween as are illustrated in FIG. 2 and described herein.

In the present embodiment, anode conductive layer 22 is printed directly onto substrate 14, as is a portion of electrolyte sub-layer 26A. Anode layer 24 is printed onto anode conductive layer 22. Portions of electrolyte layer 26 are printed onto anode layer 24, and portions of electrolyte layer 26 are printed onto anode conductive layer 22 and onto substrate 14. Cathode layer 28 is printed on top of electrolyte layer 26. Portions of cathode conductive layer 30 are printed onto cathode layer 28 and onto electrolyte layer 26. Cathode layer 28 is spaced apart from anode layer 24 in a direction 32 by the local thickness of electrolyte layer 26.

Anode layer 24 includes anode gaps 34, which extend in a direction 36. Cathode layer 28 includes cathode gaps 38, which also extend in direction 36. In the present embodiment, direction 36 is substantially perpendicular to direction 32, although the present invention is not so limited. Gaps 34 separate anode layer 24 into a plurality of individual anodes 40, one for each electrochemical cell 12. Gaps 38 separate cathode layer 28 into a corresponding plurality of cathodes 42. Each anode 40 and the corresponding cathode 42 that is spaced apart in direction 32 therefrom, in conjunction with the portion of electrolyte layer 26 disposed therebetween, form an electrochemical cell 12.

Similarly, anode conductive layer 22 and cathode conductive layer 30 have respective gaps 44 and 46 separating anode conductive layer 22 and cathode conductive layer 30 into a plurality of respective anode conductor films 48 and cathode conductor films 50. The terms, "anode conductive layer" and "anode conductor film" may be used interchangeably, in as much as the latter is formed from one or more layers of the former; and the terms, "cathode conductive layer" and "cathode conductor film" may be used interchangeably, in as much as the latter is formed from one or more layers of the former.

In the present embodiment, anode conductive layer 22 has a thickness, i.e., as measured in direction 32, of approximately 5-15 microns, although other values may be employed without departing from the scope of the present invention. For example, it is considered that in other embodiments, the anode conductive layer may have a thickness in the range of 5-50 microns. In yet other embodiments, different thicknesses may be used, depending upon the particular material and application.

Similarly, anode layer 24 has a thickness, i.e., as measured in direction 32, of approximately 5-20 microns, although other values may be employed without departing from the scope of the present invention. For example, it is considered that in other embodiments, the anode layer may have a thickness in the range of 5-40 microns. In yet other embodiments, different thicknesses may be used, depending upon the particular anode material and application.

Electrolyte layer 26, including both electrolyte sub-layer 26A and electrolyte sub-layer 26B, of the present embodiment has a thickness of approximately 5-15 microns with individual sub-layer thicknesses of approximately 5 microns minimum, although other thickness values may be employed without departing from the scope of the present invention. For example, it is considered that in other embodiments, the electrolyte layer may have a thickness in the range of 5-40 microns. In yet other embodiments, different thicknesses may be used, depending upon the particular materials and application.

Cathode layer 28 has a thickness, i.e., as measured in direction 32, of approximately 10-20 microns, although other values may be employed without departing from the scope of the present invention. For example, it is considered that in other embodiments, the cathode layer may have a thickness in the range of 10-50 microns. In yet other embodiments, different thicknesses may be used, depending upon the particular cathode material and application.

Cathode conductive layer 30 has a thickness, i.e., as measured in direction 32, of approximately 5-100 microns, although other values may be employed without departing from the scope of the present invention. For example, it is considered that in other embodiments, the cathode conductive layer may have a thickness less than or greater than the range of 5-100 microns. In yet other embodiments, different thicknesses may be used, depending upon the particular cathode conductive layer material and application.

In each electrochemical cell 12, anode conductive layer 22 conducts free electrons away from anode 24 and conducts the electrons to cathode conductive layer 30 via interconnect 16. Cathode conductive layer 30 conducts the electrons to cathode 28.

Interconnect 16 is embedded in electrolyte layer 26, and is electrically coupled to anode conductive layer 22, and extends in direction 32 from anode conductive layer 22 through electrolyte sub-layer 26A toward electrolyte sub-layer 26B, then in direction 36 from one electrochemical cell 12 to the next adjacent electrochemical cell 12, and then in direction 32 again toward cathode conductive layer 30, to which interconnect 16 is electrically coupled. In particular, at least a portion of interconnect 16 is embedded within an extended portion of electrolyte layer 26, wherein the extended portion of electrolyte layer 26 is a portion of electrolyte layer 26 that extends beyond anode 40 and cathode 42, e.g., in direction 32, and is not sandwiched between anode 40 and cathode 42.

Figure 3:
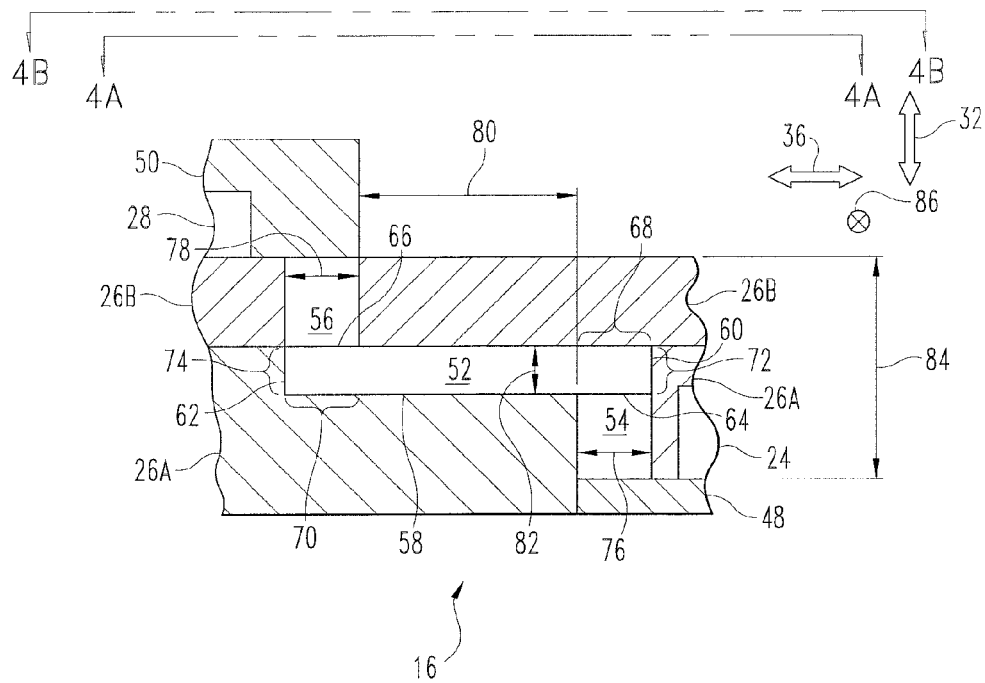
FIG. 3 is an enlarged cross sectional view of a portion of the interconnect of FIG. 2.

Referring to FIG. 3, some aspects of a non-limiting example of interconnect 16 are described in greater detail. Interconnect 16 includes a blind primary conductor 52, and two blind auxiliary conductors, or vias 54, 56. Blind primary conductor 52 is sandwiched between electrolyte sub-layer 26A and electrolyte sub-layer 26B, and is formed of a body 58 extending between a blind end 60 and a blind end 62 opposite end 60. Blind—primary conductor 52 defines a conduction path encased within electrolyte layer 26 and oriented along direction 36, i.e., to conduct a flow of electrons in a direction substantially parallel to direction 36. Blind auxiliary conductor 54 has a blind end 64, and blind auxiliary conductor 56 has a blind end 66. Blind auxiliary conductors 54 and 56 are oriented in direction 32. As that term is used herein, "blind" relates to the conductor not extending straight through electrolyte layer 26 in the direction of orientation of the conductor, i.e., in the manner of a "blind hole" that ends in a structure, as opposed to a "through hole" that passes through the structure. Rather, the blind ends face portions of electrolyte layer 26. For example, end 64 of conductor 54 faces portion 68 electrolyte sub-layer 26B and is not able to "see" through electrolyte sub-layer 26B. Similarly, end 66 of conductor 56 faces portion 70 of electrolyte sub-layer 26A and is not able to "see" through electrolyte sub-layer 26A. Likewise, ends 60 and 62 of body 58 face portions 72 and 74, respectively, and are not able to "see" through electrolyte sub-layer 26A.

In the embodiment of FIG. 3, various features, components and interrelationships therebetween of aspects of an embodiment of the present invention are depicted. However, the present invention is not limited to the particular embodiment of FIG. 3 and the components, features and interrelationships therebetween as are illustrated in FIG. 3 and described herein. It will be understood that FIG. 3 is not to scale; for example, vertical dimensions are exaggerated for purposes of clarity of illustration.

In the present embodiment, blind primary conductor 52 is a conductive film created with a screen printing process, which is embedded within electrolyte layer 26, sandwiched between electrolyte sub-layers 26A and 26B. Anode layer 24 is oriented along a first plane, cathode layer 28 is oriented along a second plane substantially parallel to the first plane, electrolyte layer 26 is oriented along a third plane substantially parallel to the first plane, and the conductive film forming blind primary conductor 52 extends in a direction substantially parallel to the first plane.

In one form, the material of blind primary conductor 52 may be a precious metal cermet or an electrically conductive ceramic. In other embodiments, other materials may be employed in addition to or in place of a precious metal cermet or an electrically conductive ceramic, e.g., a precious metal, such as Ag, Pd, Au and/or Pt, although other materials may be employed without departing from the scope of the present invention. In various embodiments, it is contemplated that one or more of many materials may be employed, including precious metal alloys, such as Ag—Pd, Ag—Au, Ag—Pt, Au—Pd, Au—Pt, Pt—Pd, Ag—Au—Pd, Ag—Au—Pt, and Ag—Au—Pd—Pt, cermets composed of precious metal or alloys, Ni metal and/or Ni alloy, and an inert ceramic phase, such as alumina, or ceramic phase with minimum ionic conductivity which will not generate significant parasitic current, such as YSZ, ScSZ, and/or conductive ceramics, such as at least one of LNF ($LaNi_xFe_{1-x}O_3$), LSM ($La_{1-x}Sr_xMnO_3$), doped strontium titanate, doped yttrium chromites, LSCM ($La_{1-x}Sr_xCr_{1-y}Mn_yO_3$), and/or other doped lanthanum chromites, and conductive ceramics, such as LNF ($LaNi_xFe_{1-x}O_3$—), for example, $LaNi_{0.6}Fe_{0.4}O_3$, LSM ($La_{1-x}Sr_xMnO_3$), such as $La_{0.75}Sr_{0.25}MnO_3$, doped strontium titanate, doped yttrium chromites, LSCM ($La_{1-x}Sr_xCr_{1-y}Mn_yO_3$), such as $La_{0.75}Sr_{0.25}Cr_{0.5}Mn_{0.5}O_3$, and other doped lanthanum chromites. In other embodiments, it is contemplated that blind primary conductor 52 may be formed of a Ni metal cermet and/or a Ni alloy cermet in addition to or in place of the materials mentioned above. The Ni metal cermet and/or the Ni alloy cermet may have one or more ceramic phases, for example and without limitation, a ceramic phase being YSZ, alumina, ScSZ, doped ceria and/or $TiO_2$. In various embodiments, blind primary conductor 52 may be formed of materials set forth above with respect to interconnect 16.

One example of materials for blind primary conductor 52 is y($Pd_xPt_{1-x}$)-(1-y)YSZ. Where x is from 0 to 1 in weight ratio. For cost reduction, x is preferred in the range of 0.5 to 1. For better performance and higher system efficiency, x is preferred in the range of 0 to 0.5. Because hydrogen has higher flux in Pd. Y is from 0.35 to 0.80 in volume ratio, preferably y is in the range of 0.4 to 0.6.

Another example of materials for blind primary conductor 52 is x % Pd-y % Ni-(100-x-y) % YSZ, where x=70-80, y=5-10.

Each of blind auxiliary conductors 54 and 56 may be formed from the same or different materials than primary conductor 52. In one form, blind auxiliary conductor 54 is formed during processing of blind primary conductor 52 and from the same material as blind primary conductor 52, whereas blind auxiliary conductor 56 is formed at the same process step as cathode conductive layer 30 and from the same material as cathode conductive layer 30. However, in other embodiments, blind primary conductor 52, blind auxiliary conductor 54 and blind auxiliary conductor 56 may be made from other material combinations without departing from the scope of the present invention.

The materials used for blind auxiliary conductor 54 and blind auxiliary conductor 56 may vary with the particular application. For example, with some material combinations, material migration may occur at the interface of interconnect 16 with anode conductive layer 22 and/or cathode conductive layer 30 during either cell fabrication or cell testing, which may cause increased resistance at the interface and higher cell degradation during fuel cell operation. Material may migrate into primary conductor 52 from anode conductive layer 22 and/or cathode conductive layer 30, and/or material may migrate from primary conductor 52 into anode conductive layer 22 and/or cathode conductive layer 30, depending upon the compositions of primary conductor 52, anode conductive layer 22 and cathode conductive layer 30. To reduce material migration at the interconnect/conductive layer interface, one or both of blind auxiliary conductor 54 and blind auxiliary conductor 56 may be formed from a material that yields an electrically conductive chemical barrier layer between primary conductor 52 and a respective one or both of anode conductive layer 22 (anode conductor film 48) and/or cathode conductive layer 30 (cathode conductor film 50). This chemical barrier may eliminate or reduce material migration during fuel cell fabrication and operation.

Materials for auxiliary conductor 54 at the interconnect 16 and anode conductive layer 22 interface that may be used to form a chemical barrier may include, but are not limited to Ni cermet, Ni-precious metal cermet and the precious metal can be Ag, Au, Pd, Pt, or the alloy of them, the ceramic phase in the cermet can be at least one of YSZ (yttria doping is 3-5 mol % in zironia), ScSZ (scandia doping is 4-6 mol % in zirconia), doped ceria (such as GDC, or SDC), alumina, and $TiO_2$, or conductive ceramics, such as doped strontium titanate, doped yttrium chromites, $La_{1-x}Sr_xCr_{1-y}Mn_yO_3$ (x=0.15-0.35, y=0.25-0.5), and other doped lanthanum chromites.

One example of auxiliary conductor 54 is 50 v %(50Pd50Pt)-50 v %3YSZ.

Another example of auxiliary conductor 54 is 15% Pd, 19% NiO, 66% NTZ, where NTZ is 73.6 wt % NiO, 20.0% $TiO_2$, 6.4% 3YSZ.

Materials for auxiliary conductor 56 at the interconnect 16 and cathode conductive layer 30 interface that may be used to form a chemical barrier may include, but are not limited to precious metal cermets having a precious metal being at least one of: Ag, Au, Pd, Pt, or its alloy, wherein the ceramic phase may be at least one of YSZ (yttria doping is preferred from 3-5 mol %), ScSZ (scandia doping is preferred from 4-6 mol %), LNF ($LaNi_xFe_{1-x}O_3$, x=0.6), LSM ($La_{1-x}Sr_xMnO_3$, x=0.1 to 0.3), doped yttrium chromites (such as $Y_{0.8}Ca_{0.2}CrO_3$), LSCM ($La_{1-x}Sr_xCr_{1-y}Mn_yO_3$), x=0.15-0.35, y=0.5-0.75), and other doped lanthanum chromites (such as $La_{0.7}Ca_{0.3}CrO_3$), or conductive ceramics, such as at least one of LNF ($LaNi_xFe_{1-x}O_3$), LSM ($La_{1-x}Sr_xMnO_3$), Ruddlesden-Popper nickelates, LSF (such as $La_{0.8}Sr_{0.2}FeO_3$), LSCF ($La_{0.6}Sr_{0.4}Co_{0.2}Fe_{0.8}O_3$), LSCM ($La_{1-x}Sr_xCr_{1-y}Mn_yO_3$), LCM (such as $La_{0.8}Ca_{0.2}MnO_3$), doped yttrium chromites and other doped lanthanum chromites.

One example for auxiliary conductor 56 is 50 v %(50Pd50Pt)-50 v %3YSZ.

Another example of auxiliary conductor 56 is 15% Pd, 19% NiO, 66% NTZ, where NTZ is 73.6 wt % NiO, 20.0% $TiO_2$, 6.4% 3YSZ.

In the present embodiment, auxiliary conductor 54 has a width 76, i.e., in direction 36, of approximately 0.4 mm, although greater or lesser widths may be used without departing from the scope of the present invention. Similarly, auxiliary conductor 56 has a width 78, i.e., in direction 36, of approximately 0.4 mm, although greater or lesser widths may be used without departing from the scope of the present invention. Primary conductor 52 has a length in direction 36 that defines a minimum diffusion distance 80 for any hydrogen that may diffuse through interconnect 16, e.g., due to sintering porosity, microcracks, voids and/or other defects introduced into interconnect 16 during processing. In the present embodiment, diffusion distance 80 is 0.6 mm, although greater or lesser widths may be used without departing from the scope of the present invention. The film thickness 82 of primary conductor 52, i.e., as measured in direction 32, is approximately 5-15 microns. The total height 84 of interconnect 16 in direction 32 is approximately 10-25 microns, which generally corresponds to the thickness of electrolyte layer 26.

The total diffusion distance for hydrogen diffusing through interconnect 16 may include the height of auxiliary conductor 54 and auxiliary conductor 56 in direction 32, which may be given by subtracting from the total height 84 the film thickness 82 of primary conductor 52, which yields approximately 10 microns. Thus, the diffusion distance is predominantly controlled by diffusion distance 80, e.g., since the heights of auxiliary conductors 54 and 56 represent only a small fraction of the total diffusion distance.

Figure 4A:
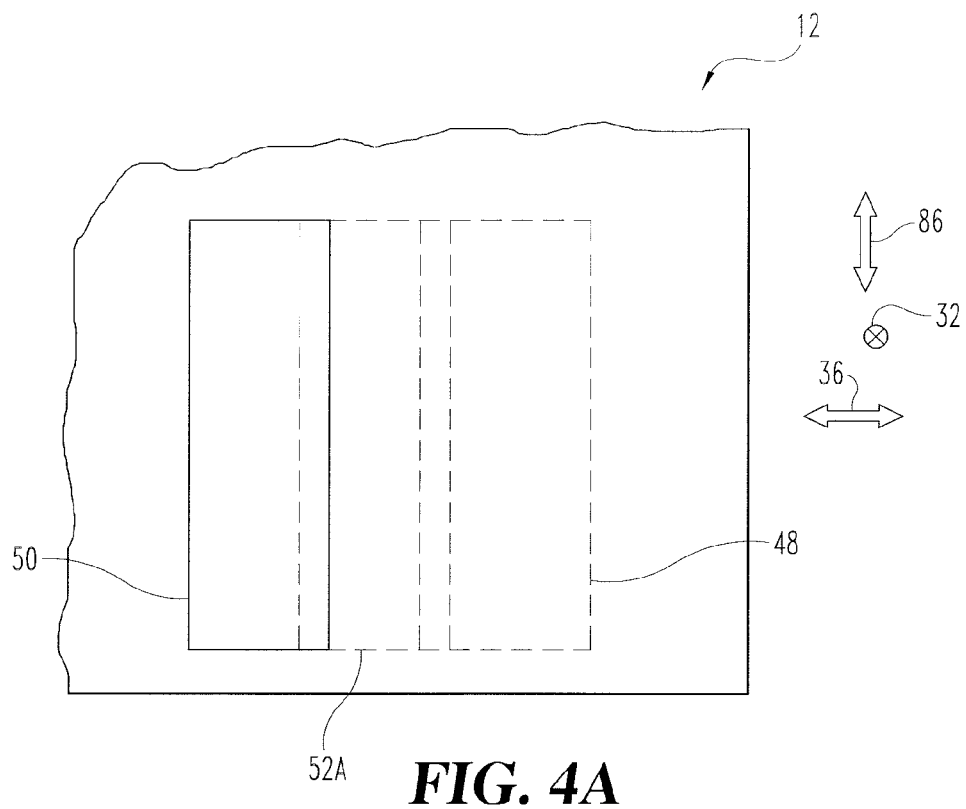
FIGS. 4A and 4B depict some alternate embodiments of interconnect configurations.
Figure 4B:
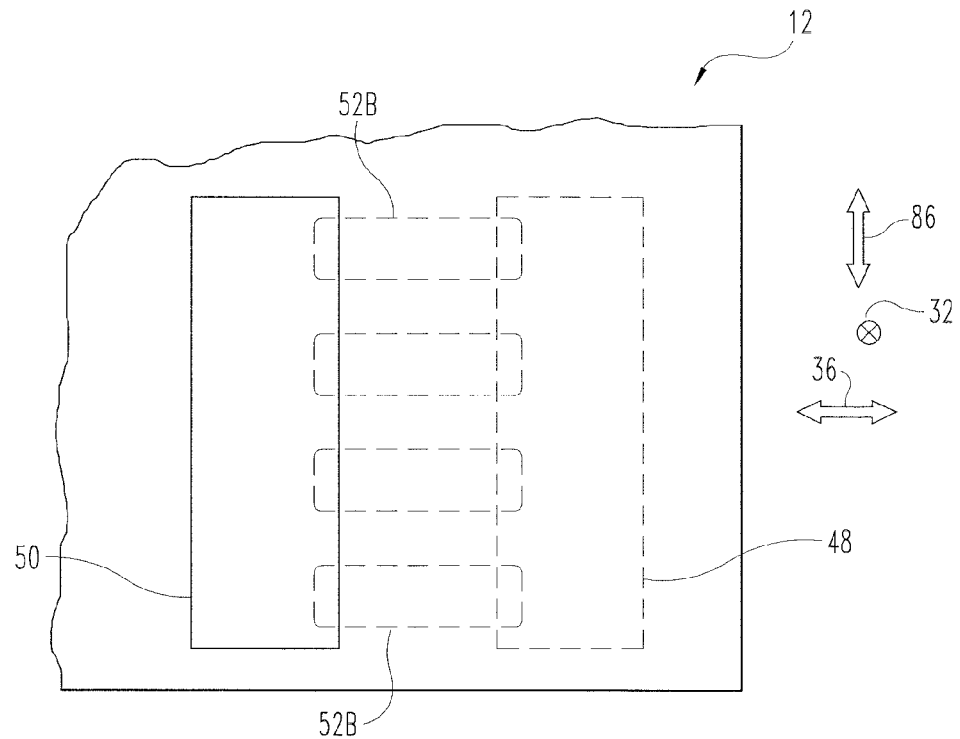

Referring to FIGS. 4A and 4B, a plan view of a continuous "strip" configuration of interconnect 16 and a plan view of a "via" configuration of interconnect 16 are respectively depicted. The term, "strip," pertains to the configuration being in the form of a single long conductor that is comparatively narrow in width as compared to length. In the strip configuration, the primary conductor takes the form of a continuous strip 52A extending in a direction 86 that in the present embodiment is substantially perpendicular to both directions 32 and 36, and runs approximately the length in direction 86 of electrochemical cell 12. In the depiction of FIGS. 4A and 4B, direction 32 extends into and out of the plane of the drawing, and hence is represented by an "X" within a circle. The term, "via," pertains to a relatively small conductive pathway through a material that connects electrical components. In the depiction of FIG. 4B, the primary conductor takes the form of a plurality of vias 52B, e.g., each having a width in direction 86 of only approximately 0.4 mm, although greater or lesser widths may be used without departing from the scope of the present invention.

In the embodiment of FIGS. 4A and 4B, various features, components and interrelationships therebetween of aspects of an embodiment of the present invention are depicted. However, the present invention is not limited to the particular embodiment of FIGS. 4A and 4B and the components, features and interrelationships therebetween as are illustrated in FIGS. 4A and 4B and described herein.

Referring again to FIG. 3, in conjunction with FIGS. 4A and 4B, the minimum diffusion area of interconnect 16 is controlled by the diffusion area of primary conductor 52, which serves as a diffusion flow orifice that restricts the diffusion of fluid. For example, if, for any reason, primary conductor 52 is not non-porous, fluid, e.g., oxidant and fuel in liquid and/or gaseous form may diffuse through interconnect 16. Such diffusion is controlled, in part, by the film thickness 82. In the "strip" configuration, the diffusion area is given by the width of continuous strip 52A in direction 86 times the film thickness 82, whereas in the "via" configuration, the diffusion area is given by the width of each via 52B in direction 86 times the film thickness 82 times the number of vias 52B.

Although it may be possible to employ an interconnect that extends only in direction 32 from anode conductor film 48 to cathode conductor film 50 (assuming that cathode conductor film 50 were positioned above anode conductor films 48 in direction 36), such a scheme would result in higher leakage than were the interconnect of the present invention employed.

Figure 5:
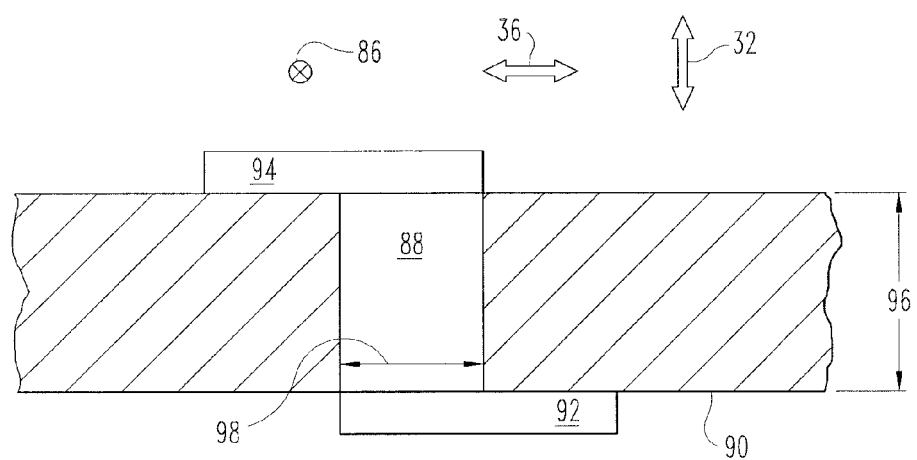
FIG. 5 depicts a hypothetical interconnect that is contrasted herein with embodiments of the present invention.

For example, referring to FIG. 5, some aspects of a non-limiting example of an interconnect 88 are depicted, wherein interconnect 88 in the form of a via passing through an electrolyte layer 90, which is clearly not embedded in electrolyte layer 90 or sandwiched between sub-layers of electrolyte layer 90, and does not include any blind conductors. Interconnect 88 transfers electrical power from an anode conductor 92 to a cathode conductor 94. For purposes of comparison, the length 96 of interconnect 88 in direction 32, which corresponds to the thickness of electrolyte layer 90, is assumed to be the 10-15 microns, e.g., similar to interconnect 16, and the width of interconnect 88, e.g., the width of the open slot in the electrolyte 96 into which interconnect 88 is printed, in direction 36 is assumed to be the minimum printable via dimension 98 in direction 36 with current industry technology, which is approximately 0.25 mm. The length of interconnect 88 in direction 86 is assumed to be 0.4 mm. Thus, with interconnect 88, the diffusion flow area for one via is approximately 0.25 mm times 0.4 mm, which equals 0.1 mm$^2$. The limiting dimension is the minimum 0.25 mm screen printed via dimension 98.

With the present invention, however, assuming via 52B (FIG. 4B) to have the same length in direction 86 of 0.4 mm, the diffusion flow area for one via of 0.4 mm times the film thickness in direction 32 of 0.010 mm (10 microns) equals 0.004 mm$^2$, which is only 4 percent of the flow area of interconnect 88. Thus, by employing a geometry that allows a reduction of the minimum dimension that limits a minimum diffusion flow area, the diffusion flow area of the interconnect may be reduced, thereby potentially decreasing diffusion of oxidant and/or fuel through the interconnector, e.g., in the event the interconnect is not fully non-porous (such as, for example, due to process limitations and/or manufacturing defects), or the interconnect is a mixed ion and electronic conductor.

Further, the diffusion distance in interconnect 88 corresponds to the thickness 96 of interconnect 88, which in the depicted example is also the thickness of electrolyte layer 90, i.e., 10-15 microns.

In contrast, the diffusion distance of the inventive blind primary connector 52, whether in the form of a continuous strip 52A or a via 52B, is diffusion distance 80, which is 0.6 mm, and which is 40-60 times the diffusion distance of interconnect 88 (0.6 mm divided by 10-15 microns), which is many times the thickness of the electrolyte. Thus, by employing a geometry wherein the diffusion distance extends in a direction not limited by the thickness of the electrolyte, the diffusion distance of the interconnect may be substantially increased, thereby potentially decreasing diffusion of oxidant and/or fuel through the interconnector.

Generally, the flow of fuel and/or air through an interconnect made from a given material and microstructure depends on the flow area and flow distance. Some embodiments of the present invention may reduce fuel and/or air flow through the interconnect by $10^2$ to $10^4$ magnitude, e.g., if the connector is not non-porous, depending on the specific dimension of the interconnect used.

For example, processing-related defects such as sintering porosity, microcracks and voids are typically from sub-microns to a few microns in size (voids) or a few microns to 10 microns (microcracks). With a diffusion distance of only 10-15 microns, the presence of a defect may provide a direct flowpath through the interconnect, or at least decrease the diffusion distance by a substantial percentage. For example, assume a design diffusion distance of 10 microns. In the presence of a 10 micron defect, a direct flowpath for the flow of hydrogen and/or oxidant would occur, since such a defect would open a direct pathway through the interconnect (it is noted that the anode/conductive layer and cathode/conductive layer are intentionally porous). Even assuming a design diffusion distance of 15 microns in the presence of a 10 micron defect, the diffusion distance would be reduced by 67%, leaving a net diffusion distance of only 5 microns.

On the other hand, a 10 micron defect in the inventive interconnect 16 would have only negligible effect on the 0.6 mm design diffusion distance of primary conductor 52, i.e., reducing the 0.6 mm design diffusion distance to 0.59 mm, which is a relatively inconsequential reduction caused by the presence of the defect.

Figure 6A:
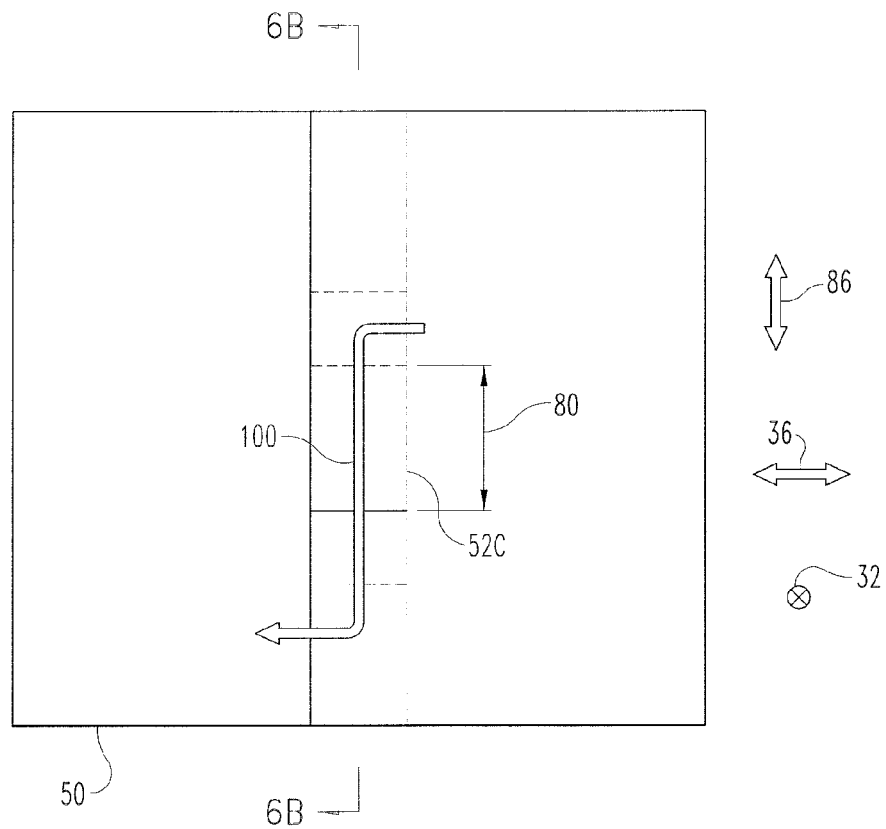
FIGS. 6A and 6B show a top view and a side view, respectively, of some aspects of a non-limiting example of yet another embodiment of an interconnect.
Figure 6B:
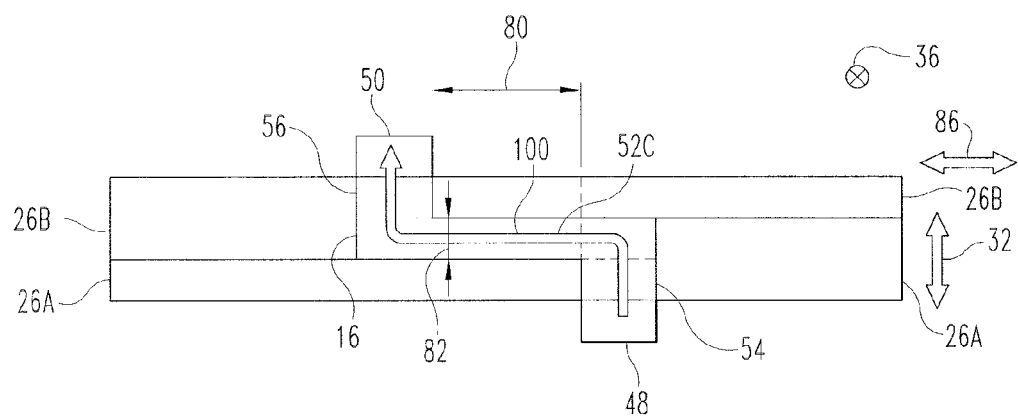

Referring to FIGS. 6A and 6B, some aspects of a non-limiting example of an embodiment of the present invention having a blind primary conductor in the form of a via 52C extending in direction 86 are depicted. In the depiction of FIG. 6A, direction 32 extends into and out of the plane of the drawing, and hence is represented by an "X" within a circle. In the depiction of FIG. 6B, direction 36 extends into and out of the plane of the drawing, and hence is represented by an "X" within a circle. Via 52C is similar to via 52B, except that it extends in direction 86 rather than direction 36, for example, as indicated by diffusion distance 80 being oriented in direction 86. It will be understood that although FIGS. 6A and 6B depict only a single via 52C, embodiments of the present invention may include a plurality of such vias extending along direction 86.

The direction of electron flow in FIGS. 6A and 6B is illustrated by three dimensional flowpath line 100. Electrons flow in direction 36 through anode conductor film 48 toward auxiliary conductor 54, and then flow in direction 32 through auxiliary conductor 54 toward via 52C. The electrons then flow in direction 86 through via 52C toward auxiliary conductor 56, and then flow in direction 32 through auxiliary conductor 56 into cathode conductor film 50, after which the electrons flow in direction 36 through cathode conductor film 50, e.g., to the next electrochemical cell.

In the embodiment of FIGS. 6A and 6B, various features, components and interrelationships therebetween of aspects of an embodiment of the present invention are depicted. However, the present invention is not limited to the particular embodiment of FIGS. 6A and 6B and the components, features and interrelationships therebetween as are illustrated in FIGS. 6A and 6B and described herein.

Figure 7:
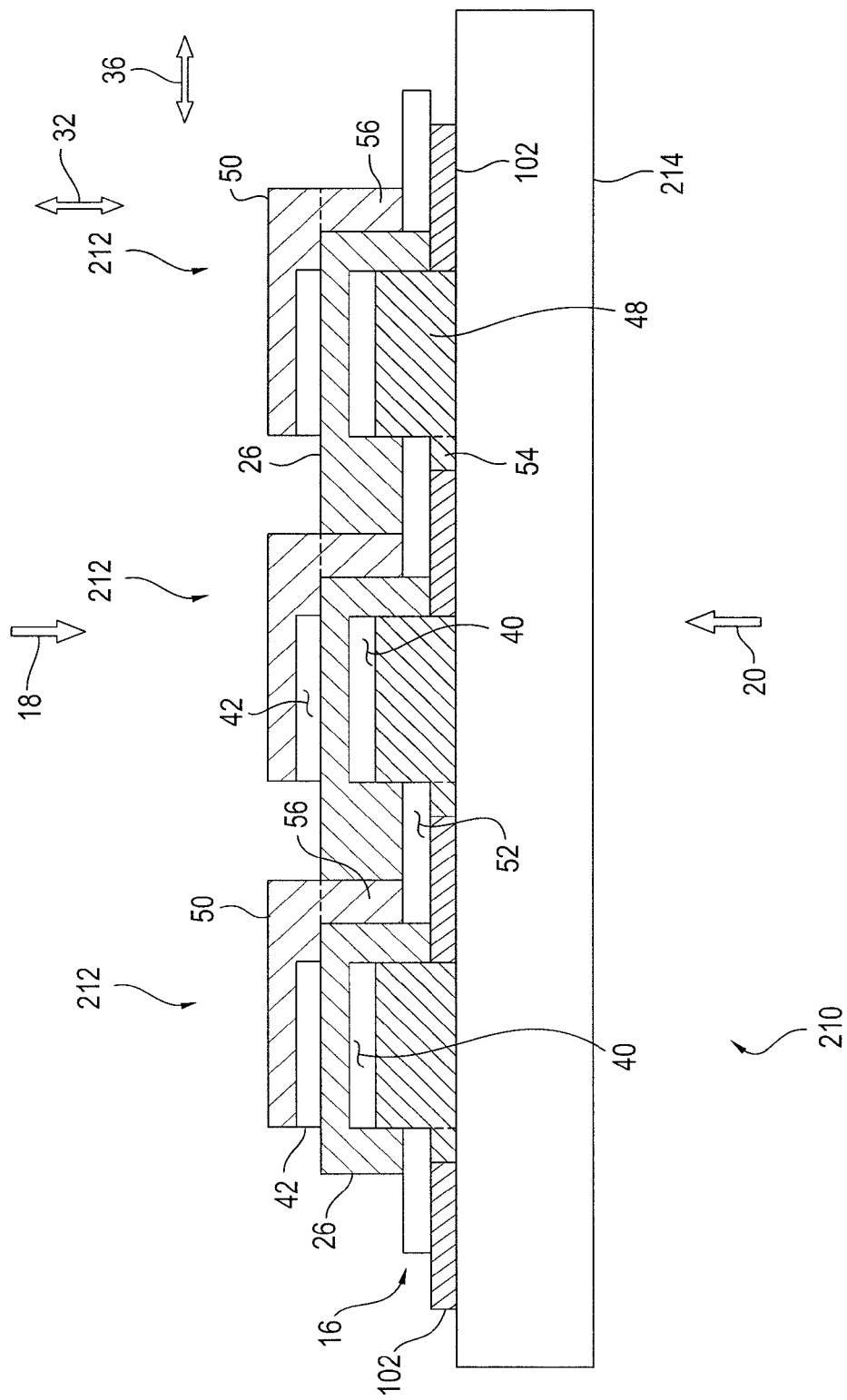
FIG. 7 schematically depicts some aspects of a non-limiting example of a cross section of a fuel cell system having a ceramic seal in accordance with an embodiment of the present invention.

Referring to FIG. 7, some aspects of a non-limiting example of an embodiment of a fuel cell system 210 are schematically depicted. Fuel cell system 210 includes a plurality of electrochemical cells 212 disposed on a substrate 214, each electrochemical cell 212 having a seal in the form of a ceramic seal 102. Fuel cell system 210 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 214. In the embodiment of FIG. 7, auxiliary conductor 56 of interconnect 16 is formed of the same material as cathode conductor film 50, whereas auxiliary conductor 54 of interconnect 16 is formed of the same material as anode conductor film 48. Blind primary conductor 52 of interconnect 16 is formed of the same material described above with respect to interconnect 16 in the embodiment of FIG. 2. In other embodiments, for example, auxiliary conductor 54 and/or auxiliary conductor 56 may be formed of the same material as blind primary conductor 52, or may be formed of different materials. In one form, blind primary conductor 52 is in the form of a continuous strip, e.g., continuous strip 52A depicted in FIG. 4A. In another form, blind primary conductor 52 is in the form of a plurality of vias, such as vias 52B in FIG. 4B. In other embodiments, blind primary conductor 52 may take other forms not explicitly set forth herein.

In one form, ceramic seal 102 is applied onto porous substrate 214, and is positioned horizontally (in the perspective of FIG. 7) between the anode conductor film 48 of one electrochemical cell 212 and the auxiliary conductor 54 of the adjacent electrochemical cell 212. In other embodiments, ceramic seal 102 may be located in other orientations and locations. Ceramic seal 102 has a thickness, i.e., as measured in direction 32, of approximately 5-30 microns, although other thickness values may be employed in other embodiments. In one form, ceramic seal 102 is impervious to gases and liquids, such as the fuel and oxidants employed by electrochemical cells 212, and is configured to prevent the leakage of gases and liquids from substrate 214 in those areas where it is applied. In other embodiments, ceramic seal 102 may be substantially impervious to gases and liquids, and may be configured to reduce leakage of gases and liquids from substrate 214 in those areas where it is applied, e.g., relative to other configurations that do not employ a ceramic seal. Ceramic seal 102 is configured to provide an essentially "gas-tight" seal between substrate 214 and fuel cell components disposed on the side of ceramic seal 102 opposite of that of substrate 214.

In one form, ceramic seal 102 is positioned to prevent or reduce leakage of gases and liquids from substrate 214 into interconnect 16. In one form, ceramic seal 102 extends in direction 36, and is positioned vertically (in direction 32) between porous substrate 214 on the bottom and blind primary conductor 52 of interconnect 16 and electrolyte 26 on the top, thereby preventing the leakages of gases and liquids into the portions of blind primary conductor 52 (and electrolyte 26) that are overlapped by ceramic seal 102. In other embodiments, ceramic seal 102 may be disposed in other suitable locations in addition to or in place of that illustrated in FIG. 7. Blind primary conductor 52 is embedded between a portion of ceramic seal 102 on the bottom and a portion of extended electrolyte 26 on the top. The diffusion distance in the embodiment of FIG. 7 is primarily defined by the length of the overlap of interconnect 16 by both ceramic seal 102 and electrolyte 26 in direction 36. In one form, the overlap is 0.3-0.6 mm, although in other embodiments, other values may be employed. Interconnect 16 extends into the active electrochemical cell 212 area. In some embodiments, the primary interconnect area of the configuration illustrated in FIG. 7 may be smaller than other designs, which may increase the total active cell area on substrate 214, which may increase the efficiency of fuel cell system 210.

Ceramic seal 102 is formed from a ceramic material. In one form, the ceramic material used to form ceramic seal 102 is yittria stabilized zirconia, such as 3YSZ. In another form, the material used to form ceramic seal 102 is scandia stabilized zirconia, such as 4ScSZ. In another form, the material used to form ceramic seal 102 is alumina. In another form, the material used to form ceramic seal 102 is non-conductive pyrochlore materials, such as $La_2Zr_2O_7$. Other embodiments may employ other ceramics, e.g., depending upon various factors, such as compatibility with the materials of adjacent portions of each electrochemical cell 212 and substrate 214, the fuels and oxidants employed by fuel cell system 210, and the local transient and steady-state operating temperatures of fuel cell system 210. Still other embodiments may employ materials other than ceramics.

In the embodiment of FIG. 7, various features, components and interrelationships therebetween of aspects of an embodiment of the present invention are depicted. However, the present invention is not limited to the particular embodiment of FIG. 7 and the components, features and interrelationships therebetween as are illustrated in FIG. 7 and described herein.

Figure 8:
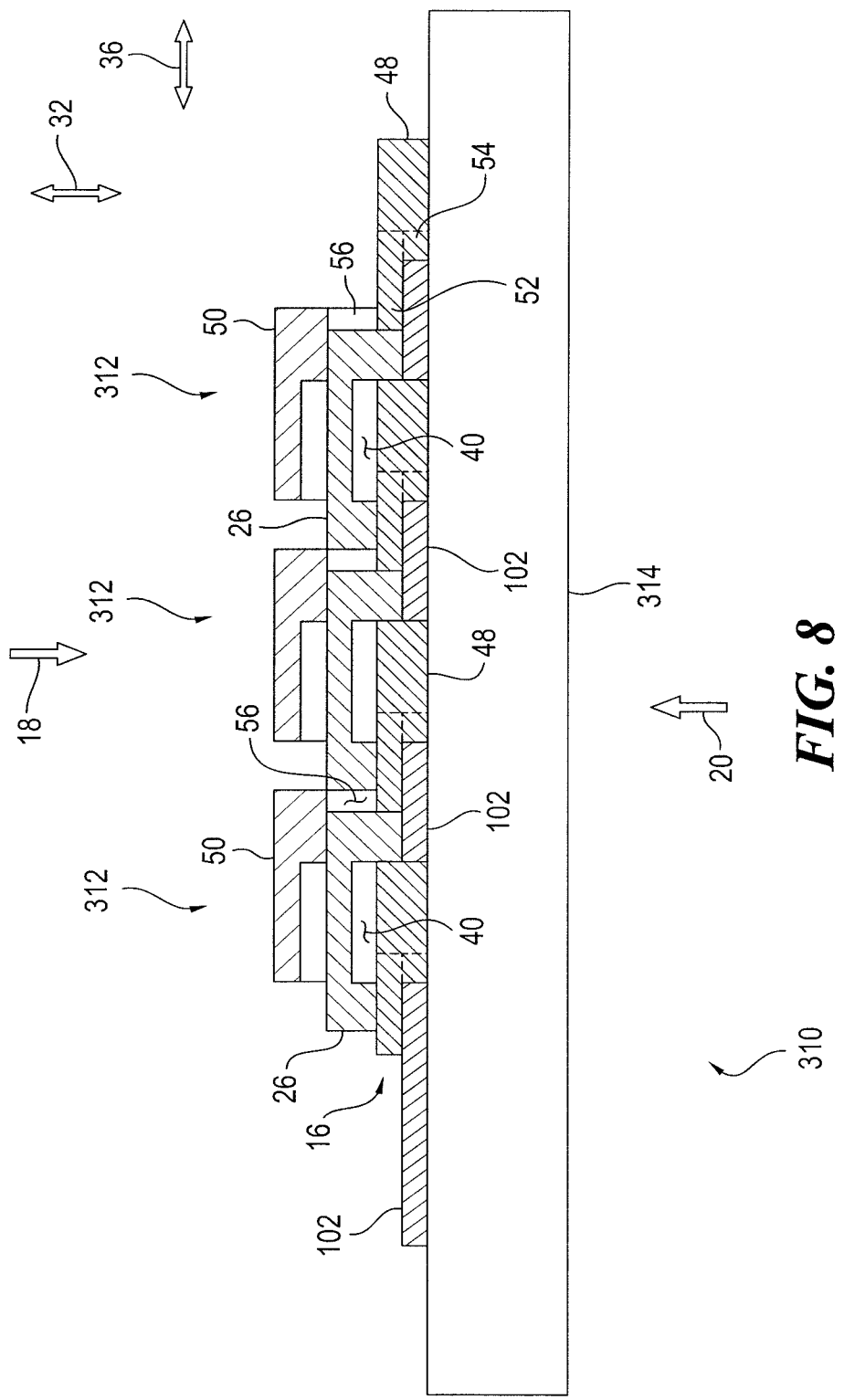
FIG. 8 schematically depicts some aspects of a non-limiting example of a cross section of another embodiment of a fuel cell system having a ceramic seal.

Referring to FIG. 8, some aspects of a non-limiting example of an embodiment of a fuel cell system 310 are schematically depicted. Fuel cell system 310 includes a plurality of electrochemical cells 312 disposed on a substrate 314, each electrochemical cell 312 including a ceramic seal 102. Fuel cell system 310 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42; anode conductor films 48 and cathode conductor films 50. The description of substrate 14 applies equally to substrate 314. In the embodiment of FIG. 8, interconnect 16 is formed predominantly by the material of anode conductor film 48, and hence, blind primary conductor 52 and auxiliary conductor 54 in the embodiment of FIG. 8 may be considered as extensions of anode conductor film 48. For example, blind primary conductor 52 and auxiliary conductor 54 are depicted as being formed by the material of anode conductor film 48, whereas auxiliary conductor 56 is formed of the materials set forth above for interconnect 16 in the embodiment of FIG. 2. In one form, blind primary conductor 52 is in the form of a continuous strip, e.g., continuous strip 52A depicted in FIG. 4A. In another form, blind primary conductor 52 is in the form of a plurality of vias, such as vias 52B in FIG. 4B. In other embodiments, blind primary conductor 52 may take other forms not explicitly set forth herein.

Ceramic seal 102 is positioned to prevent or reduce leakage of gases and liquids from substrate 314 into interconnect 16. In one form, ceramic seal 102 is positioned vertically (in direction 32) between porous substrate 314 on the bottom and blind primary conductor 52 and electrolyte 26 on the top, thereby preventing the leakages of gases and liquids into the portions of blind primary conductor 52 that are overlapped by ceramic seal 102. Blind primary conductor 52 is embedded between a portion of ceramic seal 102 on the bottom and extended electrolyte 26 on the top. The diffusion distance in the embodiment of FIG. 8 is primarily defined by the length of the overlap of interconnect 16 by both ceramic seal 102 and electrolyte 26 in direction 36. In one form, the overlap is 0.3-0.6 mm, although in other embodiments, other values may be employed.

Figure 9:
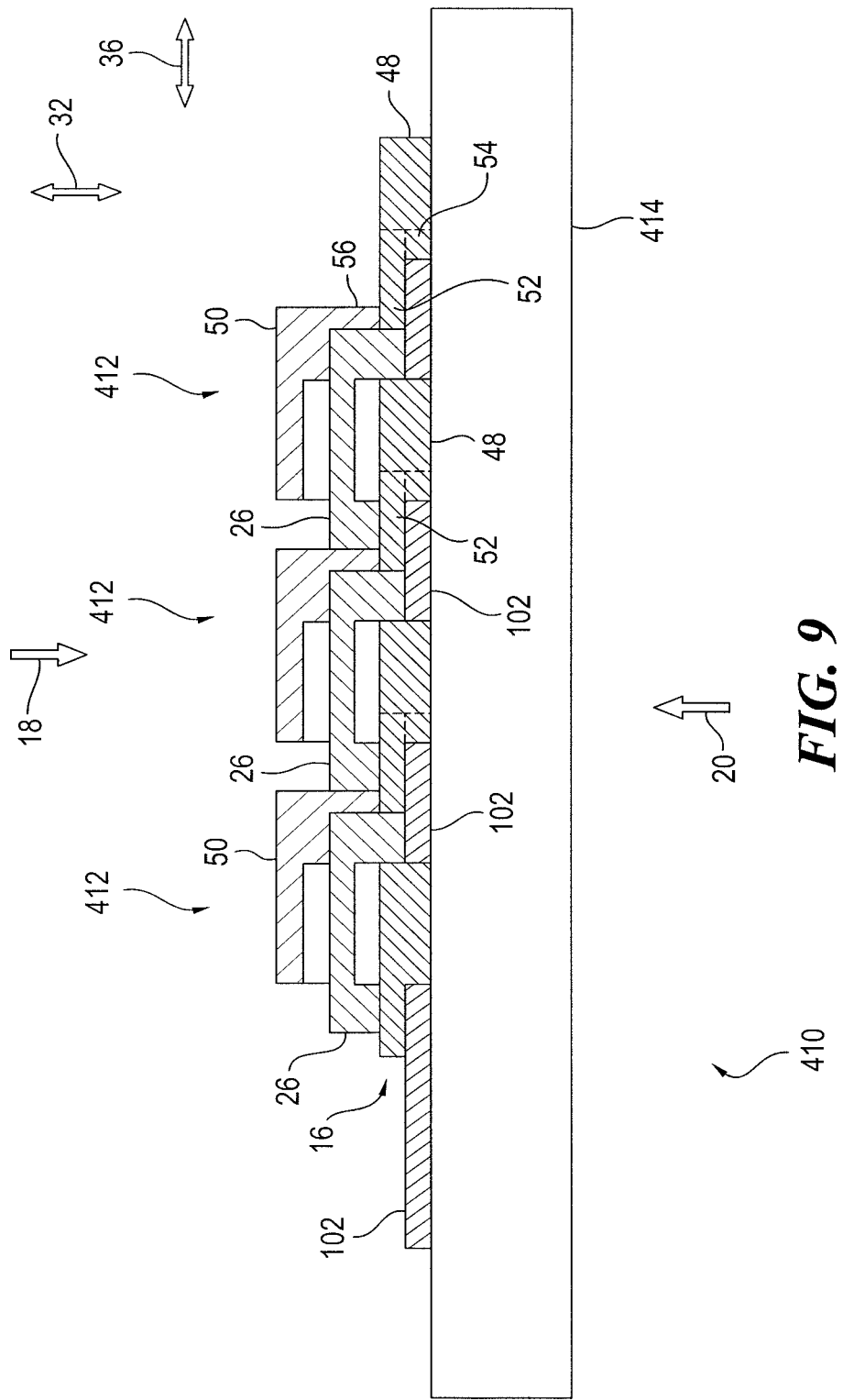
FIG. 9 schematically depicts some aspects of a non-limiting example of a cross section of yet another embodiment of a fuel cell system having a ceramic seal.

Because ceramic seal 102 prevents the ingress of gas and liquids into electrochemical cell 312, interconnect 16 does not need to be as dense (in order to prevent or reduce leakage) as other designs that do not include a seal, such as ceramic seal 102. In such designs, interconnect 16 may be formed of the materials used to form anode conductor layer 48 and/or cathode conductor layer 50. For example, referring to FIG. 9, an embodiment is depicted wherein interconnect 16 is formed entirely of the materials used to form anode conductor layer 48 and cathode conductor layer 50. FIG. 9 schematically depicts some aspects of a non-limiting example of an embodiment of a fuel cell system 410. Fuel cell system 410 includes a plurality of electrochemical cells 412 disposed on a substrate 414, each electrochemical cell 412 including a ceramic seal 102. Fuel cell system 410 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 414. In the embodiment of FIG. 9, blind primary conductor 52 and auxiliary conductor 54 are formed of the same material used to form anode conductor film 48, and are formed in the same process steps used to form anode conductor film 48. Hence, blind primary conductor 52 and auxiliary conductor 54 in the embodiment of FIG. 9 may be considered as extensions of anode conductor film 48. Similarly, in the embodiment of FIG. 9, auxiliary conductor 56 is formed of the same material used to form cathode conductor film 50, and is formed in the same process steps used to form cathode conductor film 50. Hence, auxiliary conductor 56 in the embodiment of FIG. 9 may be considered as an extension of cathode conductor film 50.

In the embodiments of FIGS. 8 and 9, various features, components and interrelationships therebetween of aspects of embodiments of the present invention are depicted. However, the present invention is not limited to the particular embodiments of FIGS. 8 and 9 and the components, features and interrelationships therebetween as are illustrated in FIGS. 8 and 9 and described herein.

Referring to FIGS. 10-15 generally, the inventors have determined that material diffusion between the interconnect and adjacent components, e.g., an anode and/or an anode conductor film and/or cathode and/or cathode conductor film, may adversely affect the performance of certain fuel cell systems. Hence, some embodiments of the present invention include an electrically conductive chemical barrier (e.g., as discussed above, and/or chemical barrier 104, discussed below with respect to FIGS. 10-15) to prevent or reduce such material diffusion. In various embodiments, chemical barrier 104 may be configured to prevent or reduce material migration or diffusion at the interface between the interconnect and an anode, and/or between the interconnect and an anode conductor film, and/or between the interconnect and a cathode, and/or between the interconnect and a cathode conductor film which may improve the long term durability of the interconnect. For example, without a chemical barrier, material migration (diffusion) may take place at the interface between an interconnect formed of a precious metal cermet, and an anode conductor film and/or anode formed of a Ni-based cermet. The material migration may take place in both directions, e.g., Ni migrating from the anode conductive layer/conductor film and/or anode into the interconnect, and precious metal migrating from the interconnect into the conductive layer/conductor film and/or anode. The material migration may result in increased porosity at or near the interface between the interconnect and the anode conductor film and/or anode, and may result in the enrichment of one or more non or low-electronic conducting phases at the interface, yielding a higher area specific resistance (ASR), and hence resulting in reduced fuel cell performance. Material migration between the interconnect and the cathode and/or between the interconnect and the cathode conductor film may also or alternatively result in deleterious effects on fuel cell performance.

Accordingly, some embodiments employ a chemical barrier, e.g., chemical barrier 104, that is configured to prevent or reduce material migration or diffusion at the interface between the interconnect and an adjacent electrically conductive component, such as one or more of an anode, an anode conductive layer/conductor film, a cathode and/or a cathode conductive layer/conductor film, and hence prevent or reduce material migration (diffusion) that might otherwise result in deleterious effect, e.g., the formation of porosity and the enrichment of one or more non or low-electronic conducting phases at the interface. Chemical barrier 104 may be formed of one or both of two classes of materials; cermet and/or conductive ceramic. For the cermet, the ceramic phase may be one or more of an inert filler; a ceramic with low ionic conductivity, such as YSZ; and an electronic conductor. In various embodiments, e.g., for the anode side (e.g., for use adjacent to an anode and/or anode conductive layer/conductor film), chemical barrier 104 may be formed of one or more materials, including, without limitation, Ni cermet or Ni-precious metal cermet. The precious metal phase may be, for example and without limitation, one or more of Ag, Au, Pd, Pt, or one or more alloys of Ag, Au, Pd and/or Pt. The ceramic phase in the cermet may be, for example and without limitation, be at least one of YSZ (such as 3YSZ), ScSZ (such as 4ScSZ), doped ceria (such as $Gd_{0.1}Ce_{0.9}O_2$), $SrZrO_3$, pyrochlores of the composition $(M_{RE})_2Zr_2O_7$ (where $M_{RE}$=one or more rare earth cations, for example and without limitation La, Pr, Nd, Gd, Sm, Ho, Er, and/or Yb), for example and without limitation, $La_2Zr_2O_7$ and $Pr_2Zr_2O_7$, alumina, and $TiO_2$, or one or more electronically conductive ceramics, such as doped ceria (higher electronic conductivity at lower oxygen partial pressure to provide low enough ASR due to thin film), doped strontium titanate, LSCM ($La_{1-x}Sr_xCr_{1-y}Mn_yO_3$, x=0.15-0.35, y=0.25-0.5), and/or other doped lanthanum chromites and doped yttria chromites. In various embodiments, e.g., for the cathode side (e.g., for use adjacent to a cathode and/or cathode conductive layer/conductor film), chemical barrier 104 may be formed of one or more materials, including, without limitation precious metal cermet. The precious metal phase may be, for example and without limitation, one or more of Ag, Au, Pd, Pt, or one or more alloys of Ag, Au, Pd and/or Pt. The ceramic phase in the cermet may be, for example and without limitation, be at least one of YSZ, ScSZ, doped ceria, $SrZrO_3$, pyrochlores of the composition $(M_{RE})_2Zr_2O_7$ (where $M_{RE}$=one or more rare earth cations, for example and without limitation La, Pr, Nd, Gd, Sm, Ho, Er, and/or Yb), for example and without limitation, $La_2Zr_2O_7$ and $Pr_2Zr_2O_7$, alumina, and $TiO_2$, or one or more electronically conductive ceramics, such as LNF ($LaNi_xFe_{1-x}O_3$, such as x=0.6) LSM ($La_{1-x}Sr_xMnO_3$, x=0.15-0.3), LCM (such as $La_{0.8}Ca_{0.2}MnO_3$), Ruddlesden-Popper nickelates, LSF (such as $La_{0.8}Sr_{0.2}FeO_3$), LSCF ($La_{0.6}Sr_{0.4}Co_{0.2}Fe_{0.8}O_3$), LSCM ($La_{1-x}Sr_xCr_{1-y}Mn_yO_3$, x=0.15-0.35, y=0.5-0.75) doped yttrium chromites, and other doped lanthanum chromites. The selection of the specific material(s) for chemical barrier 104 may vary with the needs of the application, e.g., depending upon cost, ease of manufacturing, the type of materials used for the component(s) electrically adjacent to interconnect 16 and/or one of its subcomponents, e.g., blind primary conductor 52, auxiliary conductor 54 and auxiliary conductor 56.

One example of anode side chemical barrier materials is 15% Pd, 19% NiO, 66% NTZ, where NTZ is 73.6 wt % NiO, 20.0% $TiO_2$, 6.4% YSZ.

Another example of anode side chemical barrier materials is doped ceria, such as $Gd_{0.1}Ce_{0.9}O_2$.

Experimental testing with a chemical barrier, such as chemical barrier 104, in a fuel cell system yielded approximately 0.1% per thousand hour degradation rate in cell power output over the course of 1300 hours of testing using a chemical barrier formed of 30 wt % Pd-70 wt % NTZ cermet (NTZ=$NiO_2$-3YSZ), disposed between an interconnect formed of 65Pd35Pt—YSZ cermet and an anode conductive layer formed of 20 wt % Pd—Ni-spinel. In a comparative test, but without the inclusion of a chemical barrier, such as chemical barrier 104, an interconnect formed of 50 v % (96Pd6Au)-50 v % YSZ cermet directly interfacing with an anode conductive layer formed of 20 wt % Pd—Ni-spinel showed significant degradation in about 10 hours of testing, and fuel cell failure at about 25 hours of testing resulting from material migration between the interconnect and the anode conductive layer. In another test, two fuel cells were tested using a chemical barrier 104 formed of a conductive ceramic (10 mol % Gd doped $CeO_2$) disposed between disposed between an anode conductor film and an interconnect. ASR for the interconnect showed no degradation after approximately 8000 hours of testing, and instead showed slight improvement, yielding final values of 0.05 ohm-$cm^2$ and 0.06 ohm-$cm^2$ in the two test articles.

Figure 10:
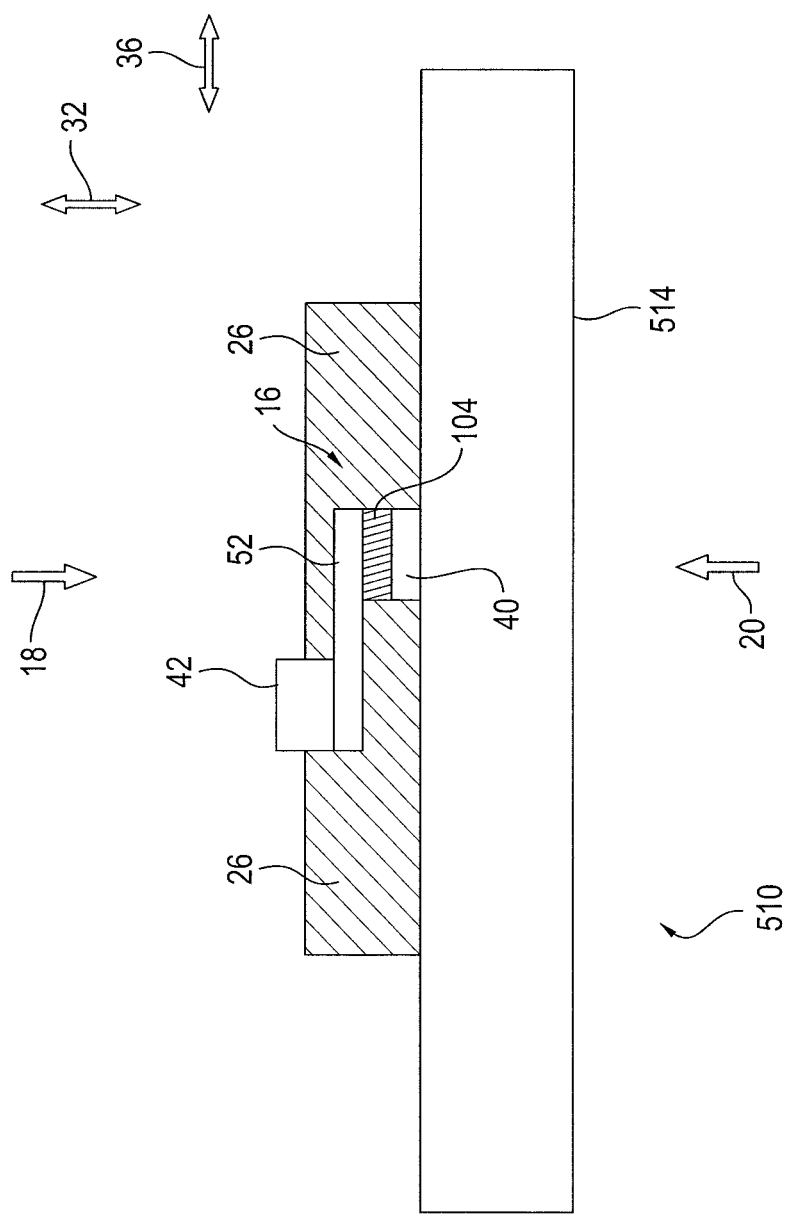
FIG. 10 schematically depicts some aspects of a non-limiting example of a cross section of an embodiment of the present invention having a chemical barrier.

Referring to FIG. 10, some aspects of a non-limiting example of an embodiment of a fuel cell system 510 disposed on a substrate 514 are schematically depicted. Fuel cell system 510 includes a chemical barrier 104. Fuel cell system 510 also includes some the components set forth above and described with respect to fuel cell system 10, e.g., including an interconnects 16 having a blind primary conductor 52; an oxidant side 18; a fuel side 20; electrolyte layers 26; anodes 40; and cathodes 42. Although only a single instance of interconnect 16, blind primary conductor 52, anode 40 and cathode 42 are depicted, and two instances of electrolyte layers 26 are depicted, it will be understood that fuel cell system 510 may include a plurality of each such components, e.g., arranged in series in direction 36, e.g., similar to embodiments described above. The description of substrate 14 applies equally to substrate 514. In fuel cell system 510, chemical barrier 104 is disposed between anode 40 and interconnect 16 (blind primary conductor 52), extending in direction 32 between anode 40 and interconnect 16, and is configured to prevent material migration between anode 40 and interconnect 16 (blind primary conductor 52). Chemical barrier 104 may be formed from one or more of the materials set forth above with respect to the embodiments of FIGS. 10-15.

Figure 11:
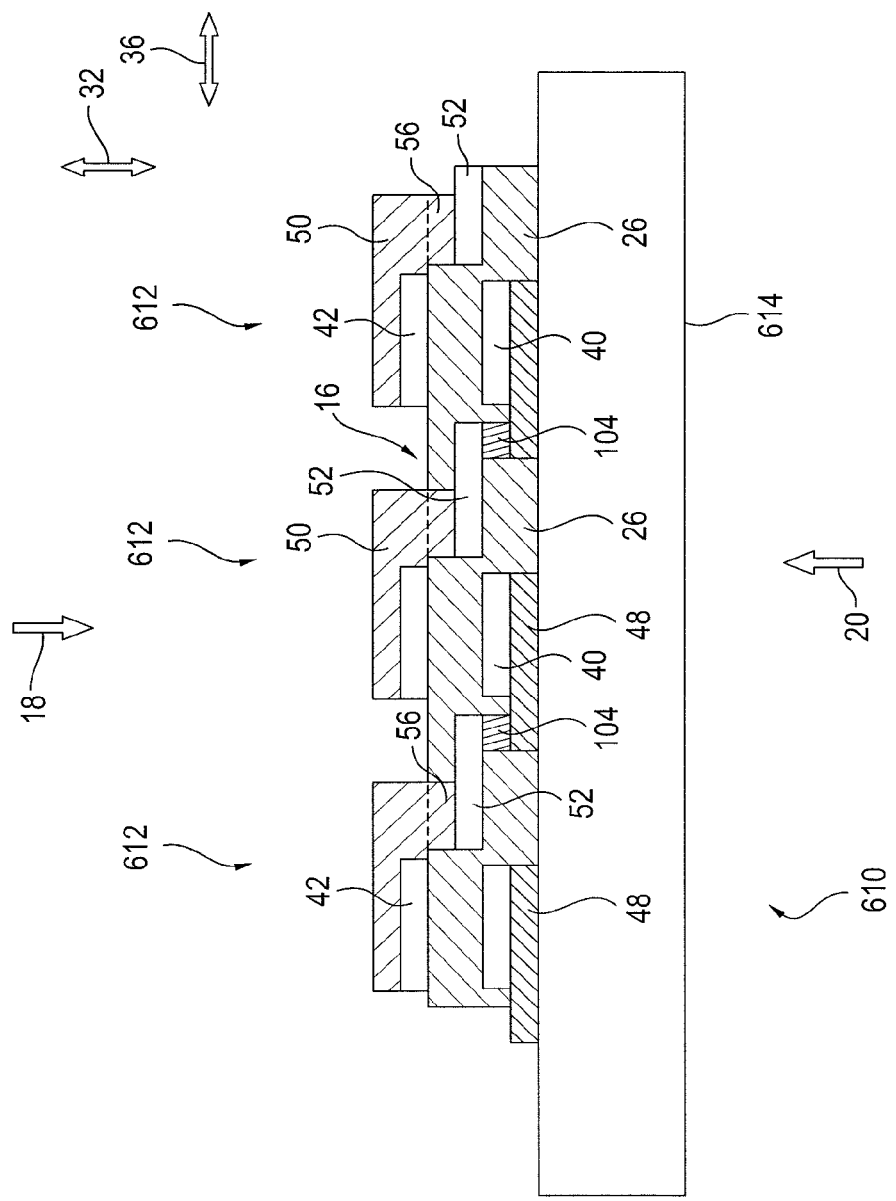
FIG. 11 schematically depicts some aspects of a non-limiting example of a cross section of an embodiment of the present invention having a chemical barrier.

Referring to FIG. 11, some aspects of a non-limiting example of an embodiment of a fuel cell system 610 are schematically depicted. Fuel cell system 610 includes a plurality of electrochemical cells 612 disposed on a substrate 614, each electrochemical cell 612 including a chemical barrier 104. Fuel cell system 610 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 614. In fuel cell system 610, chemical barrier 104 is disposed between anode conductor film 48 and interconnect 16 (blind primary conductor 52), extending in direction 32 between anode conductor film 48 and interconnect 16, and is configured to prevent material migration between anode conductor film 48 and interconnect 16 (blind primary conductor 52). Chemical barrier 104 may be formed from one or more of the materials set forth above with respect to the embodiments of FIGS. 10-15. In fuel cell system 610, a portion of electrolyte layer 26 is disposed between anode 40 and chemical barrier 104, extending in direction 36 between anode 40 and chemical barrier 104.

Figure 12:
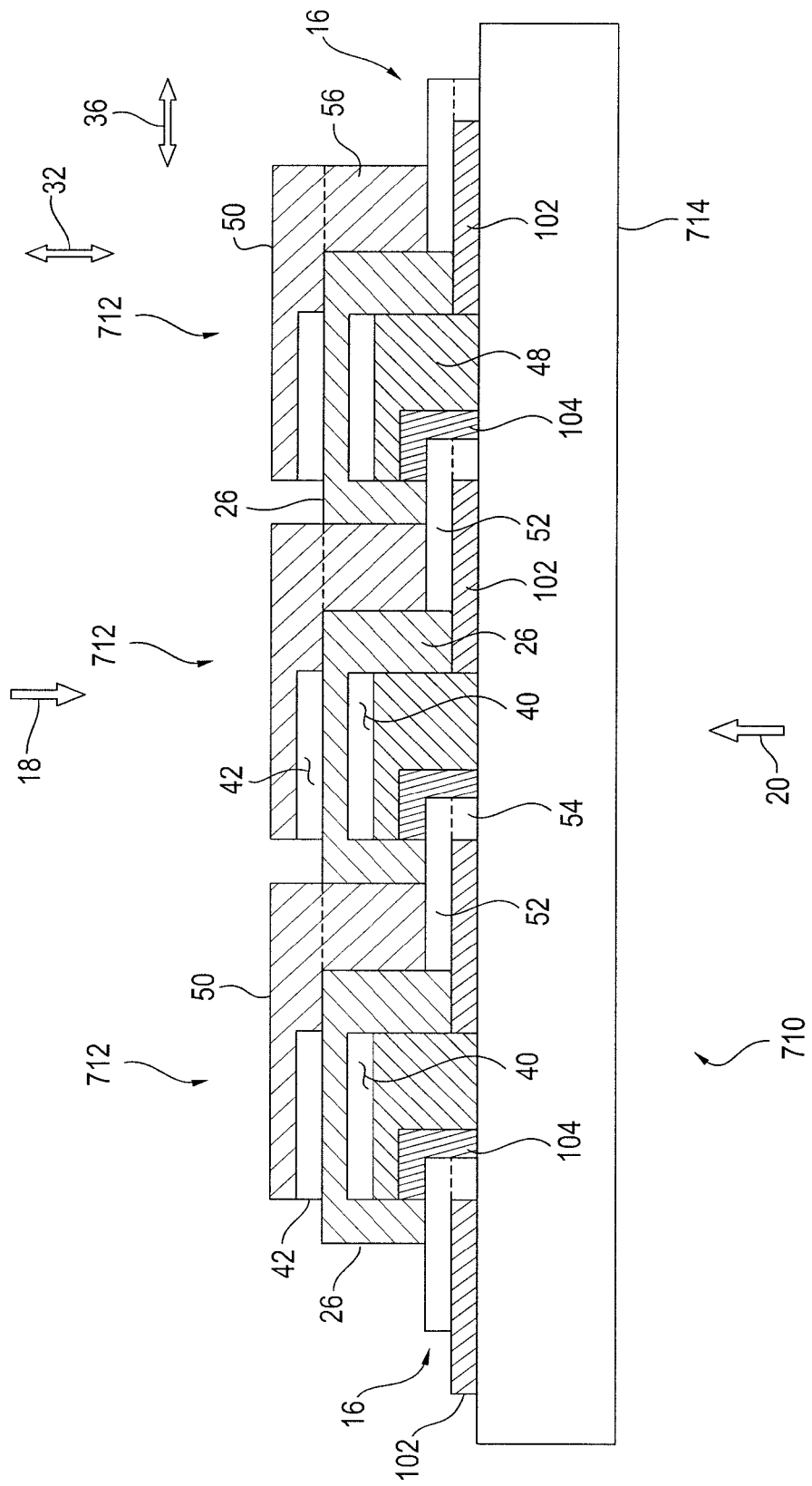
FIG. 12 schematically depicts some aspects of a non-limiting example of a cross section of an embodiment of the present invention having a chemical barrier and a ceramic seal.

Referring to FIG. 12, some aspects of a non-limiting example of an embodiment of a fuel cell system 710 are schematically depicted. Fuel cell system 710 includes a plurality of electrochemical cells 712 disposed on a substrate 714, each electrochemical cell 712 including a ceramic seal 102 and a chemical barrier 104. Fuel cell system 710 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 714. In fuel cell system 710, ceramic seal 102 is positioned to prevent or reduce leakage of gases and liquids from substrate 714 into interconnect 16 (blind interconnect 52), and extends in direction 36 between the anode conductor film 48 of one electrochemical cell 712 and the auxiliary conductor 54 of an adjacent electrochemical cell 712.

In fuel cell system 710, ceramic seal 102 is positioned vertically (in direction 32) between porous substrate 714 on the bottom and blind primary conductor 52 of interconnect 16 and electrolyte 26 on the top, thereby preventing the leakages of gases and liquids from substrate 714 into the portions of blind primary conductor 52 (and electrolyte 26) that are overlapped by ceramic seal 102. In other embodiments, ceramic seal 102 may be disposed in other suitable locations in addition to or in place of that illustrated in FIG. 12. Ceramic seal 102 may be formed of one or more of the materials set forth above with respect to the embodiment of FIG. 7. A portion of blind primary conductor 52 is embedded between ceramic seal 102 on the bottom and electrolyte 26 on the top. The diffusion distance in the embodiment of FIG. 12 is primarily defined by the length of the overlap of blind primary conductor 52 by both ceramic seal 102 and electrolyte 26 in direction 36.

In fuel cell system 710, chemical barrier 104 is disposed between anode conductor film 48 and interconnect 16 (blind primary conductor 52), extending in direction 32 between anode conductor film 48 and both blind primary conductor 52 and auxiliary conductor 54 of interconnect 16, and is configured to prevent material migration between anode conductor film 48 and blind primary conductor 52 and auxiliary conductor 54. Chemical barrier 104 may be formed from one or more of the materials set forth above with respect to the embodiments of FIGS. 10-15.

Figure 13:
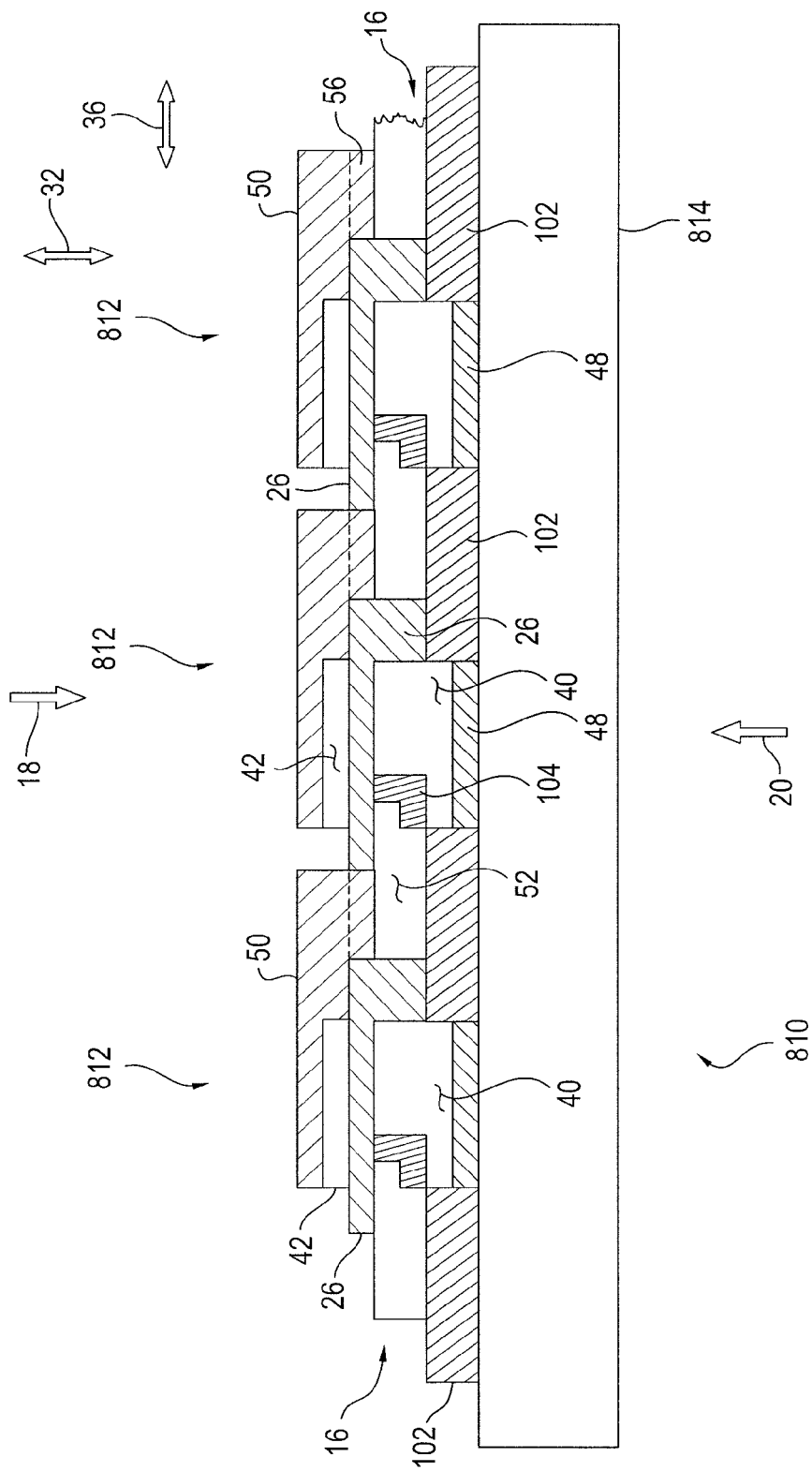
FIG. 13 schematically depicts some aspects of a non-limiting example of a cross section of an embodiment of the present invention having a chemical barrier and a ceramic seal.

Referring to FIG. 13, some aspects of a non-limiting example of an embodiment of a fuel cell system 810 are schematically depicted. Fuel cell system 810 includes a plurality of electrochemical cells 812 disposed on a substrate 814, each electrochemical cell 812 including a ceramic seal 102 and a chemical barrier 104. Fuel cell system 810 also includes the components set forth above and described with respect to fuel cell system 10, e.g., including interconnects 16 having blind primary conductors 52 and auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 814.

In fuel cell system 810, ceramic seal 102 is positioned to prevent or reduce leakage of gases and liquids from substrate 814 into interconnect 16 (blind interconnect 52), and extends in direction 36 between the anode 40 and anode conductor film 48 of one electrochemical cell 812 and the anode 40 and anode conductor film 48 of an adjacent electrochemical cell 812. In fuel cell system 810, ceramic seal 102 is positioned vertically (in direction 32) between porous substrate 814 on the bottom and blind primary conductor 52 of interconnect 16 and electrolyte 26 on the top, thereby preventing the leakages of gases and liquids from substrate 714 into the portions of blind primary conductor 52 (and electrolyte 26) that are overlapped by ceramic seal 102. In other embodiments, ceramic seal 102 may be disposed in other suitable locations in addition to or in place of that illustrated in FIG. 13. Ceramic seal 102 may be formed of one or more of the materials set forth above with respect to the embodiment of FIG. 7. A portion of blind primary conductor 52 is embedded between ceramic seal 102 on the bottom, and electrolyte 26 on the top. The diffusion distance in the embodiment of FIG. 13 is primarily defined by the length of the overlap of blind primary conductor 52 by both ceramic seal 102 and electrolyte 26 in direction 36.

In fuel cell system 810, chemical barrier 104 is disposed between anode 40 and blind primary conductor 52, and is configured to prevent material migration between anode 40 and blind primary conductor 52. In one form, chemical barrier 104 also functions as auxiliary conductor 54. In other embodiments, auxiliary conductor 54 may be formed separately from chemical barrier 104. Chemical barrier 104 may be formed from one or more of the materials set forth above with respect to the embodiments of FIGS. 10-15.

Figure 14:
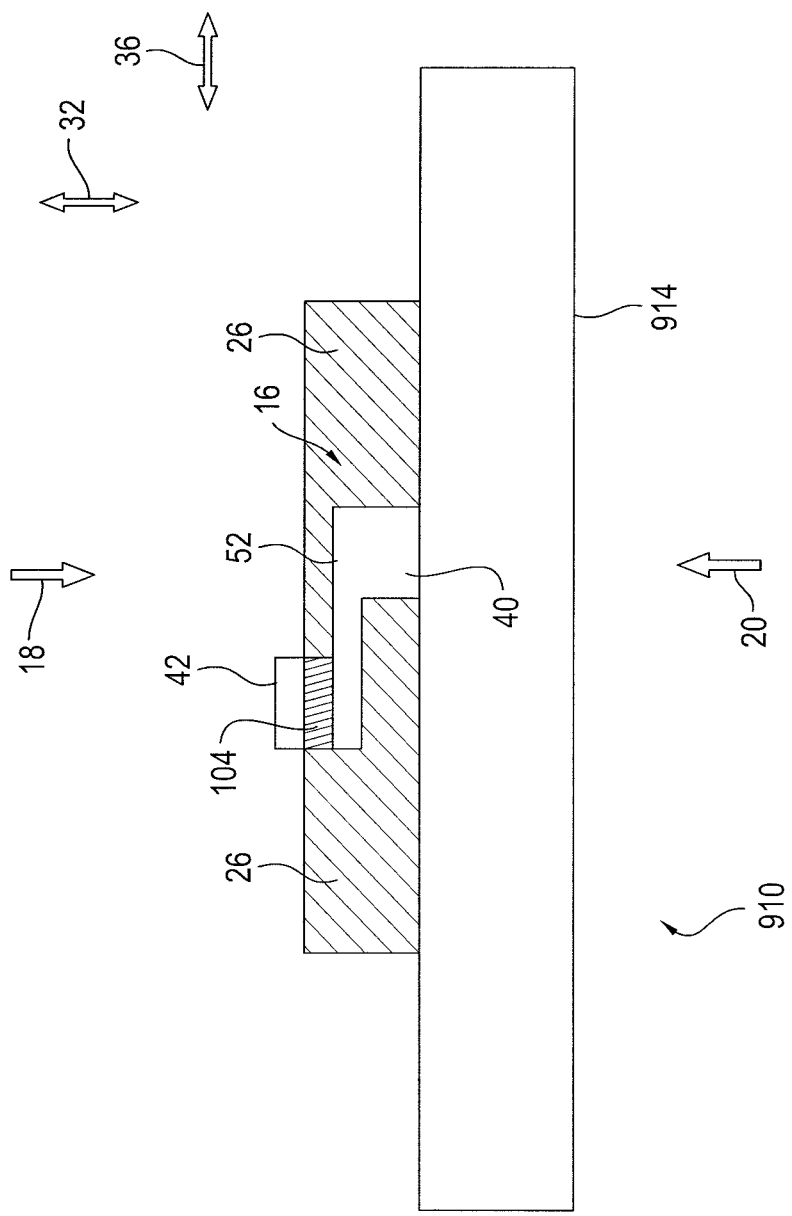
FIG. 14 schematically depicts some aspects of a non-limiting example of a cross section of an embodiment of the present invention having a chemical barrier.

Referring to FIG. 14, some aspects of a non-limiting example of an embodiment of a fuel cell system 910 disposed on a substrate 914 are schematically depicted. Fuel cell system 910 includes a chemical barrier 104. Fuel cell system 910 also includes some the components set forth above and described with respect to fuel cell system 10, e.g., including an interconnects 16 having a blind primary conductor 52; an oxidant side 18; a fuel side 20; electrolyte layers 26; anodes 40; and cathodes 42. Although only a single instance of interconnect 16, blind primary conductor 52, anode 40 and cathode 42 are depicted, and two instances of electrolyte layers 26 are depicted, it will be understood that fuel cell system 910 may include a plurality of each such components, e.g., arranged in series in direction 36, e.g., similar to embodiments described above. The description of substrate 14 applies equally to substrate 914. In fuel cell system 910, chemical barrier 104 is disposed between cathode 42 and interconnect 16 (blind primary conductor 52), extending in direction 32 between cathode 42 and interconnect 16, and is configured to prevent material migration between cathode 42 and interconnect 16 (blind primary conductor 52). Chemical barrier 104 may be formed from one or more of the materials set forth above with respect to the embodiments of FIGS. 10-15.

Figure 15:
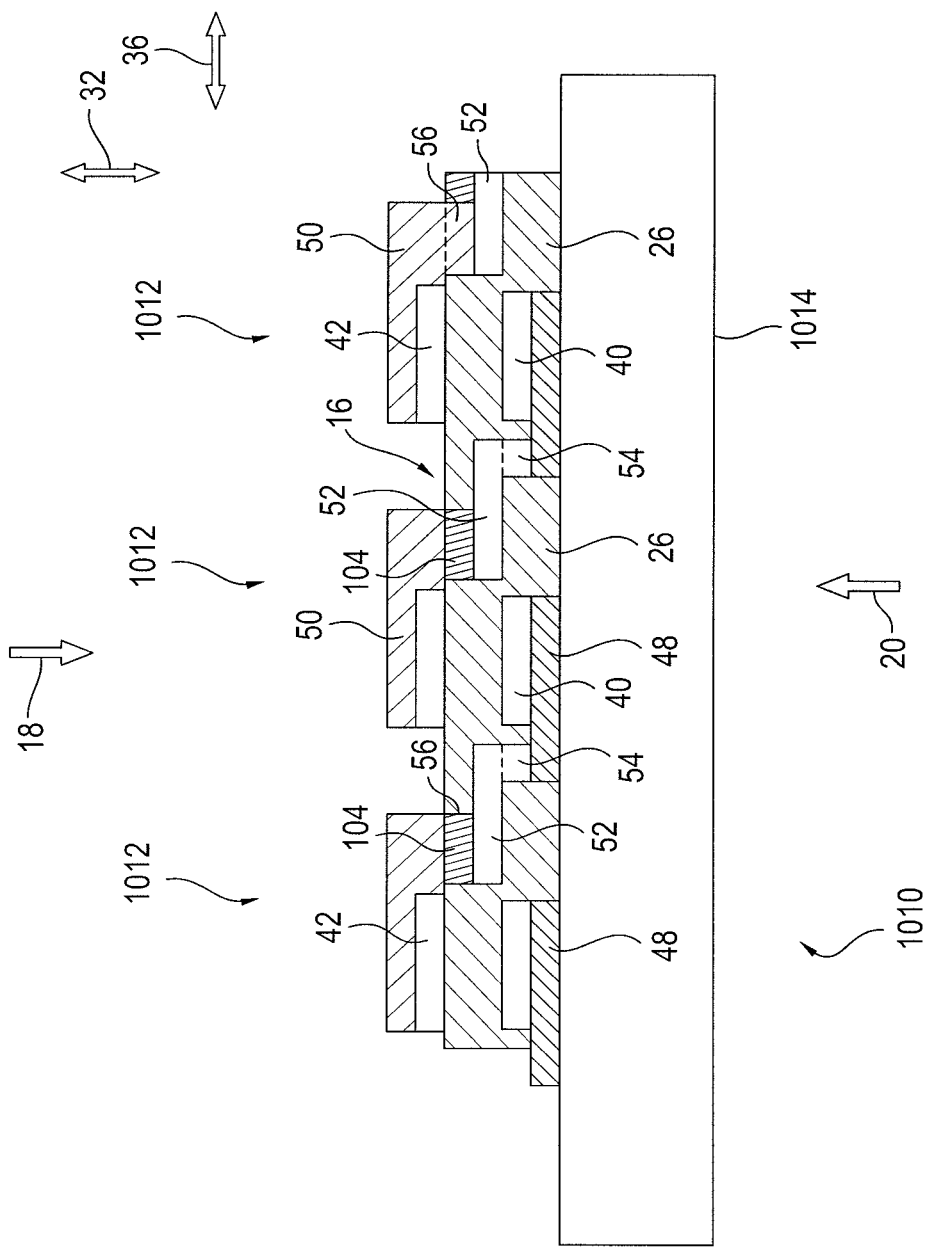
FIG. 15 schematically depicts some aspects of a non-limiting example of a cross section of an embodiment of the present invention having a chemical barrier.

Referring to FIG. 15, some aspects of a non-limiting example of an embodiment of a fuel cell system 1010 are schematically depicted. Fuel cell system 1010 includes a plurality of electrochemical cells 612 disposed on a substrate 1014, each electrochemical cell 1012 including a chemical barrier 104. Fuel cell system 1010 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 1014. In fuel cell system 1010, chemical barrier 104 is disposed between cathode conductor film 50 and interconnect 16 (blind primary conductor 52), extending in direction 32 between cathode conductor film 50 and interconnect 16 (blind primary conductor 52), and is configured to prevent material migration between cathode conductor film 50 and interconnect 16 (blind primary conductor 52). Chemical barrier 104 may be formed from one or more of the materials set forth above with respect to the embodiments of FIGS. 10-15. In the embodiment of FIG. 15, chemical barrier 104 also functions as auxiliary conductor 56.

In the embodiments of FIGS. 10-15, various features, components and interrelationships therebetween of aspects of embodiments of the present invention are depicted. However, the present invention is not limited to the particular embodiments of FIGS. 10-15 and the components, features and interrelationships therebetween as are illustrated in FIGS. 10-15 and described herein.

Referring to FIGS. 16-19 generally, the inventors have determined that in some fuel cells, under some operating conditions, the cathode conductive layer/conductor film, the electrolyte, and portions of the interconnect, e.g., vias, can form parasitic cells within or between each electrochemical cell, particularly where there is overlap between the cathode conductive layer/conductor film and the electrolyte. In the parasitic cells, the cathode conductive layer/conductor film functions as a cathode, and the interconnect, e.g., vias formed of precious metal cermet, function as an anode. The parasitic cells consume fuel during fuel cell operation, thereby reducing the efficiency of the fuel cell system. In addition, the steam generated by the parasitic cells may create local high oxygen partial pressure that may result in the oxidation of Ni that may have diffused into precious metal phase of the interconnect (e.g., via) materials, resulting in degradation of the interconnect.

The inventors performed tests that confirmed the existence of parasitic cells. The tests confirmed that, although significant degradation did not occur at some temperatures, e.g., 900° C., under the testing times, degradation of the interconnect occurred at higher operating temperatures, e.g., 925° C. after approximately 700 hours of testing. Post test analysis showed Ni migration from the anode conductive layer/conductor film side to the cathode conductive layer/conductor film side of the interconnect through the precious metal phase in blind primary conductor 52, which was accelerated by the higher operating temperature. A high oxygen partial pressure resulting from steam formed by the parasitic cells caused Ni oxidation at the interface of extended electrolyte 26 and blind primary interconnect 52 near the boundary between the cathode conductive layer/conductor film and the electrolyte, which segregated from the precious metal of the interconnect. Continued NiO accumulation at the interface between the blind primary conductor 52 and the electrolyte 26, and continued Ni migration would likely result in failure of the interconnect.

In order to prevent overlap between the cathode conductive layer/conductor film and the electrolyte, in various embodiments the inventors employed a separation feature (gap 106 of FIGS. 16 and 17; and insulator 108 of FIGS. 18 and 19) between the cathode conductive layer/conductor film and the electrolyte to separate, i.e., space apart, the cathode conductive layer/conductor film and the electrolyte from contacting each other, thus eliminating the parasitic cells. Testing of fuel cell systems with a separation feature in the form of gap 106 (and also including a chemical barrier 104 formed of Pd—Ni alloy cermet) for approximately 2000 hours, including approximately 1000 hours at aggressive conditions (925° C. and fuel consisting of 20% $H_2$, 10% CO, 19% $CO_2$, 47% steam and 4% $N_2$) did not result in degradation of the interconnect. Accordingly, some embodiments of the present invention include a separation feature, e.g., gap 106, between the cathode conductive layer/conductor film and the electrolyte, which prevents the establishment of parasitic cells.

Figure 16:
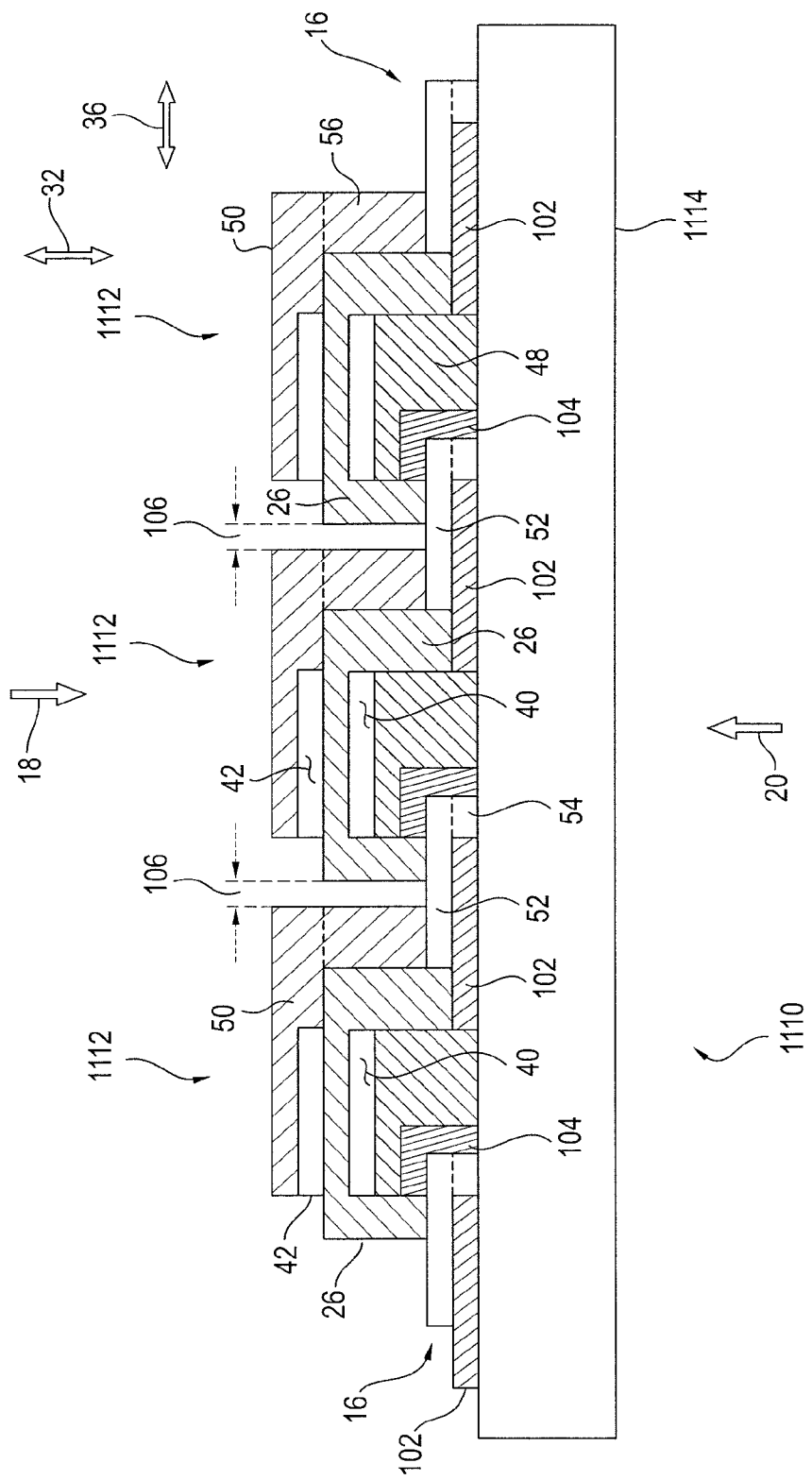
FIG. 16 schematically depicts some aspects of a non-limiting example of a cross section of an embodiment of the present invention having a chemical barrier, a ceramic seal, and a gap between a cathode conductor film and an electrolyte layer.

Referring to FIG. 16, some aspects of a non-limiting example of an embodiment of a fuel cell system 1110 are schematically depicted. Fuel cell system 1110 includes a plurality of electrochemical cells 1112 disposed on a substrate 1114, each electrochemical cell 1112 including a ceramic seal 102, a chemical barrier 104, and a separation feature in the form of gap 106. Fuel cell system 1110 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 1114. Gap 106 extends in direction 36 between cathode conductor film 50 (e.g., formed of one or more cathode conductive layers 30) and electrolyte layer 26.

In fuel cell system 1110, ceramic seal 102 is positioned to prevent or reduce leakage of gases and liquids from substrate 1114 into interconnect 16 (blind primary conductor 52), and extends in direction 36 between the anode conductor film 48 of one electrochemical cell 1112 and the auxiliary conductor 54 of an adjacent electrochemical cell 1112.

In fuel cell system 1110, ceramic seal 102 is positioned vertically (in direction 32) between porous substrate 1114 on the bottom and blind primary conductor 52 of interconnect 16 and electrolyte 26 on the top, thereby preventing the leakages of gases and liquids from substrate 1114 into the portions of blind primary conductor 52 (and electrolyte 26) that are overlapped by ceramic seal 102. In other embodiments, ceramic seal 102 may be disposed in other suitable locations in addition to or in place of that illustrated in FIG. 12. Ceramic seal 102 may be formed of one or more of the materials set forth above with respect to the embodiment of FIG. 7. A portion of blind primary conductor 52 is embedded between ceramic seal 102 on the bottom, and extended electrolyte 26 on the top. The diffusion distance in the embodiment of FIG. 16 is primarily defined by the length of the overlap of blind primary conductor 52 by both ceramic seal 102 and electrolyte 26 in direction 36.

In fuel cell system 1110, chemical barrier 104 is disposed between anode conductor film 48 and interconnect 16 (blind primary conductor 52), extending in direction 32 between anode conductor film 48 and both blind primary conductor 52 and auxiliary conductor 54 of interconnect 16, and is configured to prevent material migration between anode conductor film 48 and blind primary conductor 52 and auxiliary conductor 54. Chemical barrier 104 may be formed from one or more of the materials set forth above with respect to the embodiments of FIGS. 10-15.

In fuel cell system 1110, gap 106 is configured to prevent formation of a parasitic fuel cell between cathode conductor film 50, electrolyte layer 26 and blind primary conductor 52. Although gap 106 in the embodiment of FIG. 16 is employed in conjunction with a fuel cell system having ceramic seal 102, chemical barrier 104 and anode conductor film 48, in other embodiments, gap 106 may be employed in fuel cell systems that do not include components corresponding to one or more of ceramic seal 102, chemical barrier 104 and anode conductor film 48.

Figure 17:
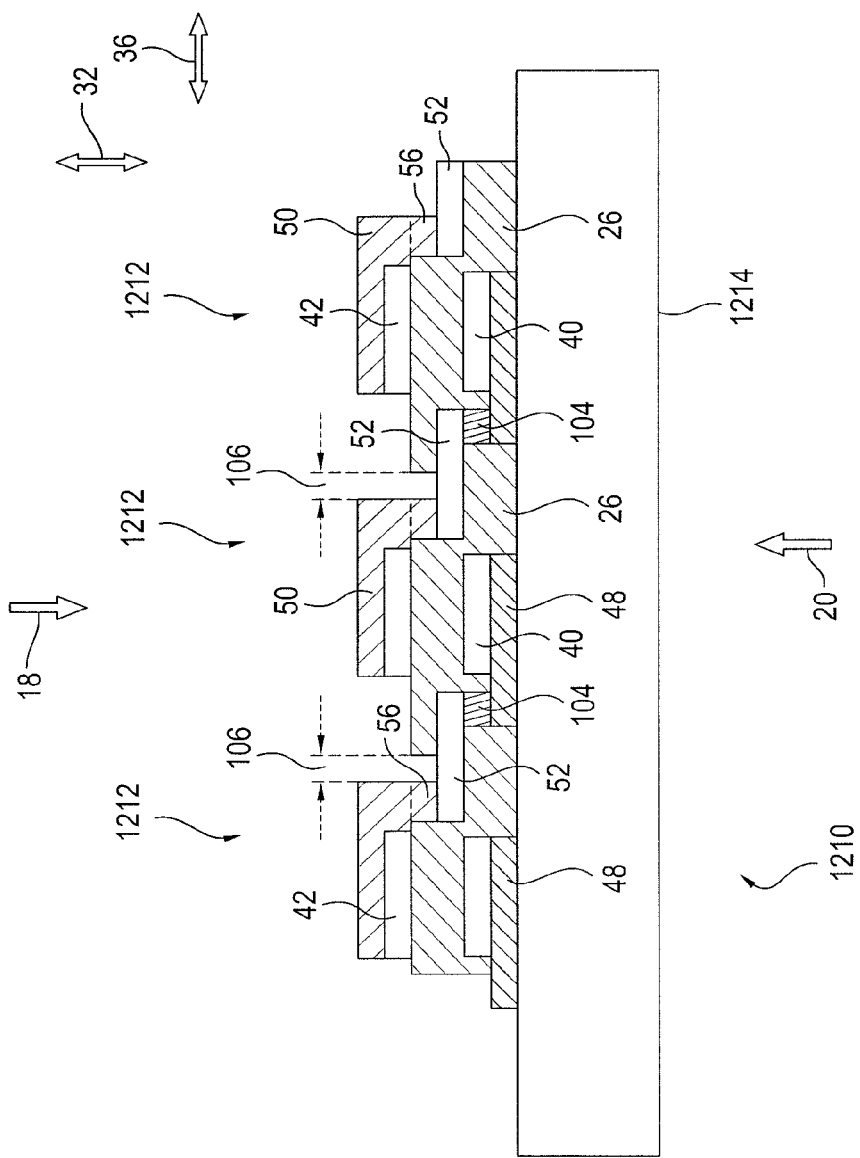
FIG. 17 schematically depicts some aspects of a non-limiting example of a cross section of an embodiment of the present invention having a chemical barrier, a ceramic seal, and a gap between an interconnect auxiliary conductor and an electrolyte layer.

Referring to FIG. 17, some aspects of a non-limiting example of an embodiment of a fuel cell system 1210 are schematically depicted. Fuel cell system 1210 includes a plurality of electrochemical cells 1212 disposed on a substrate 1214, each electrochemical cell 1212 including a chemical barrier 104 and a separation feature in the form of gap 106. Fuel cell system 1210 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 1214.

In fuel cell system 1210, chemical barrier 104 is disposed between anode conductor film 48 and interconnect 16 (blind primary conductor 52), extending in direction 32 between anode conductor film 48 and interconnect 16, and is configured to prevent material migration between anode conductor film 48 and interconnect 16 (blind primary conductor 52). Chemical barrier 104 may be formed from one or more of the materials set forth above with respect to the embodiments of FIGS. 10-15. In fuel cell system 1210, a portion of electrolyte layer 26 is disposed between anode 40 and chemical barrier 104, extending in direction 36 between anode 40 and chemical barrier 104.

In fuel cell system 1210, gap 106 is configured to prevent formation of a parasitic fuel cell between auxiliary conductor 56 (formed of the same material as cathode conductor film 50), electrolyte layer 26 and blind primary conductor 52. Although gap 106 in the embodiment of FIG. 17 is employed in conjunction with a fuel cell system having chemical barrier 104 and anode conductor film 48, in other embodiments, gap 106 may be employed in fuel cell systems that do not include components corresponding to one or more of chemical barrier 104 and anode conductor film 48.

Figure 18:
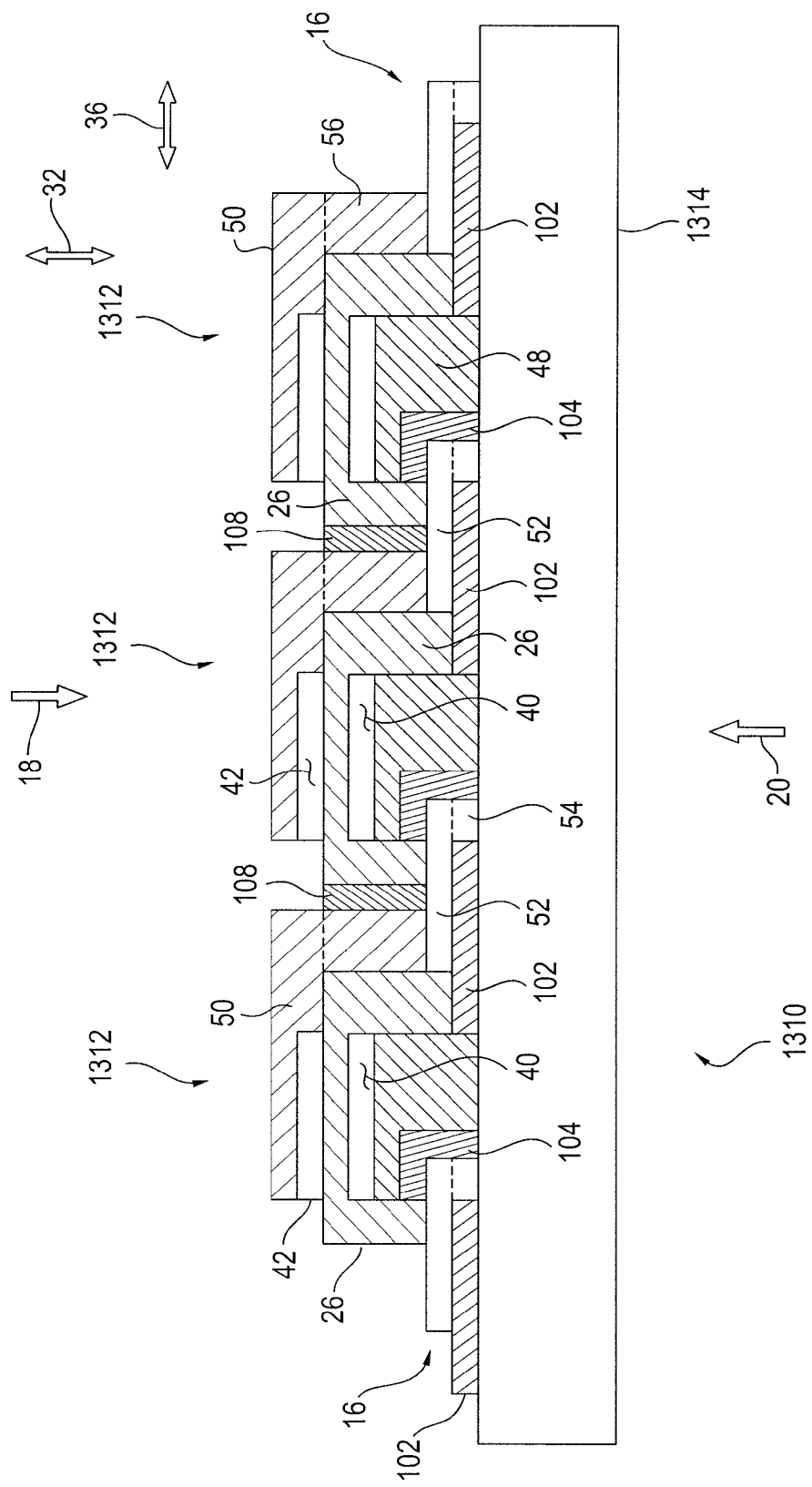
FIG. 18 schematically depicts some aspects of a non-limiting example of a cross section of an embodiment of the present invention having a chemical barrier, a ceramic seal, and an insulator between a cathode conductor film and an electrolyte layer.

Referring to FIG. 18, some aspects of a non-limiting example of an embodiment of a fuel cell system 1310 are schematically depicted. Fuel cell system 1310 includes a plurality of electrochemical cells 1312 disposed on a substrate 1314, each electrochemical cell 1312 including a ceramic seal 102, a chemical barrier 104, and a separation feature in the form of an insulator 108. Fuel cell system 1310 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 1314. Insulator 108 extends in direction 36 between cathode conductor film 50 (e.g., formed of one or more cathode conductive layers 30) and electrolyte layer 26.

In fuel cell system 1310, ceramic seal 102 is positioned to prevent or reduce leakage of gases and liquids from substrate 1314 into interconnect 16 (blind primary conductor 52), and extends in direction 36 between the anode conductor film 48 of one electrochemical cell 1312 and the auxiliary conductor 54 of an adjacent electrochemical cell 1312.

In fuel cell system 1310, ceramic seal 102 is positioned vertically (in direction 32) between porous substrate 1314 on the bottom and blind primary conductor 52 of interconnect 16 and electrolyte 26 on the top, thereby preventing the leakages of gases and liquids from substrate 1314 into the portions of blind primary conductor 52 (and electrolyte 26) that are overlapped by ceramic seal 102. In other embodiments, ceramic seal 102 may be disposed in other suitable locations in addition to or in place of that illustrated in FIG. 12. Ceramic seal 102 may be formed of one or more of the materials set forth above with respect to the embodiment of FIG. 7. A portion of blind primary conductor 52 is embedded between ceramic seal 102 on the bottom, and extended electrolyte 26 on the top. The diffusion distance in the embodiment of FIG. 18 is primarily defined by the length of the overlap of blind primary conductor 52 by both ceramic seal 102 and electrolyte 26 in direction 36.

In fuel cell system 1310, chemical barrier 104 is disposed between anode conductor film 48 and interconnect 16 (blind primary conductor 52), extending in direction 32 between anode conductor film 48 and both blind primary conductor 52 and auxiliary conductor 54 of interconnect 16, and is configured to prevent material migration between anode conductor film 48 and blind primary conductor 52 and auxiliary conductor 54. Chemical barrier 104 may be formed from one or more of the materials set forth above with respect to the embodiments of FIGS. 10-15.

In fuel cell system 1310, insulator 108 is configured to prevent formation of a parasitic fuel cell between cathode conductor film 50, electrolyte layer 26 and blind primary conductor 52. In one form, insulator 108 is formed from an insulating non-conductive materials, such as aluminum oxide ($Al_2O_3$), pyrochlore, such as In other embodiments, $La_2Zr_2O_7$, $Pr_2Zr_2O_7$, and $SrZrO_3$. other materials may be employed to form insulator 108, e.g., one or more other types of non-conducting ceramics in addition to or in place of aluminum oxide. Although insulator 108 in the embodiment of FIG. 16 is employed in conjunction with a fuel cell system having ceramic seal 102, chemical barrier 104 and anode conductor film 48, in other embodiments, insulator 108 may be employed in fuel cell systems that do not include components corresponding to one or more of ceramic seal 102, chemical barrier 104 and anode conductor film 48.

Figure 19:
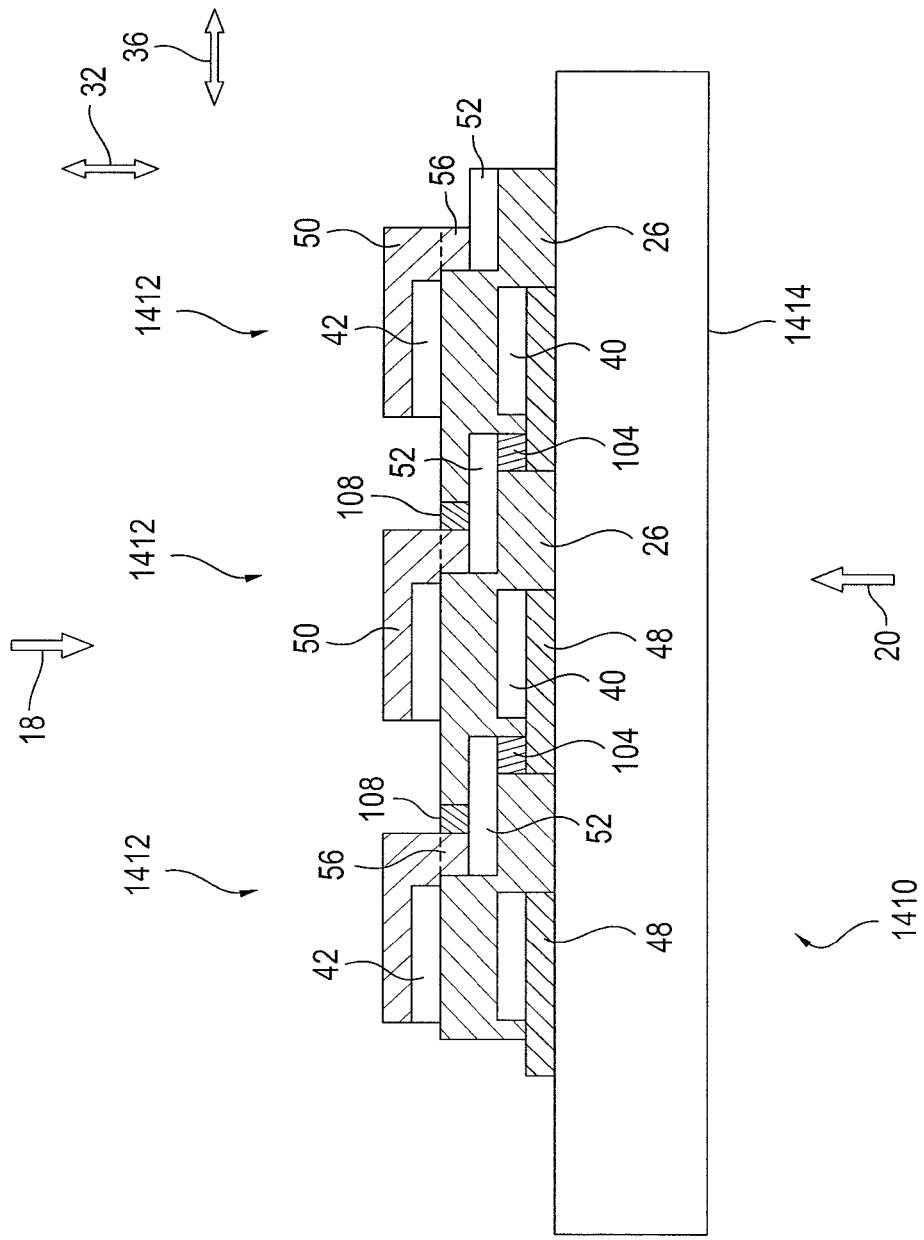
FIG. 19 schematically depicts some aspects of a non-limiting example of a cross section of an embodiment of the present invention having a chemical barrier, a ceramic seal, and an insulator between an interconnect auxiliary conductor and an electrolyte layer.

Referring to FIG. 19, some aspects of a non-limiting example of an embodiment of a fuel cell system 1410 are schematically depicted. Fuel cell system 1410 includes a plurality of electrochemical cells 1412 disposed on a substrate 1414, each electrochemical cell 1412 including a chemical barrier 104 and a separation feature in the form of insulator 108. Fuel cell system 1410 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 1414.

In fuel cell system 1410, chemical barrier 104 is disposed between anode conductor film 48 and interconnect 16 (blind primary conductor 52), extending in direction 32 between anode conductor film 48 and interconnect 16, and is configured to prevent material migration between anode conductor film 48 and interconnect 16 (blind primary conductor 52). Chemical barrier 104 may be formed from one or more of the materials set forth above with respect to the embodiments of FIGS. 10-15. In fuel cell system 1410, a portion of electrolyte layer 26 is disposed between anode 40 and chemical barrier 104, extending in direction 36 between anode 40 and chemical barrier 104.

In fuel cell system 1410, insulator 108 is configured to prevent formation of a parasitic fuel cell between auxiliary conductor 56 (formed of the same material as cathode conductor film 50), electrolyte layer 26 and blind primary conductor 52. Insulator 108 may be formed of the materials set forth above in the embodiment of FIG. 18. Although insulator 108 in the embodiment of FIG. 19 is employed in conjunction with a fuel cell system having chemical barrier 104 and anode conductor film 48, in other embodiments, insulator 108 may be employed in fuel cell systems that do not include components corresponding to one or more of chemical barrier 104 and anode conductor film 48.

In the embodiments of FIGS. 16-19, various features, components and interrelationships therebetween of aspects of embodiments of the present invention are depicted. However, the present invention is not limited to the particular embodiments of FIGS. 16-19 and the components, features and interrelationships therebetween as are illustrated in FIGS. 16-19 and described herein.

As mentioned above with respect to FIGS. 16-19, under certain conditions, parasitic cells may be undesirably formed. The embodiments discussed above with respect to FIGS. 16-19 provide certain approaches to resolving the parasitic cell problem. The inventors have also created other approaches to solving the parasitic cell problem, based on material selection, e.g., the material from which the interconnect and/or vias (e.g., interconnect 16, including blind primary conductor 52, auxiliary conductor 54 and/or auxiliary conductor 56, and/or other interconnect and/or via configurations not mentioned herein) are formed. In one form, for an alternate cermet material, precious metal-$La_2Zr_2O_7$ pyrochlore cermet may be employed for primary interconnect material for segmented-in-series fuel cell, or via material for multi-layer ceramic interconnect. In the such a cermet material, $La_2Zr_2O_7$ pyrochlore could fully replace doped zirconia, or partially replace doped zirconia to keep ionic phase below its percolation to eliminate or reduce ionic conduction.

In one form, the composition of the interconnect and/or via(s), e.g., one or more of the previously mentioned compositions for the interconnect and/or via(s), is altered to include non-ionic conducting ceramic phases in the composition of the interconnect and/or via(s).

For example, in one form, the interconnect and/or via may be formed, all or in part, of a cermet, such as those previously described with respect to interconnect 16, including blind primary conductor 52, auxiliary conductor 54 and/or auxiliary conductor 56, but also or alternatively including one or more non-ionic conductive ceramic phases. Examples include, without limitation, $SrZrO_3$, $La_2Zr_2O_7$ pyrochlore, $Pr_2Zr_2O_7$ pyrochlore, $BaZrO_3$, $MgAl_2O_4$ spinel, $NiAl_2O_4$ spinel, $MgCr_2O_4$ spinel, $NiCr_2O_4$ spinel, $Y_3Al_5O_{12}$ and other garnets with various A- and B-site substitution, and alumina. Other non-ionic conductive ceramic phases are also contemplated herein in addition to or in place of the examples set forth herein. Considerations for materials may include the coefficient of thermal expansion of the ceramic phase(s), e.g., relative to the coefficient thermal expansion of the porous substrate. In some embodiments, preferred materials for chemical compatibility with adjacent fuel cell layers may include precious metal-pyrochlore cermets, wherein the general class of pyrochlores is $(M_{RE})_2Zr_2O_7$, wherein $M_{RE}$ is a rare earth cation, for example and without limtiation La, Pr, Nd, Gd, Sm, Ho, Er, and/or Yb.

In other embodiments, nonionic phases such as $SrZrO_3$, $MgAl_2O_4$ spinel, $NiAl_2O_4$ spinel, alumina and pyrochlore compositions partially or completely replace the ionic conducting YSZ, e.g., of previously described interconnects and/or vias. Preferably, pyrochlore powders and/or one or more of the other nonionic phases replace YSZ sufficiently to render the balance of the YSZ to be below a percolation threshold to eliminate ionic conductivity across the interconnect/via. The YSZ volume fraction of the via is purposely reduced to less than 30 v % to minimize any ionic conductivity within the via material.

In one form, the composition of the interconnect and/or via(s), e.g., one or more of the previously mentioned compositions for the interconnect and/or via(s), is altered to include a reactant phase to form non-ionic conducting ceramic phases during firing of the fuel cell, e.g., by the inclusion of rare earth oxides in the compound used to form the interconnect/via(s).

For example, in some embodiments, all or portions interconnect 16 or other interconnects or vias may include a reactant phase in the form of rare earth oxide, e.g., within the screen printing ink, at less than the stoichiometric ratio to form pyrochlore being one mole of the oxides of La, Pr, Nd, Gd, Sm, Ho, Er, Yb to two moles of the zirconia content of the via. In the overall cermet composition (e.g., cermet compositions for all or part of interconnect 16 set forth herein) which reacts with the YSZ during firing of the fuel cell to form pyrochlore within the interconnect/via and adjacent to the electrolyte, e.g., electrolyte 26. In one form, the minimum rare earth oxide required is about 13 mole % ceramic composition in order to reduce YSZ phase below 30 v % percolation. In other embodiments, other rare earth oxide amounts may be employed. The zirconia phase may still be able to exist at greater than the percolation threshold, since the insulating pyrochlore phase could form along grain boundaries. However, in some embodiments, it would be preferable to add sufficient rare earth oxides to take the YSZ phase content to below the percolation threshold on a bulk composition basis. Similar to the pyrochlores, $SrZrO_3$ nonionic phases could be created in-situ through addition of SrO powder as a reactant phase, e.g., to the interconnect inks, at less than the stoichiometric ratio of 1 mole SrO to 1 mole $ZrO_2$.

In still other embodiments, all or portions interconnect 16 or other interconnects or vias may include a content of rare earth oxide, e.g., within the screen printing ink, at greater than the stoichiometric ratio of pyrochlore being one mole of the oxides, e.g., of La, Pr, Nd, Gd, Sm, Ho, Er, and/or Yb, to two moles of the zirconia content of the via in the overall cermet composition (e.g., cermet compositions for all or part of interconnect 16 set forth herein) which reacts with the YSZ during firing of the fuel cell to form pyrochlore within the interconnect/via, and the unreacted rare earth oxide will further react with the extended electrolyte in the vicinity of the interconnect during electrolyte firing to form a pyrochlore film on the electrolyte surface, e.g., on the surface of electrolyte 26, which will sufficiently disrupt the pathways for oxygen ionic conductivity. In form, the rare earth oxide amount is from 33 mole % to 50 mole % based on the total ceramic phase. In other embodiments, other rare earth oxide amounts may be employed. The excess rare earth oxide may ensure the absence of ionic conductivity. However, too much excess rare earth remaining within the interconnect/via could cause the via to be susceptible to moisture induced damage on phase change to the rare earth hydroxides. Hence, it is desirable in some embodiments to limit the amount of rare earth oxides to less than 10% over the stoichiometric ratio. Similar to the pyrochlores, $SrZrO_3$ nonionic phases could be created in-situ within the via and adjacent extended electrolyte through addition of SrO powder to the interconnect inks in excess of the stoichiometric ratio of 1 mole SrO to 1 mole $ZrO_2$. In one form, a lower limit is approximately 15-20 mole % SrO based on the ceramic phase, in order to form SrZrO3 to reduce YSZ below the percolation threshold. In other embodiments, other lower limits may apply. In one form, an upper limit is about 50-60 mole % SrO based on the ceramic phase (SrO+ZrO2). In other embodiments, other upper limits may apply.

In yet still other embodiments, all or portions interconnect 16 or other interconnects or vias may include a content of rare earth oxide at the stoichiometric ratio with YSZ to lead to full reactivity to $(M_{RE})_2Zr_2O_7$.

Firing temperatures for using a reactant phase to form the non-ionic conducting ceramic phases during firing of the fuel cell may vary with the needs of the particular application. Considerations include, for example and without limitation, the sinterability of different materials, powder particle size, specific surface area. Other material and/or processing parameters may also affect the selected firing temperature. For example, If the temperature is too low, the electrolyte may have higher porosity and cause leakage. If the temperature is too high, it may cause other issues, such as too high an anode density, which may reduce electrochemical activity, or may cause substrate dimensional changes, etc. Hence, the actual firing temperature for purposes of using one or more reactant phases to form one or more non-ionic conducting ceramic phases may vary as between applications. In one form, the firing temperature may be 1385° C. In some embodiments, the firing temperature may be in the range of 1370° C. to 1395° C. In other embodiments, the firing temperature may be in the range of 1350° C. to 1450° C. In still other embodiments, the firing temperature may be outside the range of 1350° C. to 1450° C. Processing steps to form the one or more non-ionic conducting ceramic phases may include preparing a composition including the rare earth oxide, YSZ and a precious metal, forming the interconnect/via(s), firing the composition at the desired temperature, e.g., at a temperature or within a temperature range set forth above, and holding the composition at the firing temperature for a desired period, e.g., in the range of 1-5 hours. In embodiments wherein all or portions of the fuel cell are formed by screen printing, the method may include preparing a screen printable ink that incorporates the rare earth oxide, YSZ and the precious metal; printing the interconnect/via(s); drying the ink; firing the printed interconnect/via(s) at the desired temperature, e.g., at a temperature or within a temperature range set forth above; and holding the composition at the firing temperature for a desired period, e.g., in the range of 1-5 hours.

In additional embodiments, other non-ionic conducting phases or reactant phases may be employed to minimize the ionic conductivity of the interconnect.

The following Tables 1-8 provide compositional information for some aspects of non-limiting experimental fuel cell and fuel cell component examples produced in accordance with some aspects of some embodiments of the present invention. It will be understood the present invention is in no way limited to the examples provided below. The columns entitled "General Composition" illustrate some potential compositional ranges, including some preferred ranges, for some materials described herein, whereas, the columns entitled "Specific Composition" illustrates the materials used in the test articles/materials.

TABLE 1

(w/o ceramic seal)

|  | General Composition | Specific Composition |
|---|---|---|
| Anode | NiO—YSZ (NiO = 55-75 wt %) |  |
| Anode conductive layer | Pd—Ni—YSZ |  |
| Cathode | $La_{(1-x)}Sr_xMnO_{(3-d)}$ (x = 0.1-0.3) —3YSZ |  |
| Cathode conductive layer | Pd—$La_{(1-x)}Sr_xMnO_{(3-d)}$ (x = 0.1-0.3) |  |
| Electrolyte | 3YSZ | 3YSZ |
| Blind primary conductor | xPd(100 − x)Pt—YSZ (x = 35-65 wt ratio, alloy is 35-80 v %) | 31.1%Pd, 31.1%Pt, 24.4% 3YSZ |
| Auxiliary conductor on anode side | xPd(100 − x)Pt—YSZ (x = 35-65 wt ratio, alloy is 35-80 v %) | 31.1%Pd, 31.1%Pt, 24.4% 3YSZ |
| Auxiliary conductor on cathode side | Pd—$La_{(1-x)}Sr_xMnO_{(3-d)}$ (x = 0.1-0.3) |  |
| Substrate | MgO—$MgAl_2O_4$ | 69.4%MgO, 30.6%$MgAl_2O_4$ |
| Substrate surface modification layer | 3-8 mol %$Y_2O_3$—$ZrO_2$ | 8YSZ |
| Ceramic seal | N/A | N/A |
| Cell ASR, ohm-cm^2 |  | 0.375 |
| Interconnect ASR, ohm-cm^2 |  | 0.027 |
| Test duration, hrs |  | 860 |

Examples: TCT23 (STC13-3): blind primary interconnect is long strip design FIG. 4

TABLE 2

(w/o ceramic seal)

|  | General Composition | Specific Composition |
|---|---|---|
| Anode | NiO—YSZ (NiO = 55-75 wt %) |  |
| Anode conductive layer | Pd—Ni—YSZ |  |
| Cathode | $La_{(1-x)}Sr_xMnO_{(3-d)}$ (x = 0.1-0.3) —3YSZ |  |
| Cathode conductive layer | Pd—$La_{(1-x)}Sr_xMnO_{(3-d)}$ (x = 0.1-0.3) |  |
| Electrolyte | 3YSZ | 3YSZ |
| Blind primary conductor | xPd(100 − x)Pt—YSZ (x = 35-65 wt ratio, alloy is 35-80 v %) | 31.1%Pd, 31.1%Pt, 24.4% 3YSZ |
| Auxiliary conductor on anode side | xPd(100 − x)Pt—YSZ (x = 35-65 wt ratio, alloy is 35-80 v %) | 31.1%Pd, 31.1%Pt, 24.4% 3YSZ |
|  | Pd—$La_{(1-x)}Sr_xMnO_{(3-d)}$ (x = 0.1-0.3) |  |
| Substrate | MgO–$MgAl_2O_4$ | 69.4%MgO, 30.6%$MgAl_2O_4$ |
| Substrate surface modification layer | 3-8 mol %$Y_2O_3$—$ZrO_2$ | 8YSZ |
| Ceramic seal |  | N/A |

TABLE 2-continued (w/o ceramic seal)

| | General Composition | Specific Composition |
|---|---|---|
| cell ASR, ohm-cm$^2$ | | 0.30 |
| Interconnect ASR, ohm-cm$^2$ | | 0.02 |
| Test duration, hrs | | 3500 |

Examples: PCT11(PC08-2/3): blind primary interconnect is via design FIG. 6

TABLE 3

(with ceramic seal)

| | General Composition | Specific Composition |
|---|---|---|
| Anode | NiO—YSZ (NiO = 55-75 wt %) | |
| Anode conductive layer | Pd—Ni—YSZ | |
| Cathode | La$_{(1-x)}$Sr$_x$MnO$_{(3-\delta)}$ (x = 0.1-0.3) —3YSZ | |
| Cathode conductive layer | Pd—La$_{(1-x)}$Sr$_x$MnO$_{(3-\delta)}$ (x = 0.1-0.3) | |
| Electrolyte | 3YSZ | 3YSZ |
| Blind primary conductor | Pd—Ni—YSZ | 76.5%Pd, 8.5%Ni, 15%3YSZ |
| Auxiliary conductor on anode side | Pd—Ni—YSZ | 76.5%Pd, 8.5%Ni, 15%3YSZ |
| Auxiliary conductor on cathode side | Pd—La$_{(1-x)}$Sr$_x$MnO$_{(3-\delta)}$ (x = 0.1-0.3) | |
| Substrate | MgO—MgAl$_2$O$_4$ | 69.4%MgO, 30.6%MgAl$_2$O$_4$ |
| Substrate surface modification layer | 3-8 mol %Y$_2$O$_3$—ZrO$_2$ | 8YSZ |
| Ceramic seal | 3-5 mol %Y$_2$O$_3$—ZrO$_2$, or 4-6 mol %Sc$_2$O$_3$—ZrO$_2$ | 3YSZ |
| cell & interconnect ASR, ohm-cm$^2$ | | 0.50 |
| Test duration, hrs | | 1200 |

Examples: TCT2: blind primary interconnect is long strip design FIG. 8

TABLE 4

(Pd—NTZ as chemical barrier)

| | General Composition | Specific Composition |
|---|---|---|
| Anode | NiO—YSZ (NiO = 55-75 wt %) | |
| Anode conductive layer | Pd—NiO—(Mg$_{0.42}$,Ni$_{0.58}$)Al$_2$O$_4$ | |
| Cathode | La$_{(1-x)}$Sr$_x$MnO$_{(3-\delta)}$(x = 0.1-0.3) —3YSZ | |
| Cathode conductive layer | La$_{(1-x)}$Sr$_x$MnO$_{(3-d)}$ (x = 0.1-0.3) | |
| Electrolyte | 3-8 mol %Y$_2$O$_3$—ZrO$_2$, or 4-11 mol %Sc$_2$O$_3$—ZrO$_2$ | 3YSZ |
| Blind primary conductor | xPd(100 − x)Pt—YSZ (x = 35-65 wt ratio, alloy is 35-80 v %) | 31.1%Pd, 31.1%Pt, 24.4% 3YSZ |
| Chemical barrier on anode side | xPd—(100 − x) NTZ* (x = 10-40) | 15%Pd, 19%NiO, 66%NTZ |
| Auxiliary conductor on cathode side | La(1 − x)SrxMnO(3 − d) (x = 0.1-0.3) | |
| Substrate | MgO—MgAl$_2$O$_4$ | 69.4%MgO, 30.6%MgAl$_2$O$_4$ |
| Substrate surface modification layer | 3-8 mol %Y$_2$O$_3$—ZrO$_2$ | 8YSZ |
| Ceramic seal | N/A | N/A |
| Cell ASR, ohm-cm$^2$ | | 0.35 |
| Interconnect ASR, ohm-cm$^2$ | | 0.02-0.05 |
| Test duration, hrs | | 1400 |

*NTZ: 73.6 wt %NiO, 20.0%TiO$_2$, 6.4% YSZ
Examples: PCT14B (PC11-4), blind vias, FIG. 11

TABLE 5 wt % (GDC10 as chemical barrier)

| | General Composition | Specific Composition |
|---|---|---|
| Anode | NiO—YSZ (NiO = 55-75 wt %) | |
| Anode conductive layer | Pd—NiO—(Mg$_{0.42}$,Ni$_{0.58}$)Al$_2$O$_4$ | |
| Cathode | La$_{(1-x)}$Sr$_x$MnO$_{(3-\delta)}$(x = 0.1-0.3) —3YSZ | |
| Cathode conductive layer | La$_{(1-x)}$Sr$_x$MnO$_{(3-d)}$ (x = 0.1-0.3) | |
| Electrolyte | 3-8 mol %Y$_2$O$_3$—ZrO$_2$, or 4-11 mol %Sc$_2$O$_3$—ZrO$_2$ | 3YSZ |
| Blind primary conductor | xPd—(100 − x)YSZ (x = 70-90 weight ratio) | 85%Pd, 15%3YSZ |

TABLE 5-continued wt % (GDC10 as chemical barrier)

|  | General Composition | Specific Composition |
|---|---|---|
| Chemical barrier on anode side | Doped Ceria | $(Gd_{0.1},Ce_{0.9})O_2$ |
| Auxiliary conductor on cathode side | $La_{(1-x)}Sr_xMnO_{(3-d)}$ (x = 0.1-0.3) |  |
| Substrate | $MgO$—$MgAl_2O_4$ | 69.4%MgO, 30.6%$MgAl_2O_4$ |
| Substrate surface modification layer | 3-8 mol %$Y_2O_3$—$ZrO_2$ | 8YSZ |
| Ceramic seal | 3-5 mol %$Y_2O_3$—$ZrO_2$, or 4-6 mol %$Sc_2O_3$—$ZrO_2$ | 3YSZ |
| Cell ASR, ohm-cm$^2$ |  | 0.24 |
| Interconnect ASR, ohm-cm$^2$ |  | 0.04-0.05 |
| Test duration, hrs |  | 1340 |

Examples: PCT55A (PC28-2) for FIG. 12

TABLE 6 wt %

|  | General Composition | Specific Composition |
|---|---|---|
| Anode | $NiO$—$YSZ$ (NiO = 55-75 wt %) |  |
| Anode conductive layer | $Pd$—$NiO$—$(Mg_{0.42},Ni_{0.58})Al_2O_4$ |  |
| Cathode | $La_{(1-x)}Sr_xMnO_{(3-\delta)}$(x = 0.1-0.3)—3YSZ |  |
| Cathode conductive layer | $La_{(1-x)}Sr_xMnO_{(3-d)}$ (x = 0.1-0.3), or $LaNi_{0.6}Fe_{0.4}O_3$ |  |
| Electrolyte | 4-11 mol % $Sc_2O_3$—$ZrO_2$ | 6ScSZ |
| Blind primary conductor | $x$Pd(100 − x)Pt—YSZ (x = 35-65 wt ratio, alloy is 35-80 v %) | 31.1%Pd, 31.1%Pt, 24.4% 3YSZ |
| Chemical barrier on anode side | Doped Ceria | $(Gd_{0.1},Ce_{0.9})O_2$ |
| Auxiliary conductor on cathode side | $La_{(1-x)}Sr_xMnO_{(3-d)}$ (x = 0.1-0.3), or $LaNi_{0.6}Fe_{0.4}O_3$ |  |
| Substrate | $MgO$—$MgAl_2O_4$ | 69.4%MgO, 30.6%$MgAl_2O_4$ |
| Substrate surface modification layer | 3-8 mol %$Y_2O_3$—$ZrO_2$ | 8YSZ |
| Ceramic seal | 3-5 mol %$Y_2O_3$—$ZrO_2$, or 4-6 mol %$Sc_2O_3$—$ZrO_2$ | 3YSZ |
| Cell ASR, ohm-cm$^2$ |  | 0.24 |
| Interconnect ASR, ohm-cm$^2$ |  | 0.05-0.06 |
| Test duration, hrs |  | 8000 |

Examples: PCT63A&B For FIG. 16

TABLE 7

|  | General Composition | Specific Composition |
|---|---|---|
| Anode |  |  |
| Anode conductive layer |  |  |
| Cathode |  |  |
| Cathode conductive layer |  |  |
| Electrolyte |  |  |
| Blind primary conductor | Pt—YSZ—SrZrO3 | 78.8%Pt—11.1%3YSZ—10.1%SrZrO3 |
| Auxiliary conductor on anode side |  |  |
| Auxiliary conductor on cathode side |  |  |
| Substrate |  |  |
| Substrate surface modification layer |  |  |
| Ceramic seal |  |  |
| Cell ASR, ohm-cm$^2$ |  |  |
| Interconnect ASR, ohm-cm$^2$ |  |  |

Examples: not tested in an actual SOFC test article, pellet formulation

TABLE 8

| | General Composition | Specific Composition |
|---|---|---|
| Anode | NiO—YSZ (NiO = 55-75 wt %) | |
| Anode conductive layer | Pd—NiO—$(Mg_{0.42},Ni_{0.58})Al_2O_4$ | |
| Cathode | $La_{(1-x)}Sr_xMnO_{(3-\delta)}$ (x = 0.1-0.3) —3YSZ | |
| Cathode conductive layer | $La_{(1-x)}Sr_xMnO_{(3-d)}$ (x = 0.1-0.3) | |
| Electrolyte | 3-8 mol % $Y_2O_3$—$ZrO_2$ | 3YSZ |
| Blind primary conductor | Pt—Pd—YSZ—$La_2O_3$ | 36%Pt—36%Pd—25.2%3YSZ—2.8%$La_2O_3$ |
| Auxiliary conductor on anode side | Pt—Pd—YSZ—$La_2O_3$ | 36%Pt—36%Pd—25.2%3YSZ—2.8%$La_2O_3$ |
| Auxiliary conductor on cathode side | $La_{(1-x)}Sr_xMnO_{(3-d)}$ (x = 0.1-0.3) | |
| Substrate | MgO—$MgAl_2O_4$ | 69.4%MgO, 30.6%$MgAl_2O_4$ |
| Substrate surface modification layer | 3-8 mol % $Y_2O_3$—$ZrO_2$ | 8YSZ |
| Ceramic seal | 3-5 mol % $Y_2O_3$—$ZrO_2$, or 4-6 mol % $Sc_2O_3$—$ZrO_2$ | 3YSZ |
| Cell ASR, ohm-$cm^2$ | | 0.3-0.34 |
| Interconnect ASR, ohm-$cm^2$ | | 0.04-0.07 |

Examples: PCT57

Figure 20:
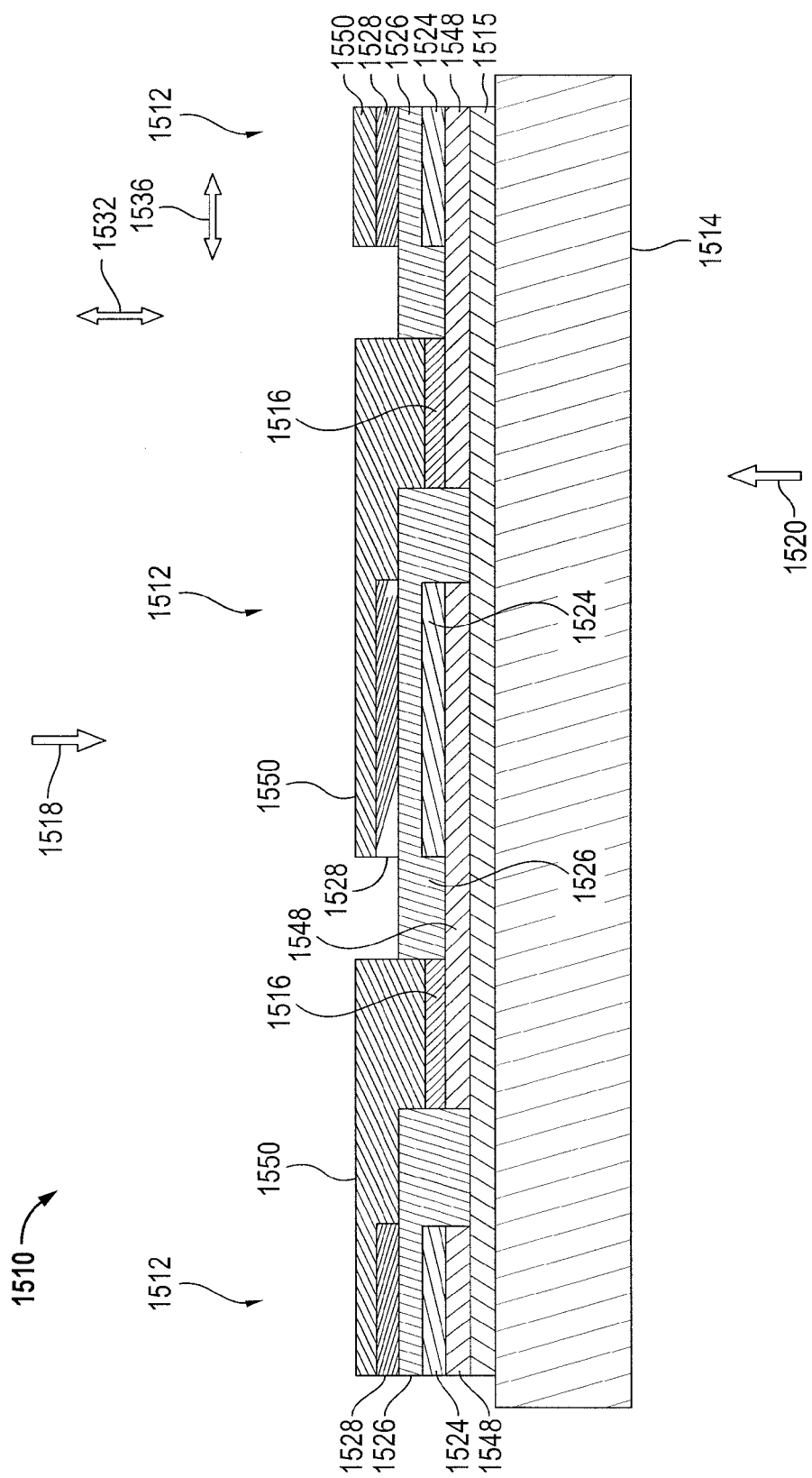
FIG. 20 schematically depicts, in cross section, some aspects of a non-limiting example of a fuel cell system in accordance with an embodiment of the present invention, the fuel cell having a high density composite conductive ceramic/metal interconnect.

Referring to FIG. 20, some aspects of a non-limiting example of an embodiment of a fuel cell system 1510 are schematically depicted. Fuel cell system 1510 includes a plurality of electrochemical cells 1512. In one form, electrochemical cells 1512 are solid oxide fuel cells (SOFCs). In other embodiments, electrochemical cells 1512 may be one or more other types of fuel cells. In one form, fuel cell system 1510 is configured as a segmented-in-series fuel cell, that is, wherein electrochemical cells 1512 are arranged in a segmented-in-series configuration. It will be understood not only a limited number of electrochemical cells 1512 are illustrated, and that those to the right and to the left of the drawing illustrated in FIG. 20 are truncated for purposes of clarity of illustration whereas the actual number of electrochemical cells 1512 in a particular fuel cell system 1510 may be any number greater or lesser than not shown illustrated in FIG. 20.

Electrochemical cells 1512 are supported by a porous ceramic substrate 1514. Fuel cell system 1510 includes a plurality of interconnects 1516 that are configured to conduct free electrons between adjacent electrochemical cells 1512. In one form, a porous anode barrier (PAB) 1515 is disposed between electrochemical cells 1512 and porous substrate 1514. Porous anode barrier 1515 is configured to prevent reactions between the anodes of electrochemical cells 1512 and the porous substrate 1514. However, porous anode barrier 1515 is not considered an active part of electrochemical cells 1512 or fuel cell system 1510, insofar as porous anode barrier 1515 does not provide electrical conduction within electrochemical cells 1512 or as between electrochemical cells 1512, and does not partake in the electrochemical reactions that generate electrical power from fuel. In other embodiments, one or more other layers in addition to or in place of porous anode barrier 1515 may be employed. In still other embodiments, there may be no such porous anode barrier or other layer separating electrochemical cells 1512 from porous substrate 1514, or there may be one or more other layers in addition to or in place of porous anode barrier 1515. An oxidant is supplied to electrochemical cells 1512 from an oxidant side 1518. In one form, the oxidant is air. In other embodiments other oxidants may be used in addition to or in place of air. Fuel is supplied to electrochemical cells 1512 on a fuel side 1520 via porous substrate 1514. In some embodiments, channels and/or other passages may be etched or otherwise formed into porous substrate 1514 in order to facilitate the flow of fuel into electrochemical cells 1512. In one form, the fuel is combination of hydrogen, carbon monoxide, carbon dioxide, methane, steam, nitrogen and hydrocarbons of higher molecular weight than methane. In other embodiments, other fuels may be used, e.g. hydrogen. In addition, in other embodiments, fuel cell system 1510 and electrochemical cells 1512 may be configured and arranged so that fuel and oxidant are supplied from opposite or other directions than those described and illustrated herein.

Each electrochemical cell 1512 includes an anode 1524, and electrolyte 1526 and a cathode 1528. Cathode 1528 is spaced apart from anode 1524 in a direction 1532; and electrolyte 1526 is disposed between anode 1524 and cathode 1528. Electrochemical cells 1512 are arranged in series in a direction 1536. In the present embodiment, each electrochemical cell 1512 also includes an anode current collector 1548 and cathode current conductor 1550. Anode current collector 1548 is electrically coupled to anode 1524, and cathode current collector 1550 is electrically coupled to cathode 1528. The anode and cathode current collector layers provide a higher electrical conductivity path for the transfer of electrons than is possible by the anode and cathode layers themselves which are optimized for electrochemical reactions rather than current conduction. Depending upon the embodiment, anode current collector 1548 and cathode current collector 1550 may be alternatively and respectively referred to as anode and cathode conductive films; anode and cathode conductive layers; anode and cathode conductor films; and/or anode and cathode conductor layers.

In one form, fuel cell system 1510 is formed by depositing films/layers onto porous substrate 1514, e.g., by screen printing and/or inkjet printing, to provide porous anode barrier 1515, interconnects 1516, anodes 1524, electrolytes 1526, cathodes 1528, anode current collectors 1548 and cathode current collectors 1550. In other embodiments, the films/layers may be deposited by one or more other techniques in addition to or in place of screen printing and/or inkjet printing. In still other embodiments, the aforementioned components may be thicker than what may be known as a film, and may be deposited by the same or other means. In various embodiments, one or more firing/sintering cycles are performed subsequent to depositing one or more films/layers. Other embodiments may not require any firing/sintering for one or more films/layers deposition. Examples of materials that may be used to form porous substrate 1514, and materials that may be used to form the films/layers that yield anode barrier 1515, interconnects 1516, anodes 1524, electrolytes 1526, cathodes 1528, anode current collectors 1548 and cathode current collectors 1550 are described as follows.

In one form, porous substrate 1514 is made of MgO—MgAl2O4 (MMA). In other embodiments, other materials may be employed in addition to or in place of MMA, for example, doped zirconia and forsterite.

In one form, porous anode barrier 1515 is made from an inert porous ceramic material, e.g., a doped zirconia, such as 3YSZ. In other embodiments, other materials may be employed, such as SrZrO3, or SrTiO3-doped zirconia composite, in addition to or in place of doped zirconia.

In one form, anode current collector 1548 is an electrode conductive layer formed of a nickel cermet. Examples of suitable nickel cermets include, Ni—YSZ (yttria doping in zirconia is 3-8 mol %,), Ni—ScSZ (scandia doping is 4-10 mol %, preferably second doping for phase stability for 10 mol % scandia-$ZrO_2$) and/or Ni-doped ceria (such as Gd or Sm doping), cermet of Ni and doped lanthanum chromite (such as Ca doping on A site and Zn doping on B site), cermet of Ni and doped strontium titanate (such as La doping on A site and Mn doping on B site) and/or $La_{1-x}Sr_xMn_yCr_{1-y}O_3$. Alternatively, it is considered that other materials for anode current collector 1548 may include cermets based in part or whole on one or more precious metals and/or one or more precious metal alloys in addition to retaining Ni content. Precious metals in the cermet may include, for example, Pt, Pd, Au, Ag, and/or alloys thereof. The ceramic phase may include, for example, an inactive non-electrically conductive phase, including, for example, YSZ, ScSZ and/or one or more other inactive phases, e.g., having desired coefficients of thermal expansion (CTE) in order to control the CTE of the layer to match the CTE of the substrate and electrolyte. In some embodiments, the ceramic phase may include $Al_2O_3$ and/or a spinel such as $NiAl_2O_4$, $MgAl_2O_4$, $MgCr_2O_4$, $NiCr_2O_4$. In other embodiments, the ceramic phase may be electrically conductive, e.g., doped lanthanum chromite, doped strontium titanate and/or one or more forms of LaSrMnCrO. One specific example of anode current collector 1548 material is 76.5% Pd, 8.5% Ni, 15% 3YSZ.

In one form, anode 1524 may be formed of xNiO-(100-x)YSZ (x is from 55 to 75 in weight ratio), yNiO-(100-y)ScSZ (y is from 55 to 75 in weight ratio), NiO-gadolinia stabilized ceria (such as 55 wt % NiO-45 wt % GDC) and/or NiO samaria stabilized ceria. In other embodiments, other materials may be employed. For example, it is alternatively considered that anode 1524 may be made of doped strontium titanate, $La_{1-x}Sr_xMn_yCr_{1-y}O_3$ (e.g., $La_{0.75}Sr_{0.25}Mn_{0.5}Cr_{0.5}O_3$) and/or other ceramic-based anode materials.

In one form, electrolyte 1526 is a ceramic material. For example, in some embodiments, a proton and/or oxygen ion conducting ceramic, may be employed. In one form, electrolyte 1526 is formed of YSZ, such as 3YSZ and/or 8YSZ. In other embodiments, electrolyte 1526 may be formed of ScSZ, such as 4ScSZ, 6ScSz and/or 10ScSZ in addition to or in place of YSZ. In other embodiments, other materials may be employed in addition to or in place of the aforementioned materials. For example, it is alternatively considered that electrolyte 1526 may be made of or may include doped ceria and/or doped lanthanum gallate. In any event, electrolyte 1526 is essentially impervious to diffusion therethrough of the fluids used by fuel cell 10, e.g., synthesis gas or pure hydrogen as fuel, as well as, e.g., air or $O_2$ as an oxidant, but allows diffusion of oxygen ions and/or protons, depending upon the particular embodiment and its application.

Cathode 1528 may be formed of a mixture of an electrochemically catalytic ceramic and an ionic phase. The electrochemically catalytic phase consists of at least one of LSM ($La_{1-x}Sr_xMnO_3$, x=0.1 to 0.3), $La_{1-x}Sr_xFeO_3$, (such as x=0.3), $La_{1-x}Sr_xCo_yFe_{1-y}O_3$ (such as $La_{0.6}Sr_{0.4}Co_{0.2}Fe_{0.8}O_3$) and/or $Pr_{1-x}Sr_xMnO_3$ (such as $Pr_{0.8}Sr_{0.2}MnO_3$), although other materials may be employed without departing from the scope of the present invention. For example, it is alternatively considered that Ruddlesden-Popper nickelates and $La_{1-x}Ca_xMnO_3$ (such as $La_{0.8}Ca_{0.2}MnO_3$) materials may be employed. The ionic phase may be YSZ containing from 3-8 mole percent yttria, or ScSZ containing 4-10 mole percent scandia and optionally a second dopant of Al, Y or ceria at minor content (~1 mole percent) for high scandia stabilized zirconias (8-10ScSZ) to prevent formation of the rhombohedral phase. The electrochemically catalytic ceramic phase can comprise 40-60% by volume of the cathode.

Cathode current collector 1550 is an electrode conductive layer formed of an electronically conductive ceramic and in many cases is similar in its chemistry to that of the electrochemically catalytic ceramic phase of the cathode, for example, a LSM+YSZ cathode will generally employ a LSM (La1-xSrxMnO3, x=0.1 to 0.3) cathode current collector. Other embodiments of cathode current collectors may include at least one of $LaNi_xFe_{1-x}O_3$ (such as $LaNi_{0.6}Fe_{0.4}O_3$), $La_{1-x}Sr_xMnO_3$ (such as $La_{0.75}Sr_{0.25}MnO_3$), doped lanthanum chromites (such as $La_{1-x}Ca_xCrO_{3-\delta}$, x=0.15-0.3), and/or $Pr_{1-x}Sr_xCoO_3$, such as $Pr_{0.8}Sr_{0.2}CoO_3$. In other embodiments, cathode current collector 1550 may be formed of other materials, e.g., a precious metal cermet, although other materials may be employed without departing from the scope of the present invention. The precious metals in the precious metal cermet may include, for example, Pt, Pd, Au, Ag and/or alloys thereof. Non electrically conducting ceramic phase may also be included, for example, YSZ, ScSZ and $Al_2O_3$, or other ceramic materials. One specific example of cathode current collector 1550 materials is 80 wt % Pd-20 wt % LSM.

An interconnect formed of a peroveskite ceramic, particularly chromite based perovskites, may provide long-term stability in both oxidizing and reducing conditions, and with proper doping, may exhibit satisfactory electronic conductivity at the operating temperature of the fuel cell, e.g., with the inclusion of A-site dopants. In addition, the conductivity of peroveskite ceramics increases with temperature, a feature which is desirable for use in some fuel cell systems, such as solid oxide fuel cell systems. Chromite based peroveskite ceramics require a high sintering temperature for densification, e.g., on the order of 1750° C. for undoped lanthanum chromite, and on the order of 1450° C. for doped lanthanum chromite. However, it is desirable to sinter some fuel cell system films/layers at temperatures in the range of 1350° C. or lower, because higher sintering temperatures may result in undesirable electrode or other microstructures, and/or may result in poor fuel cell system performance.

In addition, undoped lanthanum chromite has very low conductivity. In order to achieve high conductivity, A-site dopants are needed, such as Sr, Ca and Mg cations. However, increased A-site doping yields both a thermal expansion coefficient increase and a chemical coefficient of expansion increase (the latter believed to originate from an oxygen vacancy-triggered lattice expansion under a low partial-oxygen-pressure environment) in the lanthanum chromite. The dimensional change in an interconnect formed from such a doped lanthanum chromite may create significant local thermal stresses in the interconnect and in other fuel cell layers, and may cause microcracks, which may result in undesirable gas leakages.

In the embodiment described herein, all of the fuel cell system 1510 layers are printed on porous ceramic substrate 1514. Interconnect 1516 is disposed between the extended anode current collector 1548 (the extended portion of anode current collector 1548 in direction 1536 beyond the bounds of anode 1524) and the extended cathode current collector 1550 (the extended portion of cathode current collector 1550 in direction 1536 beyond the bounds of cathode 1528) in direction 1532. Interconnect 1516 is disposed between electrolytes 1526 of adjacent electrochemical cells 1512 in direction 1536. In the illustrated embodiment, the sintering temperature for interconnect 1516 is primarily constrained by the sintering temperature of anode 1524, anode current collector 1548, and electrolyte 1526. The use of too high a sintering temperature for interconnect 1516 could potentially result in: (1) undesired microstructure for anode 1524, and hence the concomitant poor fuel cell performance resulting therefrom; (2) continued shrinkage of porous substrate 1514 during interconnect firing, which may cause misalignment for the following layers to be printed. Densification of the porous anode barrier may also cause high diffucional resistance for transport of fuel and reactant products to and from the fuel cell. Severe misalignment could potentially result in short-circuits between cells; and (3) interaction between the anode current collector 1548 and the interconnect 1516, which may form an undesirable phase at high temperatures. Thus, in view of the above, it is desirable to avoid the use of a material for interconnect 1516 that requires high firing/sintering temperature.

The primary functions of an interconnect, such as interconnect 1516, is to connect to adjacent electrochemical cells together electronically, and to separate fuel and oxidant, e.g., fuel and air, by being gastight. Chromite—based peroskite materials are desirable as interconnects given their low cost and known acceptable electrical conductivity in the dual (oxidizing and reducing) environment experienced by the interconnect and the satisfactory thermal and chemical expansion of this class of material. In the illustrated embodiment, given the illustrated and described location of interconnect 1516, it will be understood that interconnect 1516 can be printed before or after anode 1524 or after printing of electrolyte 1526. Preferably, but not necessarily, interconnect 1516 would be co-fired with anode current collector 1548, anode 1524, and electrolyte 1526. It is desirable that interconnect 1516, in conjunction with electrolyte 1526, forms a gastight layer, thus preventing any commingling of fuel and oxidant. Thus, it is desirable that not only electrolyte 1526, but also interconnect 1516, be gastight. Accordingly, during fuel cell processing, that is, during the manufacture of fuel cell system 1510, it is desirable that interconnect 1516 densified for gastight operation during fuel cell system 1510 operations.

At the same time, however, it is desirable that interconnect 1516 be chemically compatible with anode current collector 1548, cathode current collector 1550 and electrolyte 1526. In addition, it is desirable that no new phases be formed, during the firing/sintering of interconnect 1516, at the interfaces between interconnect 1516, anode current collector 1548, cathode current collector 1550 and electrolyte 1526, such as pyrochlore, which is an insulating phase that may be formed through interaction between lanthanum chromite and all YSZ under certain conditions. In the present embodiment, because anode current collector 1548 and electrolyte 1526 are fired at a relatively higher temperature in comparison to the cathode current collector 1550, an increased likelihood of interaction between interconnect 1516 and anode current collector 1548 and electrolyte 1526 is presented. Thus, in order to achieve a gastight interconnect 1516; and a gastight layer formed by interconnect 1516 and electrolyte 1526; and to electronically connect adjacent electrochemical cells 1512; without forming an undesirable phase at any of the interfaces with interconnect 1516; and without forming microcracks in interconnect 1516 or any other layer that may otherwise result from thermal and chemical expansion of interconnect 1516, it is desirable to achieve satisfactory densification and gas-tightness of the interconnect 1516 comprised of doped lanthanum chromite at a firing temperature that is compatible with the firing of the other layers comprising the fuel cell. The challenge is that the desired densification can not be achieved for chromite-based perovskites when sintering under constrained condition and normal fuel cell processing temperatures.

Accordingly, in accordance with embodiments of the present invention, interconnect 1516 is formed of a pre-mixed ceramic/metal composite formulation that is printed (deposited) as a single film/layer and then sintered. In one form, the single layer formed by the sintered pre-mixed ceramic/metal composite is solely what forms interconnect 1516. In other embodiments, interconnect 1516 may be formed by more than one layer of the pre-mixed ceramic/metal composite, and/or may incorporate one or more other films/layers, components and/or features. In various embodiments, interconnect 1516 is formed of a ceramic/metal composite having an electronically conductive ceramic phase, referred to herein as a conductive ceramic or a conductive ceramic phase, and a metallic phase in the form of one or more precious metals and/or one or more precious metal alloys. In some embodiments, the metallic phase may also include non-precious metals, such as Cu, to aid in densification of the composite formulation and/or wetting of the ceramic phase to facilitate infusion into the conductive ceramic. Compositional levels of the non-precious metals are such that they remain in the molten alloy rather than oxidizing at the firing temperatures of the fuel cell. It will be understood that the term, "pre-mixed ceramic/metal composite," refers to the ceramic phase and the metallic phase being mixed together prior to firing/sintering, whereby the firing/sintering process transforms the combination of the ceramic phase and the metallic phase into a unitary ceramic/metal composite material. As used herein with respect to fuel cell system 1510, the terms "sintering," "firing," "firing/sintering" and the like are synonymous, and when used with respect to interconnects 1516 refer to heating to a temperature sufficient to both densify the ceramic phase and melt the metallic phase. The conductive ceramic phase is less than 100 v %, and is equal to or greater than approximately 70 v %. In one form, the metallic phase is less than 30 v %, and exists as isolated phase that fills pore spaces within the conductive ceramic phase. As such, the metallic phase generally does not contribute much, if any, to the conductivity of interconnect 1516 if metallic content is much lower than the percolation point, ~30 v %. Besides, in this embodiment, the current flow through the thin interconnect film takes place without in-plane conduction. Low interconnect ASR can be achieved with reasonable conductivity. For example, if the conductivity of the conductive ceramic is 1 S/cm and the thickness of the interconnect layer is 20 microns, the theoretical ASR contribution from the interconnect is 0.002 ohm-cm^2, which meets the performance target for most fuel cell systems. In some cases, the metallic phase can be up to 30 v % to reach percolation for higher conductivity to meet fuel cell system performance requirement.

In one form, the conductive ceramic phase is in the range of approximately 80-99 v %; and the metallic phase in the form of one or more precious metals and/or one or more precious metal alloys in the range of approximately 1-20 v %. In other embodiments, the conductive ceramic phase v % and the metallic phase v % may be outside these ranges. Although any precious metal may be used, depending on the sintering temperature constraints and/or other factors, precious metals currently contemplated include precious metal alloys that will melt at desired firing temperatures, for example and without limitation, Ag—Pd, Ag—Pt, Au—Pd, and Au—Pt, and/or other binary systems, and/or ternary systems and/or quaternary systems employing only the precious metals. In some embodiments, other metals, such as Cu, may be combined with the precious metal and/or precious metal alloy in order to enhance the diffusion between the liquid and solid phases during sintering, thus improving the densification of the ceramic-metal composite.

In one form, the conductive ceramic phase is a doped lanthanum chromite of the form $(La_{1-x}A_x)(Cr_{1-y}B_y)O_3$, wherein A is an alkaline earth metal, such as Ca or Sr; B is a transition metal, or at least one of the transition metals, such as Mn, V, Ti, Fe, Co, Ni, Cu, Zn; $0<x<0.4$; and $0<y\leq0.5$ depending on the doping elements. For $La_{1-x}Sx Cr_{1-y}Mn_yO_3$ (LSCM), y can be up to 0.5.

In other embodiments, the conductive ceramic phase may employ other conductive ceramics in addition to or in place of doped lanthanum chromite. For example, other embodiments contemplate the use of doped strontium titanate and/or doped yttrium chromite to form all or part of the conductive ceramic phase. Doped strontium titanate may be of the form $(Sr_{1-x}A_x)(Ti_{1-y}B_y)O_3$, wherein A is a rare earth element, such as La, Y, Yb; B is transition metal, or at least one of the transition metals, such as Mn, V, Ti, Fe, Co, Ni, Cu, Zn; $0<x<0.5$ depending on doping element; and $0<y\leq0.5$ depending on the doping element. For $Sr_{1-x}La_xTi_{1-y}Mn_yO_3$ (LSTM), x can be up to 0.4, and y can be up to 0.5. Doped yttrium chromites may take the form $(Y_{1-x}A_x)(Cr_{1-y}B_y)O_3$, wherein A is an alkaline earth metal, such as Ca, Sr; B is transition metal, or at least one of the transition metals, such as Mn, V, Ti, Fe, Co, Ni, Cu, Zn; $0<x<0.4$; and $0<y\leq0.5$ depending on the doping elements. For $La_{1-x}S_xCr_{1-y}Mn_yO_3$ (LSCM), y can be up to 0.5.

In one form, the conductive ceramic phase is provided in the form of a conductive ceramic powder having a particle size in the range of 0.04 to 2.0 microns, preferably from 0.1 to 1.0 microns, uniformly dispersed in a solvent with the polymer, such as terpineol, to form a printable paste. In other embodiments, the conductive ceramic phase may be provided in one or more other forms. In one form, the metal phase is in the form of powdered precious metal and/or print precious metal alloy having a particle size in the range of 0.05 to 3.0 microns, and uniformly dispersed in the solvent with the ceramic phase and polymer, such as terpineol, to form a printable paste. In other embodiments, the metallic phase may be provided in one or more other forms. In order to form interconnect 1516, the paste dispersed with the particles of the metallic and conductive ceramic phases is first printed/deposited onto the appropriate location of each electrochemical cell 1512, and then interconnect 1516 is fired/sintered.

The precious metal and or precious metal alloy phase has a lower melting point than the conductive ceramic phase, and can form a liquid phase during the firing/sintering of the interconnect 1516. The capillary force of the liquid phase is believed to pull ceramic particles together for microstructural rearrangement to achieve better densification. In addition, by selecting one or more desired binary systems, for example and without limitation, Ag—Pd, Ag—Pt, Au—Pd, Au—Pt and Pd—Pt; and/or one or more ternary systems employing only the precious metals, for example and without limitation, Ag—Pd—Pt, Au—Pt—Au, etc.; and/or one or more quaternary systems employing only the precious metals, e.g., Ag—Pd—Pt—Au, etc.; the temperature of the liquid metal phase formation may be controlled, e.g., thereby controlling the degree to which the metallic phase flows into the pores of the conductive ceramic phase. In some embodiments, non-precious metal, such as Cu be alloyed and/or mixed (e.g., a mixture of metallic powders) with one of the precious metals and/or precious metal alloys to enhance the diffusion between the liquid and solid phases during sintering, thus improving the densification of the ceramic-metal composite. The metallic phase, acting as a filler, filling up what would otherwise be open pores in the ceramic phase, e.g. in the doped lanthanum chromite, can improve the densification of interconnect 1516, and hence rendering a more gastight interconnect 1516 having a porosity of approximately 5% or less.

In addition, the ceramic/metal composite interconnect has a lower Young's modulus than doped lanthanum chromite, and may significantly reduce thermal stress in the fuel cell layers during fuel cell manufacturing, testing and normal operation. Although conventional doped lanthanum chromite exhibits isothermal expansion during fuel cell processing and/or operating conditions of up to 0.3-0.4%, as opposed to generally accepted interconnect dimensional change limits in a fuel cell stack of less than 0.1%, interconnect 1516 is relatively soft due to the inclusion of the precious metal(s) and/or alloys, which may significantly reduce the thermal stress resulting from interconnect dimensional change, and prevent microcracks in fuel cell layers. In view of the above, it is seen that an interconnect formed of a ceramic/metal composite having a conductive ceramic phase mixed with a metallic phase, as described herein, may aid in the sintering of the interconnect, fill pores in the doped lanthanum chromite to achieve a dense interconnect layer, and function as an energy absorber to reduce thermal stress resulting from isothermal expansion of doped lanthanum chromite under reducing atmosphere conditions. In addition, the metallic phase may also help to improve composite interconnect conductivity in embodiments where such is desired, in particular, by selecting a metallic phase content in the range of approximately 30% by volume or more. Since the primary interconnect of a segmented-in-series cell design is thin and small, usually a very narrow strip, the performance/cost ratio may thus be improved with the further addition of a small amount of metallic phase in interconnect 1516, e.g., beyond 1-20 v %, as needed to reach a metallic phase content of interconnect 1516 in the range of approximately 30% by volume or more.

In the embodiments of FIG. 20, various features, components and interrelationships therebetween of aspects of embodiments of the present invention are depicted. However, the present invention is not limited to the particular embodiments of FIG. 20 and the components, features and interrelationships therebetween as are illustrated in FIG. 20 and described herein.

Figure 21:
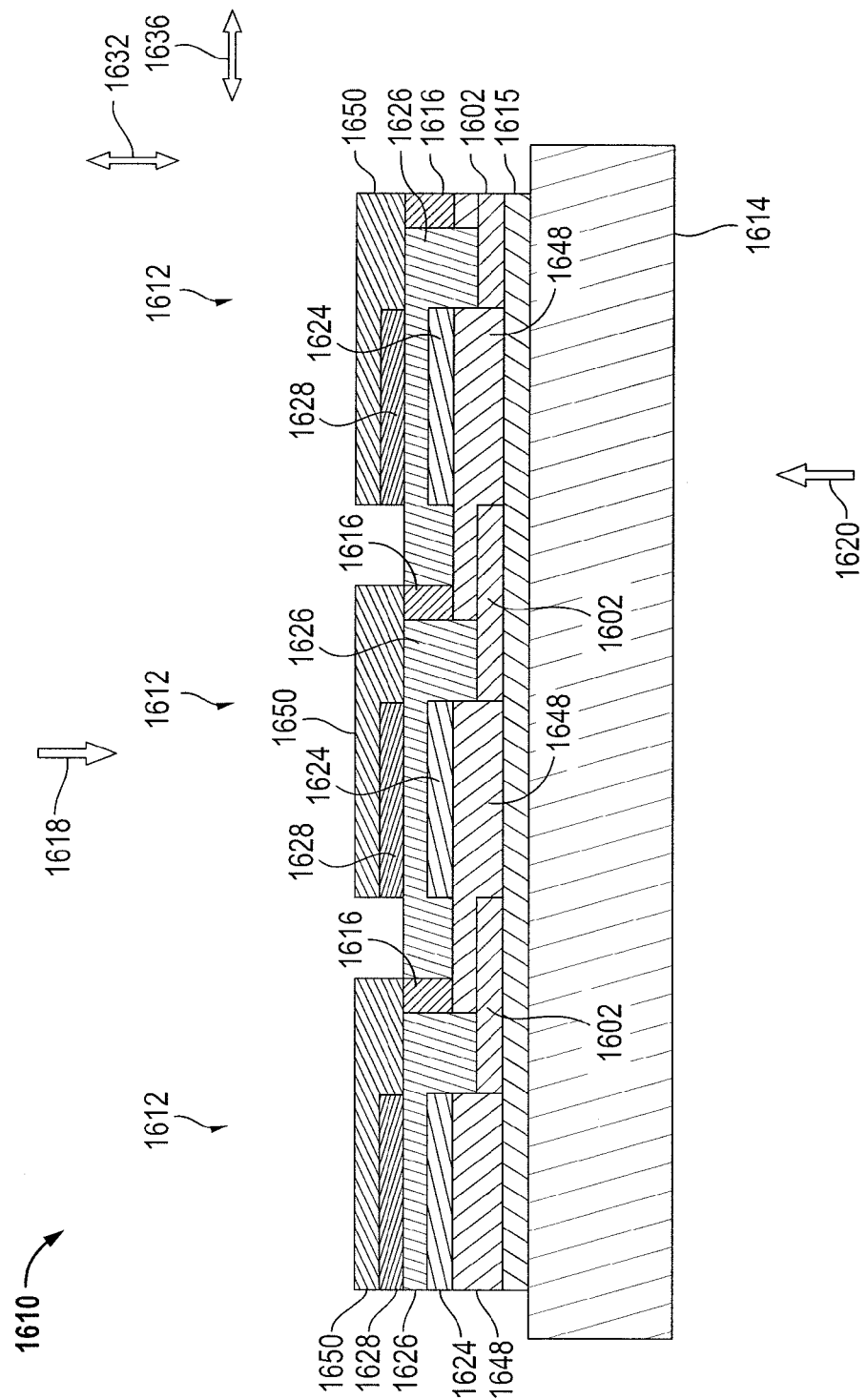
FIG. 21 schematically depicts, in cross section, some aspects of a non-limiting example of a fuel cell system.

Referring to FIG. 21, a fuel cell system 1610 is illustrated. Fuel cell system 1610 is the baseline fuel cell system configuration that serves as a backdrop against which the fuel cell systems 1710, 1810, 1910 and 2010 of FIGS. 22-25 may be compared. Many common components are shared in common as between fuel cell systems 1610, 1710, 1810, 1910 and 2010, and hence, the same reference characters (numbers) are employed in describing the same fuel cell system components illustrated in FIGS. 21-25, notwithstanding that some components, such as one or more porous anode barriers may or may not be segmented in the various embodiments. Each of fuel cell systems 1610, 1710, 1810, 1910 and 2010 employ an external reformer (not shown) to reform the hydrocarbon feed, e.g., a steam reformer and/or any other suitable reformer-type, to generate the hydrocarbon-sourced syngas that functions as a fuel in the electrochemical cells of these fuel cell systems. Although it may be possible to perform partial or complete on-cell reforming, i.e., reforming that is performed within the fuel cell stack, there are certain dangers and/or other adverse effects associated with on-cell reforming, rendering on-cell reforming undesirable, and which are preferably and should be avoided by the use of external reforming to sufficiently reform the hydrocarbon feed and essentially prevent and eliminate the possibility of on-cell reforming.

Fuel cell system 1610 includes a plurality of electrochemical cells 1612. In one form, electrochemical cells 1612 are solid oxide fuel cells (SOFCs). In other embodiments, electrochemical cells 1612 may be one or more other types of fuel cells. In one form, fuel cell system 1610 is configured as a segmented-in-series fuel cell, that is, wherein electrochemical cells 1612 are arranged in a segmented-in-series configuration. It will be understood not only a limited number of electrochemical cells 1612 are illustrated, and that those to the right and to the left of the drawing illustrated in FIG. 21 are truncated for purposes of clarity of illustration, whereas the actual number of electrochemical cells 1612 in a particular fuel cell system 1610 may be any number greater or lesser than that illustrated in FIG. 21.

Electrochemical cells 1612 are supported by a porous ceramic substrate 1614. Fuel cell system 1610 includes a plurality of interconnects 1616 that are configured to conduct free electrons between adjacent electrochemical cells 1612. In one form, a porous anode barrier (PAB) 1615 is disposed between electrochemical cells 1612 and porous substrate 1614. Porous anode barrier 1615 is configured to prevent reactions between the anodes of electrochemical cells 1612 and the porous substrate 1614, and/or the anode current collectors and the porous substrate 1614. However, porous anode barrier 1615 is not considered an active part of electrochemical cells 1612 or fuel cell system 1610, insofar as porous anode barrier 1615 does not provide electrical conduction within electrochemical cells 1612 or as between electrochemical cells 1612, and does not partake in the electrochemical reactions that generate electrical power from fuel. In other embodiments, one or more other layers in addition to or in place of porous anode barrier 1615 may be employed. In still other embodiments, there may be no such porous anode barrier or other layer separating electrochemical cells 1612 from porous substrate 1614, or there may be one or more other layers in addition to or in place of porous anode barrier 1615. An oxidant is supplied to electrochemical cells 1612 from an oxidant side 1618. In one form, the oxidant is air. In other embodiments other oxidants may be used in addition to or in place of air. Fuel is supplied to electrochemical cells 1612 on a fuel side 1620 via porous substrate 1614. In some embodiments, channels and/or other passages may be etched or otherwise formed into porous substrate 1614 in order to facilitate the flow of fuel into electrochemical cells 1612. In one form, the fuel is syngas. In other embodiments, other fuels may be used, e.g. hydrogen. In addition, in other embodiments, fuel cell system 1610 and electrochemical cells 1612 may be configured and arranged so that fuel and oxidant are supplied from opposite or other directions than those described and illustrated herein.

Each electrochemical cell 1612 includes an anode 1624, and electrolyte 1626 and a cathode 1628. Cathode 1628 is spaced apart from anode 1624 in a vertical direction 1632; and electrolyte 1626 is disposed between anode 1624 and cathode 1628. Electrolyte 1626 is in contact with both an anode 1624 and cathode 1628 for performing electrochemical reactions within each electrochemical cell 1612. Electrochemical cells 1612 are arranged in series in a horizontal direction 1636. Although the present fuel cells described using vertical direction 1632 and horizontal direction 1636, it will be understood that these directions are illustrative only, and that other fuel cell orientations may be employed, which may employ other directional axes in addition to or in place of direction 1632 and direction 1636.

Each electrochemical cell 1612 also includes an anode current collector 1648 and cathode current conductor 1650. Anode current collector 1648 is electrically coupled to and in contact with anode 1624, and cathode current collector 1650 is electrically coupled to and in contact with cathode 1628. Depending upon the embodiment, anode current collector 1648 and cathode current collector 1650 may be alternatively and respectively referred to as anode and cathode conductive films; anode and cathode conductive layers; anode and cathode conductor films; and/or anode and cathode conductor layers. Interconnects 1616 electrically couple anode current collectors 1648 and cathode current collectors 1650 of adjacent cells for the transmission of electric current. The porosity of each of porous substrate 1614, porous anode barrier 1615 and anode current collector 1648 are configured to supply anode 1624 with fuel from fuel side 1620. Thus, anode 1624 receives fuel via porous substrate 1614, porous anode barrier 1615 and anode current collector 1648.

Fuel cell system 1610 also includes a ceramic seal 1602. In one form, a plurality of ceramic seals 1602 are applied on top of porous anode barrier 1615. Ceramic seals 1602 are positioned horizontally in direction 1636 between the anode current collectors 1648 of an adjacent electrochemical cells 1612. In other embodiments, ceramic seal 1602 may be located in other orientations and locations. Ceramic seal 1602 has a thickness, i.e., as measured in vertical direction 1632, of approximately 5-30 microns, although other thickness values may be employed in other embodiments. In one form, ceramic seal 1602 is impervious to gases and liquids, such as the fuel and oxidants employed by electrochemical cells 1612, and is configured to prevent the leakage of gases and liquids from substrate porous anode barrier 1615 in those areas where it is applied. In other embodiments, ceramic seal 1602 may be substantially impervious to gases and liquids, and may be configured to reduce leakage of gases and liquids from porous anode barrier 1615 in those areas where it is applied, e.g., relative to other configurations that do not employ a ceramic seal. Ceramic seal 1602 is configured to provide an essentially "gas-tight" seal between porous anode barrier 1615 and fuel cell components disposed on the side of ceramic seal 1602 opposite of that of porous anode barrier 1615.

Ceramic seal 1602 is formed from a ceramic material. In one form, the ceramic material used to form ceramic seal 1602 is yttria stabilized zirconia, such as 3YSZ. In some embodiments, the material used to form ceramic seal 1602 may be scandia stabilized zirconia, such as 4ScSZ. In other embodiments, the material used to form ceramic seal 1602 may be alumina. In still other embodiments, the material used to form 1602 seal 102 may be non-conductive pyrochlore materials, such as $La_2Zr_2O_7$. Other embodiments may employ other ceramics, e.g., depending upon various factors, such as compatibility with the materials of adjacent portions of each electrochemical cell 1612 and porous anode barrier 1615, the fuels and oxidants employed by fuel cell system 1610, and the local transient and steady-state operating temperatures of fuel cell system 1610. Still other embodiments may employ materials other than ceramics. In some embodiments, such as those described and illustrated with respect to FIG. 25, ceramic seal 1602 may just be disposed adjacent to that is on top of, in vertical direction 1632, substrate 1614.

In one form, fuel cell system 1610 is formed by depositing films/layers onto porous substrate 1614, e.g., by screen printing and/or inkjet printing, to provide porous anode barrier 1615, interconnects 1616, anodes 1624, electrolytes 1626, cathodes 1628, anode current collectors 1648 and cathode current collectors 1650. In other embodiments, the films/layers may be deposited by one or more other techniques in addition to or in place of screen printing and/or inkjet printing. In still other embodiments, the aforementioned components may be thicker than what may be known as a film, and may be deposited by the same or other means. In various embodiments, one or more firing/sintering cycles are performed subsequent to depositing one or more films/layers. Other embodiments may not require any firing/sintering for one or more films/layers. Examples of materials that may be used to form porous substrate 1614, and materials that may be used to form the films/layers that yield anode barrier 1615, interconnects 1616, anodes 1624, electrolytes 1626, cathodes 1628, anode current collectors 1648 and cathode current collectors 1650 are described as follows.

In one form, porous substrate 1614 is made of MgO—MgAl2O4 (MMA). In other embodiments, other materials may be employed in addition to or in place of MMA, such as doped zirconia.

In one form, porous anode barrier 1615 is made from an inert porous ceramic material, e.g., a doped zirconia, such as 3YSZ. In other embodiments, other materials may be employed, such as SrZrO3, or SrTiO3-doped zirconia composite. Porous anode barrier 1615 is configured to prevent NiO in anode 1624 and Ni or Ni-containing compounds in anode current collector 1648 from interacting with MgO in porous substrate 1614.

In one form, anode current collector 1648 is an electrode conductive layer formed of a nickel cermet. Examples of suitable nickel cermets include, Ni—YSZ (yttria doping in zirconia is 3-8 mol %,), Ni—ScSZ (scandia doping is 4-10 mol %, preferably second doping for phase stability for 10 mol % scandia-$ZrO_2$) and/or Ni-doped ceria (such as Gd or Sm doping), Ni plus doped lanthanum chromite (such as Ca doping on A site and Zn doping on B site), Ni plus doped strontium titanate (such as La doping on A site and Mn doping on B site) and/or Ni lus $La_{1-x}Sr_xMn_yCr_{1-y}O_3$. Alternatively, it is considered that other materials for anode current collector 1648 may include cermets based in part or whole on one or more precious metals and/or one or more precious metal alloys. Precious metals in the cermet may include, for example, Pt, Pd, Au, Ag, and/or alloys thereof. The ceramic phase may include, for example, an inactive non-electrically conductive phase, including, for example, YSZ, ScSZ and/or one or more other inactive phases, e.g., having desired coefficients of thermal expansion (CTE) in order to control the CTE of the layer to match the CTE of the substrate and electrolyte. In some embodiments, the ceramic phase may include $Al_2O_3$ and/or a spinel such as $NiAl_2O_4$, $MgAl_2O_4$, $MgCr_2O_4$, $NiCr_2O_4$. In other embodiments, the ceramic phase may be electrically conductive, e.g., doped lanthanum chromite, doped strontium titanate and/or one or more forms of LaSrMnCrO. One specific example of anode current collector 1648 material is 76.5% Pd, 8.5% Ni, 15%3YSZ.

In one form, anode 1624 may be formed of xNiO-(100-x)YSZ (x is from 55 to 75 in weight ratio), yNiO-(100-y)ScSZ (y is from 55 to 75 in weight ratio), NiO-gadolinia stabilized ceria (such as 55 wt % NiO-45 wt % GDC) and/or NiO samaria stabilized ceria. In other embodiments, other materials may be employed. For example, it is alternatively considered that anode 1624 may be made of doped strontium titanate and/or $La_{1-x}Sr_xMn_yCr_{1-y}O_3$ (e.g., $La_{0.75}Sr_{0.25}Mn_{0.5}Cr_{0.5}O_3$).

In one form, electrolyte 1626 is a ceramic material. For example, in some embodiments, a proton and/or oxygen ion conducting ceramic, may be employed. In one form, electrolyte 1626 is formed of YSZ, such as 3YSZ and/or 8YSZ. In other embodiments, electrolyte 1626 may be formed of ScSZ, such as 4ScSZ, 6ScSz and/or 10ScSZ in addition to or in place of YSZ. In other embodiments, other materials may be employed in addition to or in place of the aforementioned materials. For example, it is alternatively considered that electrolyte 1626 may be made of or may include doped ceria and/or doped lanthanum gallate. In any event, electrolyte 1626 is essentially impervious to diffusion therethrough of the fluids used by fuel cell 10, e.g., synthesis gas or pure hydrogen as fuel, as well as, e.g., air or $O_2$ as an oxidant, but allows diffusion of oxygen ions and/or protons, depending upon the particular embodiment and its application.

Cathode 1628 may be formed of at least one of LSM ($La_{1-x}Sr_xMnO_3$, x=0.1 to 0.3), $La_{1-x}Sr_xFeO_3$, (such as x=0.3), $La_{1-x}Sr_xCo_yFe_{1-y}O_3$ (such as $La_{0.6}Sr_{0.4}Co_{0.2}Fe_{0.8}O_3$) and/or $Pr_{1-x}Sr_xMnO_3$ (such as $Pr_{0.8}Sr_{0.2}MnO_3$), although other materials may be employed without departing from the scope of the present invention. For example, it is alternatively considered that Ruddlesden-Popper nickelates and $La_{1-x}Ca_xMnO_3$ (such as $La_{0.8}Ca_{0.2}MnO_3$) materials may be employed.

Cathode current collector 1650 is an electrode conductive layer formed of an electronically conductive ceramic, for example, at least one of $LaNi_xFe_{1-x}O_3$ (such as $LaNi_{0.6}Fe_{0.4}O_3$), $La_{1-x}Sr_xMnO_3$ (such as $La_{0.75}Sr_{0.25}MnO_3$), doped lanthanum chromites (such as $La_{1-x}Ca_xCrO_{3-\delta}$, x=0.15-0.3), and/or $Pr_{1-x}Sr_xCoO_3$, such as $Pr_{0.8}Sr_{0.2}CoO_3$. In other embodiments, cathode current collector 1650 may be formed of other materials, e.g., a precious metal cermet, although other materials may be employed without departing from the scope of the present invention. The precious metals in the precious metal cermet may include, for example, Pt, Pd, Au, Ag and/or alloys thereof. The ceramic phase may include, for example, YSZ, ScSZ and $Al_2O_3$, or other ceramic materials. One specific example of cathode current collector 1650 materials is 80 wt % Pd-20 wt % LSM.

Interconnect 1616 may be formed in the same manner and using the same materials as one or more of the interconnects previously described herein, such as, for example that described with respect to interconnect 16, including blind primary conductor 52, auxiliary conductor 54, and/or auxiliary conductor 56; and interconnect 1516.

It has been found that during certain operating conditions, e.g., at high fuel utilization levels, severe Ni coarsening may occur in anode 1624, and Ni coarsening and/or Ni material loss may also occur in anode current collector 1648. It is believed that the mechanism that causes the coarsening include a high steam concentration, and the presence of fine Ni and ceramic particles in anode 1624 and anode current collector 1648. The steam concentration, which can reach as high as 50% by volume, includes steam that is supplied as part of the syngas used as a fuel for fuel cell system 1610, and steam generated at the interface between anode 1624 and electrolyte 1626. Under such a high steam content, the Ni(OH)$_2$ vapor pressure is high, especially for fine Ni particles; and Ni loss through Ni(OH)$_2$ vapor phase migration is unavoidable The mechanism for Ni loss is believed to be that set forth by Equation 1:

$$Ni(s)+H_2O(g)=Ni(OH)_2(g) \qquad \text{Equation 1}$$

Equation 1 illustrates that the solid Ni material is reacted into the gaseous form and then migrates from locations in anode 1624 and/or anode current collector 1648, and is deposited in other locations, resulting in undesirable Ni coarsening or loss in the active anode layer, which reduces the efficiency of both anode 1624 and anode current collector 1648. This invention is to provide sacrificial Ni upstream of anode 1624 and anode current collector 1648, so that during the high fuel utilization conditions, the sacrificial Ni will react with steam to form the Ni hydroxide vapor phase, Ni(OH)$_2$(g), and saturate the fuel gas with the Ni hydroxide vapor phase, thereby reducing the reaction of steam with the active anode layers, i.e., anode 1624 and anode current collector 1648. Accordingly, embodiments of the present invention employ a modified porous anode barrier that includes additional Ni in order to protect anode 1624 and anode current collector 1648. This approach is for fuel compositions in which the complete reforming reaction to form the syngas, e.g., steam reforming, is achieved outside of the fuel cell stack, in an external reforming process. These sacrificial nickel layers are not intended to and essentially do not contribute to reforming or further reforming of natural gas or other hydrocarbon feeds, i.e., contribute to essentially no on-cell reforming.

Figure 22:
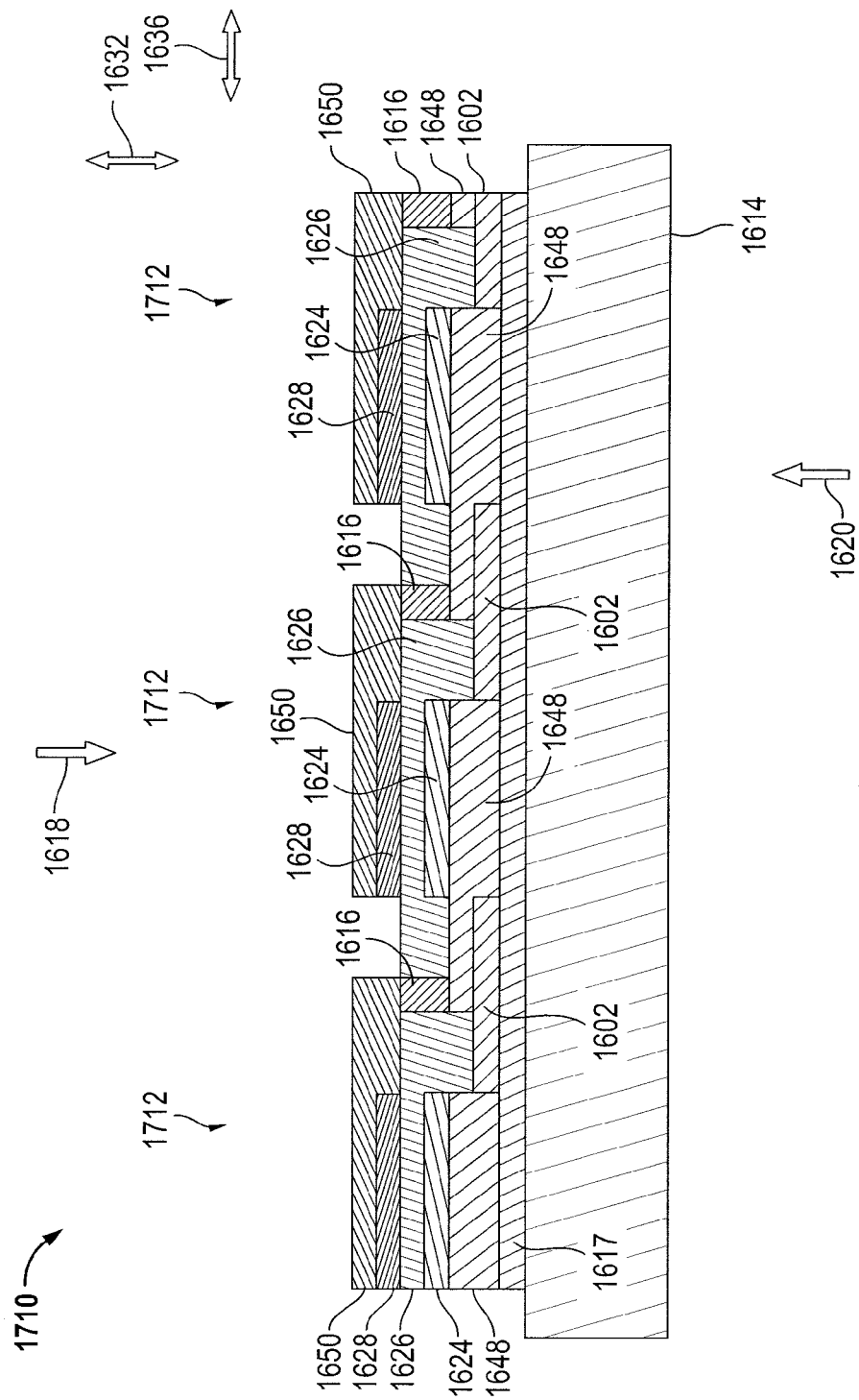
FIG. 22 schematically depicts, in cross section, some aspects of a non-limiting example of a fuel cell system in accordance with an embodiment of the present invention, wherein the fuel cell system employs a porous anode barrier for supplying sacrificial Ni to prevent degradation of the anode and anode current collector.

Referring to FIG. 22, some aspects of a non-limiting example of a fuel cell system 1710 in accordance with an embodiment of the present invention is schematically depicted. Fuel cell system 1710 includes a plurality of electrochemical cells 1712. In one form, electrochemical cells 1712 are solid oxide fuel cells (SOFCs). In other embodiments, electrochemical cells 1712 may be one or more other types of fuel cells. In one form, fuel cell system 1710 is configured as a segmented-in-series fuel cell, that is, wherein electrochemical cells 1712 are arranged in a segmented-in-series configuration. It will be understood not only a limited number of electrochemical cells 1712 are illustrated, and that those to the right and to the left of the drawing illustrated in FIG. 22 are truncated for purposes of clarity of illustration, whereas the actual number of electrochemical cells 1712 in a particular fuel cell system 1710 may be any number greater or lesser than that illustrated in FIG. 22.

Electrochemical cells 1712 are spaced apart in direction 1636, and are supported by porous ceramic substrate 1614. Fuel cell system 1710 includes a plurality of interconnects 1616 that are configured to conduct free electrons between adjacent electrochemical cells 1712. As with fuel cell system 1610, each electrochemical cell 1712 includes an anode 1624, and electrolyte 1626, a cathode 1628, an anode current collector 1648 and a cathode current collector 1650, each of which are arranged as set forth above with respect to electrochemical cells 1612. Interconnect 1616 couples the anode current collector 1648 and cathode current collector 1650 of adjacent cells to transmit current from one electrochemical cell 1712 to the next adjacent electrochemical cell 1712. Anode current collector 1648 includes a portion that is vertically disposed between anode 1624 and the porous anode barrier 1617, described below. Fuel cell system 1710 also includes a ceramic seal 1602 disposed adjacent to each of both sides of the portion of each anode current collector 1648 that is vertically below anodes 1624 in direction 1632. Ceramic seals 1602 thus prevent fuel from flowing into electrochemical cells 1712 except that portion which is directly below anodes 1624 in direction 1632. The materials used to form ceramic seal 1602, porous ceramic substrate 1614, interconnect 1616, anode 1624, electrolyte 1626, cathode 1628, anode current collector 1648 and cathode current collector 1650 are the same as those set forth above with respect to FIG. 21.

An oxidant is supplied to electrochemical cells 1712 from an oxidant side 1618. In one form, the oxidant is air. In other embodiments other oxidants may be used in addition to or in place of air. Fuel is supplied to electrochemical cells 1712 on a fuel side 1620 via porous substrate 1614. In some embodiments, channels and/or other passages may be etched or otherwise formed into porous substrate 1614 in order to facilitate the flow of fuel into electrochemical cells 1712. In one form, the fuel is syngas. In other embodiments, other fuels may be used, e.g. hydrogen. In addition, in other embodiments, fuel cell system 1710 and electrochemical cells 1712 may be configured and arranged so that fuel and oxidant are supplied from opposite or other directions than those described and illustrated herein.

Fuel cell system 1710 includes a porous anode barrier (PAB) 1617. Porous anode barrier 1617 is disposed between e have a better matched CTE with the substrate ectrochemical cells 1712 and porous substrate 1614. Porous anode barrier 1617 is configured to prevent reactions between the anodes of electrochemical cells 1712 and the porous substrate 1614, and/or the anode current collectors and the porous substrate 1614. In addition, porous anode barrier 1617 is configured to provide sacrificial Ni upstream of anode 1624 and anode current collector 1648, so that during the high fuel utilization conditions, the sacrificial Ni in porous anode barrier 1617 will react with steam to form the Ni hydroxide vapor phase, Ni(OH)$_2$(g), and saturate the fuel gas supplied via porous substrate 1614 with the Ni hydroxide vapor phase, thereby reducing the reaction of the steam with the active anode layers, i.e., anode 1624 and anode current collector 1648. However, porous anode barrier 1617 is not considered an active part of electrochemical cells 1712 or fuel cell system 1710, insofar as porous anode barrier 1617 does not provide electrical conduction within electrochemical cells 1712 or as between electrochemical cells 1712, and does not partake in the electrochemical reactions that generate electrical power from fuel within electrochemical cells 1712 and fuel cell system 1710. In other embodiments, one or more other layers in addition to or in place of porous anode barrier 1617 may be employed. In still other embodiments, there may be one or more other layers in addition to or in place of porous anode barrier 1617.

In one form, porous anode barrier 1617 is made from a NiO—YSZ mixture. The NiO content is relatively low, compared to anode 1624, and is about 10-30% by weight of porous anode barrier 1617. The NiO provides Ni for reaction with steam to form the desired Ni hydroxide vapor phase, Ni(OH)$_2$(g), for the aforementioned protection of anode 1624 and anode current collector 1648. Although higher concentrations of NiO may provide higher levels of protection, undesirable results would be obtained if the NiO concentration was at or above the percolation threshold, which is approximately 30% Ni metal by volume after reduction. By keeping the NiO concentration below the percolation threshold, porous anode barrier 1617 remains as an insulating phase or has very high electrical resistance, thereby avoiding a short-circuit between adjacent electrochemical cells 1712 through porous anode barrier 1617. In some embodiments, porous anode barrier 1617 is made from a mixture of NiO and $La_2Zr_2O_7$. $La_2Zr_2O_7$ has a slightly lower coefficient of thermal expansion (CTE) than YSZ. By carefully controlling the NiO content in the mixture, a well matched CTE with the substrate can be achieved.

Figure 23:
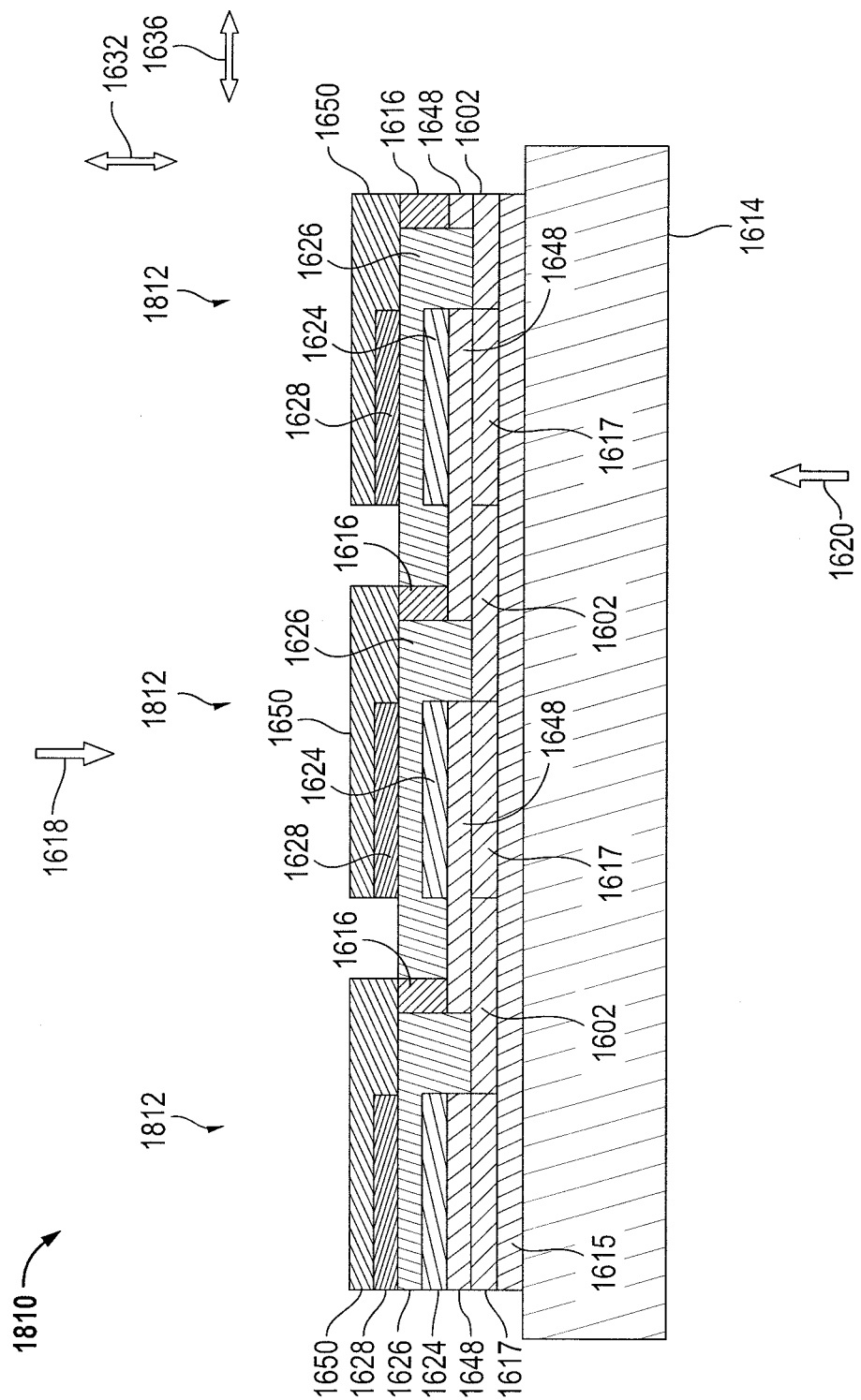
FIG. 23 schematically depicts, in cross section, some aspects of a non-limiting example of a fuel cell system in accordance with an embodiment of the present invention, wherein the fuel cell system employs a porous anode barrier for supplying sacrificial Ni to prevent degradation of the anode and anode current collector.

Referring to FIG. 23, some aspects of a non-limiting example of a fuel cell system 1810 in accordance with an embodiment of the present invention is schematically depicted. Fuel cell system 1810 includes a plurality of electrochemical cells 1812. In one form, electrochemical cells 1812 are solid oxide fuel cells (SOFCs). In other embodiments, electrochemical cells 1812 may be one or more other types of fuel cells. In one form, fuel cell system 1810 is configured as a segmented-in-series fuel cell, that is, wherein electrochemical cells 1812 are arranged in a segmented-in-series configuration. It will be understood not only a limited number of electrochemical cells 1812 are illustrated, and that those to the right and to the left of the drawing illustrated in FIG. 23 are truncated for purposes of clarity of illustration, whereas the actual number of electrochemical cells 1812 in a particular fuel cell system 1810 may be any number greater or lesser than that illustrated in FIG. 23.

Electrochemical cells 1812 are spaced apart in direction 1636, and are supported by porous ceramic substrate 1614. Fuel cell system 1810 includes a porous anode barrier 1615 disposed between electrochemical cells 1812 and porous ceramic substrate 1614. Porous anode barrier 1615 may be the same as that described above with respect to fuel cell system 1610 and FIG. 21. Fuel cell system 1810 includes a plurality of interconnects 1616 that are configured to conduct free electrons between adjacent electrochemical cells 1812. As with fuel cell system 1610, each electrochemical cell 1812 includes an anode 1624, and electrolyte 1626, a cathode 1628, an anode current collector 1648 and a cathode current collector 1650, each of which are arranged as set forth above with respect to electrochemical cells 1612. Interconnect 1616 couples the anode current collector 1648 and cathode current collector 1650 of adjacent cells to transmit current from one electrochemical cell 1812 to the next adjacent electrochemical cell 1812. Fuel cell system 1810 also includes a ceramic seals 1602. The materials used to form ceramic seal 1602, porous ceramic substrate 1614, interconnect 1616, anode 1624, electrolyte 1626, cathode 1628, anode current collector 1648 and cathode current collector 1650 are the same as those set forth above with respect to FIG. 21.

An oxidant is supplied to electrochemical cells 1812 from an oxidant side 1618. In one form, the oxidant is air. In other embodiments other oxidants may be used in addition to or in place of air. Fuel is supplied to electrochemical cells 1812 on a fuel side 1620 via porous substrate 1614. In some embodiments, channels and/or other passages may be etched or otherwise formed into porous substrate 1614 in order to facilitate the flow of fuel into electrochemical cells 1812. In one form, the fuel is syngas. In other embodiments, other fuels may be used, e.g. hydrogen. In addition, in other embodiments, fuel cell system 1810 and electrochemical cells 1812 may be configured and arranged so that fuel and oxidant are supplied from opposite or other directions than those described and illustrated herein.

Fuel cell system 1810 includes a porous anode barrier (PAB) 1617. Porous anode barrier 1617 is disposed vertically in direction 1632 between electrochemical cells 1812 and porous substrate 1614. Porous anode barrier 1617 is provided in segments having the same width as anode 1624, and are disposed below anodes 1624 in direction 1632. Ceramic seals 1602 are disposed between each segment of porous anode barrier 1617 such that there is a ceramic seal 1602 disposed horizontally adjacent to each of both sides of the porous anode barrier 1617 segment of each electrochemical cell 1812. In fuel cell system 1810, porous anode barrier 1615 is continuous, extending along substrate 1614 in direction 1636, and is positioned on top of substrate 1614, and below ceramic seals 1602 and porous anode barrier 1617 segments. Porous anode barrier 1615 is configured to provide a smooth surface for the deposition of other layers, in order to avoid mechanical defects and provide a continuous insulating layer to prevent short circuits between two adjacent cells. Porous anode barrier 1617 is configured to provide sacrificial Ni upstream of anode 1624 and anode current collector 1648, so that during the high fuel utilization conditions, the sacrificial Ni in porous anode barrier 1617 will react with steam to form the Ni hydroxide vapor phase, $Ni(OH)_2(g)$, and saturate the fuel gas supplied via porous substrate 1614 with the Ni hydroxide vapor phase, thereby reducing in the reaction of the steam with the active anode layers, i.e., anode 1624 and anode current collector 1648. Since porous anode barrier 1617 is deposited on top of porous anode barrier 1615, a higher amount of sacrificial NiO can be added into porous anode barrier 1617 without risking short circuits between two adjacent cells. However, porous anode barrier 1617 is not considered an active part of electrochemical cells 1812 or fuel cell system 1810, insofar as porous anode barrier 1617 does not provide electrical conduction within electrochemical cells 1812 or as between electrochemical cells 1812, and does not partake in the electrochemical reactions that generate electrical power from fuel within electrochemical cells 1812 and fuel cell system 1810. In other embodiments, one or more other layers in addition to or in place of porous anode barrier 1617 may be employed. In still other embodiments, there may be one or more other layers in addition to or in place of porous anode barrier 1617.

In one form, porous anode barrier 1617 is made from a mixture of NiO—YSZ. The NiO content may vary with the needs of the application. In one form, the NiO content may be approximately in the range from 10 to 75 wt %. In some embodiments, the NiO content may be in the range of approximately 20 to 50 wt % in order to obtain a better matched CTE with the substrate. In some embodiments, porous anode barrier 1617 may be made from mixture of NiO and $La_2Zr_2O_7$. The NiO provides Ni for reaction with steam to form the desired Ni hydroxide vapor phase, $Ni(OH)_2(g)$, for the aforementioned protection of anode 1624 and anode current collector 1648. Higher concentrations of NiO may be employed relative to the embodiment of FIG. 22, since there is no direct current flow path between adjacent electrochemical cells through porous anode barrier 1617, since it is bound on both sides by ceramic seals 1602. Current will also not flow through porous anode barrier 1615, because the NiO content is below the percolation threshold. In some embodiments, porous anode barrier 1615 is purposely configured to have little or no NiO. Greater protection against anode 1624 and anode current collector 1648 Ni migration may be thus be obtained due to the higher allowable NiO concentration in porous anode barrier 1617 in the embodiment of fuel cell system 1810 and FIG. 23, relative to that of fuel cell system 1710 and FIG. 22.

Figure 24:
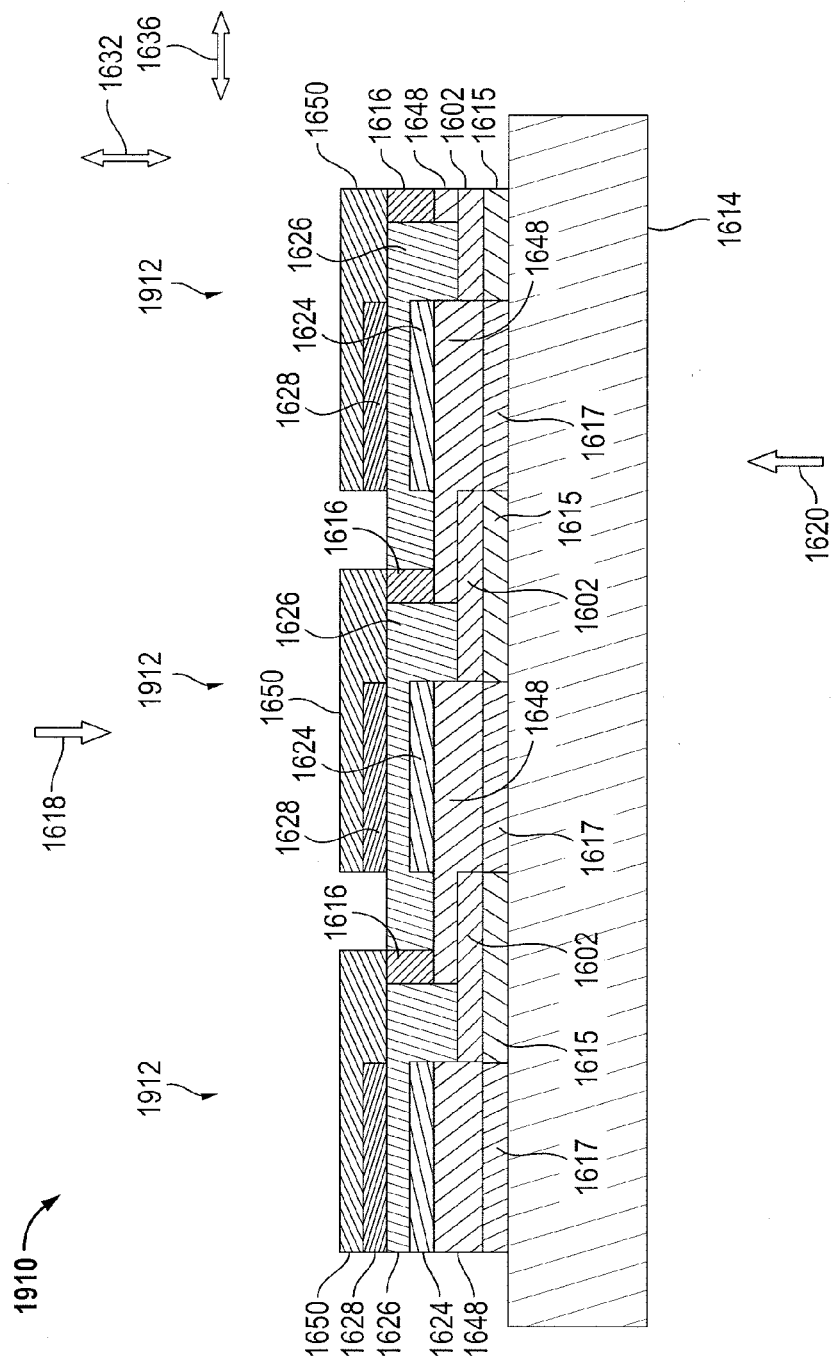
FIG. 24 schematically depicts, in cross section, some aspects of a non-limiting example of a fuel cell system in accordance with an embodiment of the present invention, wherein the fuel cell system employs a porous anode barrier for supplying sacrificial Ni to prevent degradation of the anode and anode current collector.

Referring to FIG. 24, some aspects of a non-limiting example of a fuel cell system 1910 in accordance with an embodiment of the present invention is schematically depicted. Fuel cell system 1910 includes a plurality of electrochemical cells 1912. In one form, electrochemical cells 1912 are solid oxide fuel cells (SOFCs). In other embodiments, electrochemical cells 1912 may be one or more other types of fuel cells. In one form, fuel cell system 1910 is configured as a segmented-in-series fuel cell, that is, wherein electrochemical cells 1912 are arranged in a segmented-in-series configuration. It will be understood not only a limited number of electrochemical cells 1912 are illustrated, and that those to the right and to the left of the drawing illustrated in FIG. 22 are truncated for purposes of clarity of illustration, whereas the actual number of electrochemical cells 1912 in a particular fuel cell system 1910 may be any number greater or lesser than that illustrated in FIG. 22.

Electrochemical cells 1912 are spaced apart in direction 1636, and are supported by porous ceramic substrate 1614. Fuel cell system 1910 includes a plurality of interconnects 1616 that are configured to conduct free electrons between adjacent electrochemical cells 1912. As with fuel cell system 1610, each electrochemical cell 1912 includes an anode 1624, and electrolyte 1626, a cathode 1628, an anode current collector 1648 and a cathode current collector 1650, each of which are arranged as set forth above with respect to electrochemical cells 1612. Interconnect 1616 couples the anode current collector 1648 and cathode current collector 1650 of adjacent cells to transmit current from one electrochemical cell 1912 to the next adjacent electrochemical cell 1912. Anode current collector 1648 includes a portion that is vertically disposed between anode 1624 and the porous anode barrier 1617, described below. Fuel cell system 1910 also includes a ceramic seal 1602 disposed adjacent to each of both sides of the portion of each anode current collector 1648 that is vertically below anodes 1624 in direction 1632. Ceramic seals 1602 thus prevent fuel from flowing into electrochemical cells 1912 except that portion which is directly below anodes 1624 in direction 1632. The materials used to form ceramic seal 1602, porous ceramic substrate 1614, interconnect 1616, anode 1624, electrolyte 1626, cathode 1628, anode current collector 1648 and cathode current collector 1650 are the same as those set forth above with respect to fuel cell system 1610 and FIG. 21.

An oxidant is supplied to electrochemical cells 1912 from an oxidant side 1618. In one form, the oxidant is air. In other embodiments other oxidants may be used in addition to or in place of air. Fuel is supplied to electrochemical cells 1912 on a fuel side 1620 via porous substrate 1614. In some embodiments, channels and/or other passages may be etched or otherwise formed into porous substrate 1614 in order to facilitate the flow of fuel into electrochemical cells 1912. In one form, the fuel is syngas. In other embodiments, other fuels may be used, e.g. hydrogen. In addition, in other embodiments, fuel cell system 1910 and electrochemical cells 1912 may be configured and arranged so that fuel and oxidant are supplied from opposite or other directions than those described and illustrated herein.

Fuel cell system 1910 includes a porous anode barrier 1615 and a porous anode barrier 1617, each of which is in the form of segments. The segments of porous anode barrier 1615 and porous anode barrier 1617 alternate, and are adjacent to each other, side-by-side, and are considered part of the same layer. In one form the width of the porous anode barrier 1617 segments is the same as that of anode 1624. In other embodiments other sizes may be employed. In one form, porous anode barrier 1617 segments are positioned vertically below anode 1624 in direction 1632, whereas porous anode barrier segments 1615 are not so positioned. Porous anode barrier 1615 and porous anode barrier 1617 are disposed between electrochemical cells 1912 and porous substrate 1614. Porous anode barrier 1617 is configured to prevent reactions between the anodes of electrochemical cells 1912 and the porous substrate 1614, and/or the anode current collectors and the porous substrate 1614. In addition, porous anode barrier 1617 is configured to provide sacrificial Ni upstream of anode 1624 and anode current collector 1648, so that during the high fuel utilization conditions, the sacrificial Ni in porous anode barrier 1617 will react with steam to form the Ni hydroxide vapor phase, $Ni(OH)_2(g)$, and saturate the fuel gas supplied via porous substrate 1614 with the Ni hydroxide vapor phase, thereby reducing in the reaction of the steam with the active anode layers, i.e., anode 1624 and anode current collector 1648. However, porous anode barrier 1617 is not considered an active part of electrochemical cells 1912 or fuel cell system 1910, insofar as porous anode barrier 1617 does not provide electrical conduction within electrochemical cells 1912 or as between electrochemical cells 1912, and does not partake in the electrochemical reactions that generate electrical power from fuel within electrochemical cells 1912 and fuel cell system 1910. In other embodiments, one or more other layers in addition to or in place of porous anode barrier 1617 may be employed. In still other embodiments, there may be one or more other layers in addition to or in place of porous anode barrier 1617.

In one form, porous anode barrier 1617 is made from a mixture of NiO—YSZ. The NiO content may vary with the needs of the application. In one form, the NiO content may be approximately in the range from 10 to 75 wt %. In some embodiments, the NiO content may be in the range of approximately 20 to 50 wt % in order to obtain a better matched CTE with the substrate. In some embodiments, porous anode barrier 1617 may be made from mixture of NiO and $La_2Zr_2O_7$. The NiO provides Ni for reaction with steam to form the desired Ni hydroxide vapor phase, $Ni(OH)_2(g)$, for the aforementioned protection of anode 1624 and anode current collector 1648. Higher concentrations of NiO may be employed relative to the embodiment of FIG. 22, since there is no direct current flow path between adjacent electrochemical cells through porous anode barrier 1617, since it is bound on both sides by porous anode barrier 1615. Current will not flow through porous anode barrier 1615, because the NiO content is below the percolation threshold. In some embodiments, porous anode barrier 1615 is purposely configured to have little or no NiO. Greater protection against anode 1624 and anode current collector 1648 Ni migration may be thus be obtained due to the higher allowable NiO concentration in porous anode barrier 1617 in the embodiment of fuel cell system 1910 and FIG. 24, relative to that of fuel cell system 1710 and FIG. 22. Because porous anode barrier layers are sicker then ceramic seal layers, the embodiment of FIG. 24 may keep the surface upon which the electrochemical cells will be printed flatter than in the embodiment of FIG. 23.

Figure 25:
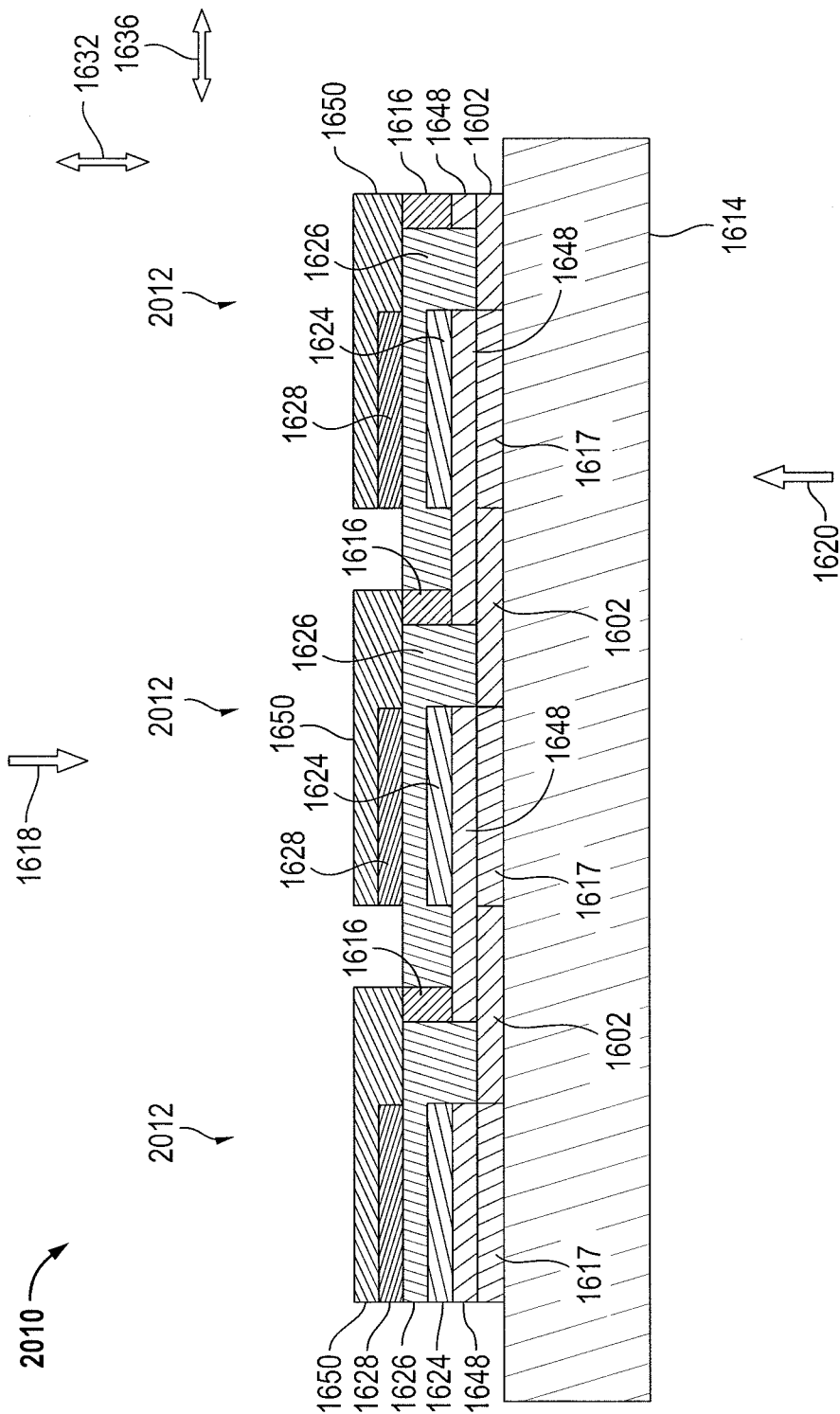
FIG. 25 schematically depicts, in cross section, some aspects of a non-limiting example of a fuel cell system in accordance with an embodiment of the present invention, wherein the fuel cell system employs a porous anode barrier for supplying sacrificial Ni to prevent degradation of the anode and anode current collector.

Referring to FIG. 25, some aspects of a non-limiting example of a fuel cell system 2010 in accordance with an embodiment of the present invention is schematically depicted. Fuel cell system 2010 includes a plurality of electrochemical cells 2012. In one form, electrochemical cells 2012 are solid oxide fuel cells (SOFCs). In other embodiments, electrochemical cells 2012 may be one or more other types of fuel cells. In one form, fuel cell system 2010 is configured as a segmented-in-series fuel cell, that is, wherein electrochemical cells 2012 are arranged in a segmented-in-series configuration. It will be understood not only a limited number of electrochemical cells 2012 are illustrated, and that those to the right and to the left of the drawing illustrated in FIG. 23 are truncated for purposes of clarity of illustration, whereas the actual number of electrochemical cells 2012 in a particular fuel cell system 2010 may be any number greater or lesser than that illustrated in FIG. 23.

Electrochemical cells 2012 are spaced apart in direction 1636, and are supported by porous ceramic substrate 1614. Fuel cell system 2010 includes a plurality of interconnects 1616 that are configured to conduct free electrons between adjacent electrochemical cells 2012. As with fuel cell system 1610, each electrochemical cell 2012 includes an anode 1624, and electrolyte 1626, a cathode 1628, an anode current collector 1648 and a cathode current collector 1650, each of which are arranged as set forth above with respect to electrochemical cells 1612. Interconnect 1616 couples the anode current collector 1648 and cathode current collector 1650 of adjacent cells to transmit current from one electrochemical cell 2012 to the next adjacent electrochemical cell 2012. Fuel cell system 2010 also includes a ceramic seals 1602. The materials used to form ceramic seal 1602, porous ceramic substrate 1614, interconnect 1616, anode 1624, electrolyte 1626, cathode 1628, anode current collector 1648 and cathode current collector 1650 are the same as those set forth above with respect to FIG. 21.

An oxidant is supplied to electrochemical cells 2012 from an oxidant side 1618. In one form, the oxidant is air. In other embodiments other oxidants may be used in addition to or in place of air. Fuel is supplied to electrochemical cells 2012 on a fuel side 1620 via porous substrate 1614. In some embodiments, channels and/or other passages may be etched or otherwise formed into porous substrate 1614 in order to facilitate the flow of fuel into electrochemical cells 2012. In one form, the fuel is syngas. In other embodiments, other fuels may be used, e.g. hydrogen. In addition, in other embodiments, fuel cell system 2010 and electrochemical cells 2012 may be configured and arranged so that fuel and oxidant are supplied from opposite or other directions than those described and illustrated herein.

Fuel cell system 2010 includes a porous anode barrier (PAB) 1617. Porous anode barrier 1617 is disposed vertically in direction 1632 between electrochemical cells 2012 and porous substrate 1614. Porous anode barrier 1617 is provided in segments having the same width as anode 1624, and are disposed below anodes 1624 in direction 1632. Ceramic seals 1602 are disposed between each segment of porous anode barrier 1617 such that there is a ceramic seal 1602 disposed horizontally adjacent to each of both sides of the porous anode barrier 1617 segment of each electrochemical cell 2012. Porous anode barrier 1617 is configured to prevent reactions between the anodes of electrochemical cells 2012 and the porous substrate 1614, and/or the anode current collectors and the porous substrate 1614. In addition, porous anode barrier 1617 is configured to provide sacrificial Ni upstream of anode 1624 and anode current collector 1648, so that during the high fuel utilization conditions, the sacrificial Ni in porous anode barrier 1617 will react with steam to form the Ni hydroxide vapor phase, $Ni(OH)_2(g)$, and saturate the fuel gas supplied via porous substrate 1614 with the Ni hydroxide vapor phase, thereby reducing the reaction of the steam with the active anode layers, i.e., anode 1624 and anode current collector 1648. However, porous anode barrier 1617 is not considered an active part of electrochemical cells 2012 or fuel cell system 2010, insofar as porous anode barrier 1617 does not provide electrical conduction within electrochemical cells 2012 or as between electrochemical cells 2012, and does not partake in the electrochemical reactions that generate electrical power from fuel within electrochemical cells 2012 and fuel cell system 2010. In other embodiments, one or more other layers in addition to or in place of porous anode barrier 1617 may be employed. In still other embodiments, there may be one or more other layers in addition to or in place of porous anode barrier 1617.

In one form, porous anode barrier 1617 is made from a mixture of NiO—YSZ. The NiO content may vary with the needs of the application. In one form, the NiO content may be approximately in the range from 10 to 75 wt %. In some embodiments, the NiO content may be in the range of approximately 20 to 50 wt % in order to obtain a better matched CTE with the substrate. In some embodiments, porous anode barrier 1617 may be made from mixture of NiO and $La_2Zr_2O_7$. The NiO provides Ni for reaction with steam to form the desired Ni hydroxide vapor phase, $Ni(OH)_2(g)$, for the aforementioned protection of anode 1624 and anode current collector 1648. Higher concentrations of NiO may be employed relative to the embodiment of FIG. 22, since there is no direct current flow path between adjacent electrochemical cells through porous anode barrier 1617, since it is bound on both sides by ceramic seals 1602. Greater protection against anode 1624 and anode current collector 1648 Ni migration may be thus be obtained due to the higher allowable NiO concentration in porous anode barrier 1617 in the embodiment of fuel cell system 2010 and FIG. 25, relative to that of fuel cell system 1710 and FIG. 22. In addition, cost may be reduced, relative to the embodiments of FIGS. 23 and 24, since only a single porous anode barrier is printed (porous anode barrier 1617).

In the embodiments of FIGS. 22-25, various features, components and interrelationships therebetween of aspects of embodiments of the present invention are depicted. However, the present invention is not limited to the particular embodiments of FIGS. 22-25 and the components, features and interrelationships therebetween as are illustrated in FIGS. 22-25 and described herein.

Embodiments of the present invention include a fuel cell system, comprising: a plurality of electrochemical cells, each electrochemical cell including an Ni-containing anode, a cathode spaced apart from the anode, and an electrolyte disposed between and in contact with both the anode and the cathode, wherein each anode is formed of a material that includes Ni; and wherein reactions take place during operation of the fuel cell system that have a propensity to react with Ni in each anode and result in Ni migration in each anode; and a plurality of interconnects, each interconnect being configured to conduct free electrons between electrochemical cells; a substrate supporting the electrochemical cells; and a first porous anode barrier disposed between each anode and the substrate, wherein the first porous anode barrier is not an active component of the electrochemical cells; and wherein the first porous anode barrier is configured to provide sacrificial Ni during operation of the fuel cell system to prevent Ni migration in the anode.

In a refinement, the Ni in the anode is in the form of NiO; and Ni in the first porous anode barrier is in the form of NiO.

In another refinement, the electrochemical cells are configured as a segmented-in-series arrangement.

In yet another refinement, each electrochemical cell further comprises a cathode current collector and an anode current collector, wherein at least a portion of the anode current collector is vertically disposed between the anode and the first porous anode barrier and contacts both the anode and the first porous anode barrier.

In still another refinement, the fuel cell system further comprises a plurality of ceramic seals, wherein at least one ceramic seal is disposed horizontally adjacent to each of both sides of the at least a portion of each anode current collector.

In yet still another refinement, the first porous anode barrier is in the form of segments, at least one such segment for each electrochemical cell; further comprising a second porous anode barrier having a different composition than the first porous anode barrier; wherein the second porous anode barrier is also in the form of segments; wherein at least one segment of the second porous anode barrier is disposed horizontally adjacent to each of both sides of each segment of the first porous anode barrier; and wherein only segments of the first porous anode barrier are disposed vertically below the anode of each electrochemical cell.

In a further refinement, the first porous anode barrier is disposed vertically between each ceramic seal and the substrate, and is disposed vertically between each anode current collector and the substrate.

In a yet further refinement, the first porous anode barrier is in the form of segments, at least one such segment for each electrochemical cell; further comprising a plurality of ceramic seals, wherein at least one ceramic seal is disposed horizontally adjacent to each of both sides of the first porous anode barrier segment of each electrochemical cell.

In a still further refinement, a second porous anode barrier has a different composition than the first porous anode barrier; wherein the second porous anode barrier is disposed vertically between the substrate and electrochemical cells.

In a yet still further refinement, the first porous anode barrier is configured to deliver fuel to the anode.

In another refinement, the fuel cell system further comprises a second porous anode barrier having a different composition in the first porous anode barrier, wherein the second porous anode barrier is configured to deliver fuel to the anode.

In yet another refinement, the fuel cell system further comprises an anode current collector, wherein the anode current collector is configured to deliver fuel to the anode.

In still another refinement, the reactions include Ni reacting with steam to form Ni hydroxide vapor phase.

In yet still another refinement, the first porous anode barrier is configured to react with steam to form Ni hydroxide vapor phase.

In a further refinement, the fuel cell system is configured for external reforming, and is configured to avoid on-cell reforming.

Embodiments of the present invention include a fuel cell system, comprising: a plurality of electrochemical cells in the form of solid oxide fuel cells, each electrochemical cell including an anode; and means for preventing and/or reducing Ni migration from the anode during operation of the fuel cell system.

In a refinement, the means for preventing and/or reducing is configured to provide sacrificial Ni.

In another refinement, the means for preventing and/or reducing includes a mixture of NiO—YSZ.

In yet another refinement, the means for preventing and/or reducing is configured to form Ni hydroxide vapor phase.

In still another refinement, the means for preventing and/or reducing is a porous layer configured to provide fuel to the anode.

Embodiments of the present invention include a method of making a fuel cell system, comprising: forming a plurality of electrochemical cells, each electrochemical cell including an anode; and forming a porous layer configured to supply fuel to the anode and to protect the anode from Ni migration during operation of the fuel cell system.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A fuel cell system, comprising:
a plurality of electrochemical cells, each electrochemical cell including an Ni-containing anode, a cathode spaced apart from the anode, and an electrolyte disposed between and in contact with both the anode and the cathode, wherein each anode is formed of a material that includes Ni; and
a plurality of interconnects, each interconnect being configured to conduct free electrons between electrochemical cells;
a substrate supporting the electrochemical cells; and
a first porous anode barrier comprising Ni and disposed between each anode and the substrate, wherein the first porous anode barrier is not an active component of the electrochemical cells; and wherein the first porous anode barrier is configured to provide sacrificial Ni during operation of the fuel cell system to prevent Ni migration in the anode.

2. The fuel cell system of claim 1, wherein the Ni in the anode is in the form of NiO; and Ni in the first porous anode barrier is in the form of NiO.

3. The fuel cell system of claim 2, wherein the NiO content of the first porous anode barrier is less than approximately 30% by weight.

4. The fuel cell system of claim 1, wherein the electrochemical cells are configured as a segmented-in-series arrangement.

5. The fuel cell system of claim 1, wherein each electrochemical cell further comprises a cathode current collector and an anode current collector, wherein at least a portion of the anode current collector is vertically disposed between the anode and the first porous anode barrier and contacts both the anode and the first porous anode barrier.

6. The fuel cell system of claim 5, further comprising a plurality of ceramic seals, wherein at least one ceramic seal is disposed horizontally adjacent to each of both sides of the at least a portion of each anode current collector.

7. The fuel cell system of claim 6, wherein the first porous anode barrier is in the form of segments, at least one such segment for each electrochemical cell; further comprising a second porous anode barrier having a different composition than the first porous anode barrier; wherein the second porous anode barrier is also in the form of segments; wherein at least one segment of the second porous anode barrier is disposed horizontally adjacent to each of both sides of each segment of the first porous anode barrier; and wherein only segments of the first porous anode barrier are disposed vertically below the anode of each electrochemical cell.

8. The fuel cell system of claim 5, wherein the first porous anode barrier is disposed vertically between each ceramic seal and the substrate, and is disposed vertically between each anode current collector and the substrate.

9. The fuel cell system of claim 5, wherein the first porous anode barrier is in the form of segments, at least one such segment for each electrochemical cell; further comprising a plurality of ceramic seals, wherein at least one ceramic seal is disposed horizontally adjacent to each of both sides of the first porous anode barrier segment of each electrochemical cell.

10. The fuel cell system of claim 9, further comprising a second porous anode barrier having a different composition than the first porous anode barrier; wherein the second porous anode barrier is disposed vertically between the substrate and electrochemical cells.

11. The fuel cell system of claim 1, wherein the first porous anode barrier is configured to deliver fuel to the anode.

12. The fuel cell system of claim 11, further comprising a second porous anode barrier having a different composition in the first porous anode barrier, wherein the second porous anode barrier is configured to deliver fuel to the anode.

13. The fuel cell system of claim 12, further comprising an anode current collector, wherein the anode current collector is configured to deliver fuel to the anode.

14. The fuel cell system of claim 1, wherein the fuel cell system is configured for external reforming, and is configured to avoid on-cell reforming.

15. A fuel cell system, comprising:
a plurality of electrochemical cells in the form of solid oxide fuel cells, each electrochemical cell including an anode; and
a plurality of barriers configured to provide sacrificial Ni for preventing and/or reducing Ni migration from the anodes during operation of the fuel cell system, the barriers disposed in a flowpath of a fuel to the anodes.

16. The fuel cell system of claim 15, wherein the plurality of barriers comprise a mixture of NiO—YSZ.

17. The fuel cell system of claim 16, wherein the NiO content of the plurality of barriers is less than approximately 30% by weight.

18. The fuel cell system of claim 15, wherein the plurality of barriers are configured to form Ni hydroxide vapor phase.

19. The fuel cell system of claim 15, wherein each of the plurality of barriers is a porous layer configured to provide fuel to the anode.

20. A method of making a fuel cell system, comprising:
forming a plurality of electrochemical cells, each electrochemical cell including an anode; and
forming a porous layer configured to supply fuel to the anode and to provide sacrificial Ni to protect the anode from Ni migration during operation of the fuel cell system,
wherein the porous layer is formed such that it is upstream of the electrochemical cells in a flowpath of a fuel to each anode.

21. A fuel cell system, comprising:
a plurality of electrochemical cells, each electrochemical cell including an Ni-containing anode, a cathode spaced apart from the anode, and an electrolyte disposed between and in contact with both the anode and the cathode, wherein each anode is formed of a material that includes Ni; and wherein reactions take place during operation of the fuel cell system that have a propensity to react with Ni in each anode and result in Ni migration in each anode; and
a plurality of interconnects, each interconnect being configured to conduct free electrons between electrochemical cells;
a substrate supporting the electrochemical cells; and
a first porous anode barrier disposed between each anode and the substrate, wherein the first porous anode barrier is not an active component of the electrochemical cells; and wherein the first porous anode barrier is configured to provide sacrificial Ni during operation of the fuel cell system to prevent Ni migration in the anode,
wherein the reactions include Ni reacting with steam to form Ni hydroxide vapor phase.

22. The fuel cell system of claim 21, wherein the first porous anode barrier is configured to react with steam to form Ni hydroxide vapor phase.

* * * * *